(12) United States Patent
Inubushi et al.

(10) Patent No.: US 7,893,145 B2
(45) Date of Patent: Feb. 22, 2011

(54) OXYGEN-ABSORBING RESIN COMPOSITION

(75) Inventors: Yasutaka Inubushi, Okayama (JP); Tatsuhiko Hayashibara, Okayama (JP); Hideharu Iwasaki, Okayama (JP); Kazuhiro Kurosaki, Okayama (JP); Emi Yatagai, Okayama (JP); Tomoyuki Watanabe, Okayama (JP); Mie Kanehara, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 38 days.

(21) Appl. No.: 12/298,770

(22) PCT Filed: Apr. 27, 2007

(86) PCT No.: PCT/JP2007/059558

§ 371 (c)(1), (2), (4) Date: Oct. 28, 2008

(87) PCT Pub. No.: WO2007/126157

PCT Pub. Date: Nov. 8, 2007

(65) Prior Publication Data

US 2009/0169902 A1 Jul. 2, 2009

(30) Foreign Application Priority Data

Apr. 28, 2006 (JP) ............................... 2006-126096
Dec. 5, 2006 (JP) ............................... 2006-327682
Dec. 13, 2006 (JP) ............................... 2006-335429

(51) Int. Cl.
 *C08K 5/04* (2006.01)
 *C08K 5/09* (2006.01)
 *B32B 27/00* (2006.01)

(52) U.S. Cl. ........................ 524/394; 524/413; 428/500
(58) Field of Classification Search ................. 524/394, 524/413; 428/500
 See application file for complete search history.

(56) References Cited

U.S. PATENT DOCUMENTS

| 3,935,160 | A | 1/1976 | Kline |
| 5,648,020 | A | 7/1997 | Speer et al. |
| 6,004,477 | A | 12/1999 | Nakagawa et al. |
| 6,254,946 | B1 | 7/2001 | Hirata et al. |
| 6,599,598 | B1 | 7/2003 | Tai et al. |
| 6,822,031 | B2 | 11/2004 | Tai et al. |
| 6,960,376 | B2 | 11/2005 | Tai et al. |
| 7,608,340 | B2 * | 10/2009 | Tsuji et al. .................. 428/500 |
| 7,608,341 | B2 * | 10/2009 | Tsuji et al. .................. 428/500 |
| 2003/0018114 | A1 | 1/2003 | Tai et al. |
| 2003/0157283 | A1 | 8/2003 | Tai et al. |
| 2005/0153087 | A1 | 7/2005 | Tsuji et al. |
| 2006/0116452 | A1 | 6/2006 | Tsuji et al. |
| 2006/0281882 | A1 | 12/2006 | Tsuji et al. |

FOREIGN PATENT DOCUMENTS

| CA | 2 389 434 | 3/2002 |
| CA | 2 313 399 | 2/2005 |
| EP | 0 507 207 A2 | 10/1992 |
| EP | 1 033 080 A2 | 9/2000 |
| JP | 5-115776 | 5/1993 |
| JP | 2000 319408 | 11/2000 |
| JP | 2001 106866 | 4/2001 |
| JP | 2001 106920 | 4/2001 |
| JP | 2002 146217 | 5/2002 |
| JP | 2002 155214 | 5/2002 |
| JP | 2005-187808 | 7/2005 |
| WO | WO 02/072695 A1 | 9/2002 |
| WO | 2005 010101 | 2/2005 |

OTHER PUBLICATIONS

U.S. Appl. No. 12/439,844, Mar. 4, 2009, Inubushi, et al.
J. C. Mol, "Industrial applications of olefin metathesis", Journal of Molecular Catalysis A: Chemical, vol. 213, (2004), pp. 39-45.
Marcin Górski, et al., "Photochemical reaction of $W(CO)_6$ with $GeCl_4$ as a source of germyl and germylene compounds acting as initiators for ring-opening metathesis polymerization of norbornene", Journal of Organometallic Chemistry, vol. 691 (2006), pp. 3708-3714.
Christopher W. Bielawski, et al., "Synthesis of ABA Triblock Copolymers Via A Tandem Ring-Opening Metathesis Polymerization (ROMP)—Atom Transfer Radical Polymerization (ATRP) Approach", Polymer Preprints, vol. 41, No. 1, 2000 2 Pages.

* cited by examiner

*Primary Examiner*—Kriellion A Sanders
(74) *Attorney, Agent, or Firm*—Oblon, Spivak, McClelland, Maier & Neustadt, L.L.P.

(57) ABSTRACT

The present invention provides an oxygen-absorbing resin composition containing a thermoplastic resin (A) having carbon-carbon double bonds substantially only in the main chain and a transition metal salt (B), and the oxygen absorption amount of 1 mol of carbon-carbon double bond of the thermoplastic resin (A) being 1.6 mols or more.

27 Claims, 4 Drawing Sheets

OXYGEN-ABSORBING RESIN COMPOSITION

TECHNICAL FIELD

The present invention relates to an oxygen-absorbing resin composition having practically excellent oxygen absorbency and to a molded product containing the resin composition.

BACKGROUND ART

Gas barrier resins such as ethylene-vinyl alcohol copolymer (hereinafter sometimes abbreviated as EVOH) are materials having excellent oxygen gas barrier properties and carbon dioxide gas barrier properties. Such a resin can be melt-molded and therefore is used preferably for a multilayered plastic packaging material having a layer of the resin laminated with a layer made of a thermoplastic resin (polyolefin, polyester, etc.) having excellent moisture-resistance, mechanical properties and the like. However, the gas permeation through such gas barrier resins is not completely zero, and such gas barrier resins transmit an amount of gas that cannot be ignored. It is known to use an oxygen absorbent in order to reduce transmission of such a gas, in particular, oxygen, which significantly affects the quality of the content, or in order to remove oxygen that is already present inside a package at the time of packaging its content.

For example, as an improved oxygen absorbent, a composition containing a transition metal catalyst and an ethylenically unsaturated compound has been proposed (see Japanese Laid-Open Patent Publication No. 5-115776). Furthermore, resin compositions containing EVOH as described above and an oxygen absorbent have been proposed (Japanese Laid-Open Patent Publication Nos. 2001-106866, 2001-106920 and 2002-146217). In particular, similar to EVOH, the resin compositions containing EVOH described above can be melt-molded and therefore can be for use preferably for various packaging materials.

However, when an oxygen absorbent or an oxygen-absorbing resin composition as mentioned above is used as a packaging material, the oxygen absorbent is decomposed as oxygen absorption proceeds, and an unpleasant odor may be generated. Therefore, there are demands for a further improvement for applications in which fragrance is important. The inventors conducted extensive research to address the problem described above, and as a result, have arrived at the invention of an oxygen-absorbing resin that does not generate an unpleasant odor (see Japanese Laid-Open Patent Publication No. 2005-187808).

However, when the contents are stored for a long period of time, a packaging material is desirable that an oxygen absorption amount of the packaging material is as more as possible, and therefore, a further enhancement of the oxygen absorbency of oxygen-absorbing materials is required without generating the above-described unpleasant odor. For that purpose, for example, it can be considered to increase portions to be oxidized in an oxygen-absorbing material. That is, it can be considered to increase, by increasing double bonds in the material, the amount of allylic positions (methylene or methine carbon adjacent to a double bond) that are considered as portions to be oxidized which are relatively highly reactive. However, materials having many double bonds therein are problematic in being inferior in stability and processability during melt-molding and being likely to be colored or generate aggregation during molding. Therefore, it is not sufficient just to increase double bonds, and there is a limit to the concentration of double bond in a material. In molding processing, it is also required that adhesion of a resin to an extrusion screw or the like should not occur, i.e., that the handling properties during processing is excellent. Moreover, in the field of food packaging, when packaging is carried out using a film containing an oxygen-absorbing resin in the base resin, immediate removal of oxygen remaining inside a package may be required to further improve the shelf life of a packaged food. In this case, it is required to attain not just much oxygen absorption amount, but a high oxygen absorption rate within a short period of time during the initial stage.

As such a method to increase the oxygen absorption rate, it can be considered to improve the dispersion of the oxygen-absorbing resin contained in the base resin. However, even when the dispersion is increased by, for example, adding a compatibilizer so as to reduce the average particle size, the rate of absorption is not always increased so much.

Furthermore, for food packaging materials, materials having further excellent low odor, high safety and increased transparency are required as compared with conventional products. In particular, great demands exist in recent years for retort packaging materials, and thus materials that do not allow an odorant or the like to be dissolved in or transferred to aqueous food, beverages, etc., under severe conditions such as those in retort processing are required.

As described above, there is a demand for an oxygen-absorbing resin composition having extremely high oxygen absorbency that neither generates an unpleasant odor nor causes the various problems described above.

DISCLOSURE OF INVENTION

An oxygen-absorbing resin composition of the present invention comprises a thermoplastic resin (A) having carbon-carbon double bonds substantially only in the main chain and a transition metal salt (B), the oxygen absorption amount of the thermoplastic resin (A) is an amount of 1.6 mols or more per 1 mol of carbon-carbon double bond.

In an embodiment, in the thermoplastic resin (A), adjacent carbon-carbon double bonds are separated by three or more methylenes.

In an embodiment, the thermoplastic resin (A) has a structural unit as represented by a formula (1):

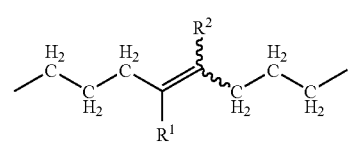

wherein $R^1$ and $R^2$ are each independently a hydrogen atom, an alkyl group that may be substituted, an aryl group that may be substituted, an alkylaryl group that may be substituted, $-COOR^3$, $-OCOR^4$, a cyano group or a halogen atom, and $R^3$ and $R^4$ are each independently a hydrogen atom or an alkyl group having 1 to 10 carbon atoms.

In an embodiment, the thermoplastic resin (A) is a ring-opening metathesis polymer of a cyclic olefin having 7 or more carbon atoms.

In an embodiment, the thermoplastic resin (A) contains an oligomer having a molecular weight of 1000 or less in a ratio of 6% by area or less in an analytical chart of gel permeation chromatography (GPC).

In an embodiment, the thermoplastic resin (A) is prepared by removing the oligomer having a molecular weight of 1000 or less from the ring-opening metathesis polymer of a cyclic olefin having 7 or more carbon atoms.

In an embodiment, the thermoplastic resin (A) is prepared by washing the ring-opening metathesis polymer of a cyclic olefin having 7 or more carbon atoms with a solvent that does not substantially dissolve the polymer.

In an embodiment, the thermoplastic resin (A) has a weight average molecular weight of 60000 or more.

In an embodiment, a trans structural unit in the main chain of the thermoplastic resin (A) accounts for 40% or more and 90% or less of the total thermoplastic resin (A).

In an embodiment, the thermoplastic resin (A) is polyoctenylene.

In an embodiment, the resin composition further comprises an antioxidant (C).

In an embodiment, the antioxidant (C) is contained in a ratio of 100 to 5000 ppm based on the weight of the thermoplastic resin (A).

In an embodiment, the resin composition further comprises a transition metal compound (D).

In an embodiment, the transition metal compound (D) is at least one metal compound selected from the group consisting of a titanium compound, a vanadium compound, a molybdenum compound, a chromium compound, a selenium compound and a tungsten compound.

In an embodiment, the transition metal compound (D) is contained in a ratio of 50 to 50000 ppm in terms of metal element based on the weight of the thermoplastic resin (A).

In an embodiment, the transition metal salt (B) is at least one metal salt selected from the group consisting of an iron salt, a nickel salt, a copper salt, a manganese salt and a cobalt salt.

In an embodiment, the transition metal salt (B) is contained in a ratio of 1 to 50000 ppm based on the weight of the thermoplastic resin (A).

In an embodiment, the resin composition further comprises a matrix resin (E).

In an embodiment, in the resin composition, particles of the thermoplastic resin (A) are dispersed in a matrix of the matrix resin (E).

In an embodiment, the average particle size of the particles of the thermoplastic resin (A) is 4 Mum or less.

In an embodiment, the thermoplastic resin (A) is contained in a ratio of 30 to 1 wt % and the matrix resin (E) is contained in a ratio of 70 to 99 wt %, when the total weight of the thermoplastic resin (A) and the matrix resin (E) is determined to be 100 wt %.

In an embodiment, the matrix resin (E) is a gas barrier resin (E.1) having an oxygen transmission rate of 500 ml·20 μm/(m$^2$·day·atm) or less in 65% RH at 20° C.

In an embodiment, the gas barrier resin (E.1) is at least one resin selected from the group consisting of a polyvinyl alcohol resin, a polyamide resin, a polyvinyl chloride resin and a polyacrylonitrile resin.

In an embodiment, the gas barrier resin (E.1) is an ethylene-vinyl alcohol copolymer having an ethylene content of 5 to 60 mol % and a degree of saponification of 90% or more.

In an embodiment, the resin composition further comprises a compatibilizer (F).

In an embodiment, the thermoplastic resin (A) is contained in a ratio of 29.9 to 1 wt %, the matrix resin (E) is contained in a ratio of 70 to 98.9 wt %, and the compatibilizer (F) is contained in a ratio of 29 to 0.1 wt %, when the total weight of the thermoplastic resin (A), the matrix resin (E) and the compatibilizer (F) is determined to be 100 wt %.

The present invention includes a molded product comprising the resin composition described above.

The present invention includes a multilayered structure comprising a layer made of the resin composition described above.

The present invention includes a multilayered container comprising a layer made of the resin composition described above.

The present invention includes a multilayered container made of a multilayered film having a total thickness of 300 μm or less, wherein the multilayered film comprises a layer made of the resin composition described above.

The present invention includes a multilayered container comprising a layer made of the resin composition described above and a thermoplastic polyester layer.

The present invention includes a cap comprising a cap body that is provided with a gasket made of the resin composition described above.

According to the present invention, an oxygen-absorbing resin composition that has excellent oxygen absorbency and does not generate an unpleasant odor as a result of oxygen absorption is provided.

According to the present invention, a resin composition having a high initial oxygen absorption rate in addition to the properties described above can be provided. Furthermore, according to the present invention, a resin composition that has good handling properties during processing, undergoes little coloring and gel generation during molding, and has excellent transparency in addition to the properties described above can be provided. Moreover, according to the present invention, an oxygen-absorbing resin composition that does not generate an unpleasant odor even when subjected to processing in the presence of hot water, such as retort processing can be provided.

In addition, according to the present invention, a molded product containing the resin composition having the above-described excellent properties, for example, a multilayered film, multilayered container or the like that contains a layer made of the resin composition is provided. In particular, a container obtained using the above-described composition is of use as a container for storing articles such as foods and cosmetics that are susceptible to degradation by oxygen and whose flavor is important. A packaging material made of the resin composition of the present invention has an advantage of not allowing an odorant or the like to be transferred to or dissolved in the aqueous foods, beverages or the like contained therein even when the packaging material is subjected to processing under severe conditions, such as retort processing. According to the present invention, the resin composition has a strong oxygen scavenging function, and thus the resin composition that is useful as an easy-to handle oxygen absorbent can be provided.

BEST MODE FOR CARRYING OUT THE INVENTION

Figure 1:
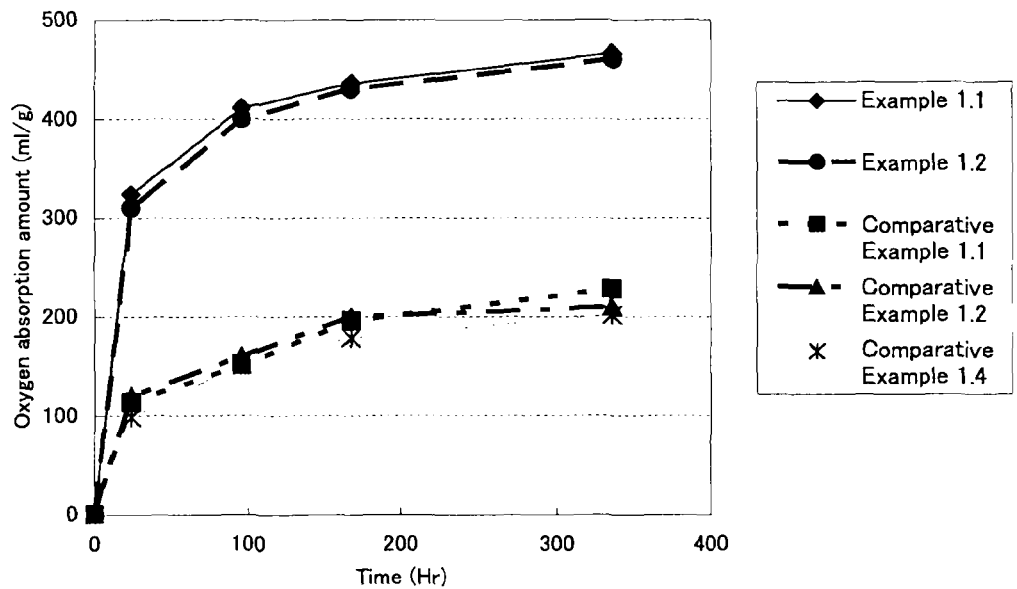
FIG. 1 is a graph in which the oxygen absorption amounts of the sheets of Examples 1.1 and 1.2 and Comparative Examples 1.1, 1.2 and 1.4 under a 100% RH atmosphere at 60° C. against time are plotted.

In the present specification, the term "scavenging" oxygen means absorbing or consuming oxygen or reducing the amount thereof from a given environment.

The oxygen-absorbing resin composition of the present invention contains a thermoplastic resin (A) having carbon-carbon double bonds substantially only in the main chain and a transition metal salt (B), and the properties of the thermoplastic resin (A) is that the oxygen absorption amount is 1.6 mols or more per 1 mol of carbon-carbon double bond of the thermoplastic resin (A). The oxygen-absorbing resin composition of the present invention may further contain, if necessary, an antioxidant (C), a transition metal compound (D), a matrix resin (E), a compatibilizer (F), other thermoplastic resins (G), various additives, etc. These components will be described below in series.

(1) Thermoplastic Resin (A) Having Carbon-Carbon Double Bonds Substantially Only in Main Chain (1.1) Structure and Properties of Thermoplastic Resin (A)

The resin composition of the present invention contains a thermoplastic resin (A) having carbon-carbon double bonds substantially only in the main chain (hereinafter may be simply referred to as a thermoplastic resin (A), resin (A) or the like). Herein, the phrase, the thermoplastic resin (A) "has carbon-carbon double bonds substantially only in the main chain", means that the carbon-carbon double bonds present in the main chain of the thermoplastic resin (A) account for 90% or more, and the carbon-carbon double bonds present in the side chains account for 10% or less, of the total carbon-carbon double bonds within the molecule. The carbon-carbon double bonds present in the side chains preferably account for 7% or less, and more preferably 5% or less.

Since the thermoplastic resin (A) has carbon-carbon double bonds within its molecule, the thermoplastic resin (A) can efficiently react with oxygen, and as a result, an oxygen scavenging function (oxygen-absorbing function) can be obtained. The term "carbon-carbon double bonds" used herein does not encompass the double bonds contained in an aromatic ring. The term "double bond" used herein refers to "carbon-carbon double bond" unless specified otherwise.

In the thermoplastic resin (A), the oxygen absorption amount is 1.6 mols or more and 10 mols or less per 1 mol of double bond in the thermoplastic resin (A), preferably 1.8 mols or more and 8.0 mols or less, more preferably 2.0 mols or more and 7.0 mols or less, even more preferably 2.5 mols or more and 6.0 mols or less, and particularly preferably 3.0 mols or more and 5.0 mols or less. Herein, the term "oxygen absorption amount" refers to a value calculated from the oxygen absorption amount when the thermoplastic resin (A) is processed into a sheet with a thickness of 100 μm and left to stand for 14 days under a 100% RH condition at 60° C. according to the method described below in Example 1.1.

The amount of carbon-carbon double bond contained in the thermoplastic resin (A) is preferably 0.001 mol/g to 0.020 mol/g, more preferably 0.005 mol/g to 0.018 mol/g, and even more preferably 0.007 mol/g to 0.012 mol/g. When the amount of carbon-carbon double bond contained is less than 0.001 mol/g, the oxygen scavenging function of the resultant resin composition may be insufficient, and when the amount is 0.020 mol/g or more, the molded product of the composition containing the thermoplastic resin (A) when molded may be colored or aggregated.

A resin is particularly preferable as the thermoplastic resin (A) one in which each double bond contained therein is separated by three or more methylenes. Examples of such a thermoplastic resin include preferably a resin having the unit represented by a formula (1) below.

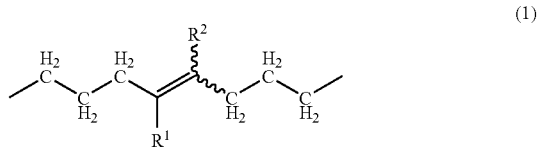

In the formula, $R^1$ and $R^2$ are each independently a hydrogen atom, an alkyl group that may be substituted, an aryl group that may be substituted, an alkylaryl group that may be substituted, —COOR³, —OCOR⁴, a cyano group or a halogen atom, and $R^3$ and $R^4$ are each independently a hydrogen atom or an alkyl group having 1 to 10 carbon atoms.

The number of carbon atoms of the alkyl group is preferably 1 to 5. The number of carbon atoms of the aryl group is preferably 6 to 10. The number of carbon atoms of the alkylaryl group is preferably 7 to 11. Examples of the alkyl group include a methyl group, an ethyl group, a propyl group and a butyl group. An example of the aryl group includes a phenyl group. An example of the alkylaryl group includes a tolyl group. An example of the halogen atom includes a chlorine atom.

Examples of the thermoplastic resin (A) having the unit represented by the formula (1) above include polyoctenylene, a ring-opening polymerization product obtained by hydrogenation of isoprene dimer and the like. In addition, polypentenylene, polyhexenylene, polyheptenylene and the like are usable. The ring-opening polymerization product obtained by hydrogenation of isoprene dimer can be represented by the following formula:

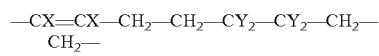

—CX=CX—CH₂—CH₂—CY₂—CY₂—CH₂—CH₂— wherein either one of the two X groups is a methyl group and the other is a hydrogen atom, and either one of the four Y groups is a methyl group and the remaining three Y groups are hydrogen atoms.

The thermoplastic resin (A) may contain various hydrophilic groups. "Hydrophilic groups" as used herein refer to a hydroxyl group, an alkoxy group having 1 to 10 carbon atoms, an amino group, an aldehyde group, a carboxyl group, an epoxy group, an ester group, a carboxylic acid anhydride group, a boron-containing polar group (e.g., a boronic acid group, a boronic acid ester group, a boronic acid anhydride group and a boronate group) and the like. These groups may be present at any portion of the resin. For example, in a resin having the unit of the formula (1) above, these groups may be contained in the units other than that of the formula (1) above or in $R^1$ or $R^2$ in the unit above.

As described above, when each double bond is separated by three or more methylenes, the oxygen absorption amount is particularly high.

Generally, for efficient oxygen absorption, it is necessary that the allyl carbon sites in the resin are promptly oxidized, and it is considered sufficient therefor that double bonds are separated from each other by two methylenes. However, for example, in the case where double bonds are separated from each other by two or less methylenes, for example, polybutadiene, the oxygen absorption amount per 1 mole of double bond is less than 1.6 mols. In contrast, the inventors have found that in the case of a resin in which double bonds are separated from each other by three or more methylenes, 1.6 mols or more oxygen can be absorbed, although the amount of double bond per unit weight is smaller than that of polybutadiene.

A weight average molecular weight of the thermoplastic resin (A) is preferably in the range of 1000 to 500000, more preferably 10000 to 250000, and even more preferably 60000 to 200000. The weight average molecular weight was determined using gel permeation chromatography (GPC) and calculated in terms of polystyrene. When the weight average molecular weight of the thermoplastic resin (A) is less than 1000 or more than 500000, the mold-processability and handling properties of the resultant resin composition may be poor, and mechanical properties such as strength or elongation may be decreased when processed into a molded product. Furthermore, when thermoplastic resin (A) is mixed with a matrix resin (E) that will be described below, the dispersion is lowered, and as a result, oxygen scavenging performance is lowered and the properties of the matrix resin (E) may not be sufficiently exhibited (for example, gas barrier properties is insufficient).

The oligomer having a molecular weight of 1000 or less is contained in the thermoplastic resin (A) in an amount of preferably 6% or less. The amount of oligomer having a molecular weight of 1000 or less was calculated by dividing the area of the portion corresponding to the molecular weight of 1000 or less in terms of polystyrene by the total peak area in a GPC chart. Generally, when a polymer is produced by ring-opening metathesis polymerization, an oligomer (low molecular weight compound) is produced in a definite ratio. Therefore, it is preferable to select a resin having a low oligomer content as the thermoplastic resin (A), or to reduce the oligomer content by the method described below.

The oligomer having a molecular weight of 1000 or less is contained in the thermoplastic resin (A) in an amount of preferably 4% or less, and more preferably 2% or less. The oligomer having a molecular weight of 1000 or less is highly likely to be dissolved upon a contact with water, alcohol or the like. Therefore, by reducing the amount of this oligomer, for example, when the thermoplastic resin (A) is dispersed in another polymer, the dissolution (bleeding-out) of the oligomer is significantly lowered. Furthermore, in the case where the composition of the present invention is used as a packaging material, when the composition after molding is subjected to a high-temperature treatment (retort treatment) with water, the transfer of oligomer into water is significantly lower than when conventional products are used. This can be confirmed by a reduced odor in water.

A lower oligomer content is preferable in view of odor or the like. However, extreme reduction in the oligomer content complicates the production process, and therefore a practical oligomer content is 0.5% to 6%, and 1% to 6% if practicality is more emphasized.

The thermoplastic resin (A) contained in the composition of the present invention has a trans structural unit in a ratio of 40% to 90%, and preferably 50% to 85%. Here, the term "trans structural unit" refers to a unit, when one double bond present in the main chain of the thermoplastic resin (A) is focused on, that includes this double bond, and in this unit, the carbon chain constituting the main chain via this double bond is in the trans configuration. The main chain of the thermoplastic resin (A) is composed of this trans configuration and a "cis structural unit" in which a carbon chain constituting the main chain is in the cis configuration.

For the level of odor as a result of the oxygen absorption of the thermoplastic resin (A), there is not much difference based on the ratio between the above-described trans structural unit and cis structural unit contained therein. However, when a thermoplastic resin (A) having the trans structural unit in the above-described range is used, the thermoplastic resin (A) exhibits sufficient fluidity during hot forming, and therefore advantages such as a broad temperature control range and excellent handling properties can be attained. When the ratio of trans structural unit is lower than the above-described range, the fluidity during heating becomes high and the range of temperature control becomes narrow, and therefore the resin may adhere to the extruder screw. When the ratio of trans structural unit is higher than the above-described range, the oxygen absorbency tends to be slightly impaired.

Since the ratio between trans structural unit and cis structural unit contained is varied depending on the structure of a starting monomer, a solvent and a catalyst for use in a polymerization reaction, etc., it is recommended to select a thermoplastic resin (A) having a trans structural unit in the above-described range. A preferable method for producing of such a thermoplastic resin (A) will be described below.

As described above, the thermoplastic resin (A) has carbon-carbon double bonds substantially only in the main chain. Therefore, even when double bonds or allyl carbon sites thereof are partially oxidized or cleaved by a reaction with oxygen, a low molecular weight fragment is not likely to be generated unlike the cleavage of double bonds in a side chain. Thus, the generation of decomposition products having low molecular weight is very low. Some of the decomposition products having low molecular weight may be an unpleasant odorous substance, and since such decomposition products are not generated, no unpleasant odor is generated. On the other hand, when a thermoplastic resin having carbon-carbon double bonds in side chains is used, although not problematic in oxygen absorbency, the decomposition products having low molecular weight are generated as described above due to the cleavage of double bonds in the side chains. Therefore, an unpleasant odor is emitted, and the ambient atmosphere may be significantly impaired.

When a resin in which double bonds are separated from each other by three or more methylenes is used as the thermoplastic resin (A), high oxygen absorbency is attained even when the ratio of double bond contained in the molecule is low.

The thermoplastic resin (A) may be of a single resin or a mixture of a plurality of resins.

(1.2) Production of Thermoplastic Resin (A)

A method for producing the thermoplastic resin (A) is not particularly limited. For example, the resin may be produced according to a method in which a chain diene compound that has an olefin at both terminals and has 9 or more carbon atoms is subjected non-cyclic diene metathesis polymerization, a method in which a cyclic olefin having 7 or more carbon atoms is subjected to ring-opening metathesis polymerization, or like methods. Among the above-described methods, the method by the ring-opening metathesis polymerization of a cyclic olefin is particularly effective because it does not generate by-product ethylene, and thus the production process thereof is not complicated. The resin can be obtained by, for example, polymerizing the cyclic olefin in an inert solvent, if necessary, in the presence a polymerization catalyst, chain transfer agent, etc.

The preparation of the thermoplastic resin (A) according to the ring-opening metathesis polymerization method will be described below.

(1.2.1) Cyclic Olefins

Cyclic olefins having 7 or more carbon atoms that can be starting materials of the thermoplastic resin (A) are not particularly limited, and include the following compounds: cyclomonoenes such as cycloheptene, cyclooctene, cyclononene, cyclodecene, and norbornene; cyclodienes such as cyclooctadiene, cyclodecadiene, norbornadiene, and dicyclopentadiene; cyclotrienes such as cyclododecatriene. These compounds may have substituents such as an alkoxy group, a carbonyl group, an alkoxycarbonyl group, a halogen atom, and the like. In particular, cyclooctene is preferable in view of availability, economy and use as an oxygen absorbent.

(1.2.2) Polymerization Catalysts and Chain Transfer Agents

Examples of the above-described ring-opening metathesis polymerization catalyst (x) include a catalyst (x–1) containing a transition metal halide as the main ingredient and a transition metal carbene complex catalyst (x–2). The catalyst (x–1) contains a transition metal halide as the main ingredient and an organometallic compound other than a transition metal as a cocatalyst.

A transition metal halide contained in the catalyst (x–1) (hereinafter sometimes referred to as the catalyst (x–1) or the like) that contains a transition metal halide as the main ingredient is a halide of a transition metal of the groups 4 to 8 of the periodic table. Such transition metal halides include the following compounds: molybdenum halides such as $MoBr_2$, $MoBr_3$, $MoBr_4$, $MoCl_4$, $MoCl_5$, $MoF_4$, $MoOCl_4$, and $MoOF_4$; tungsten halides such as $WBr_2$, $WCl_2$, $WBr_4$, $WCl_4$, $WCl_5$, $WCl_6$, $WF_4$, $WI_2$, $WOBr_4$, $WOCl_4$, $WOF_4$, and $WCl_4(OC_6H_4Cl_2)_2$; vanadium halides such as $VOCl_3$, and $VOBr_3$; titanium halides such as $TiCl_4$ and $TiBr_4$.

Specific examples of above-described organometallic compounds that function as a cocatalyst include the following compounds: organoaluminum compounds such as trimethylaluminum, triethylaluminum, triisobutylaluminum, trihexylaluminum, trioctylaluminum, triphenylaluminum, tribenzylaluminum, diethylaluminum monochloride, di-n-butylaluminum monochloride, diethylaluminum monoiodide, diethylaluminum monohydride, ethylaluminum sesquichloride, ethylaluminum dichloride, methyl aluminoxane, and isobutyl aluminoxane; organotin compounds such as tetramethyltin, diethyldimethyltin, tetraethyltin, dibutyldiethyltin, tetrabutyltin, tetraoctyltin, trioctyltin fluoride, trioctyltin chloride, trioctyltin bromide, trioctyltin iodide, dibutyltin difluoride, dibutyltin dichloride, dibutyltin dibromide, dibutyltin diiodide, butyltin trifluoride, butyltin trichloride, butyltin tribromide, and dibutyltin triiodide; organolithium compounds such as methyllithium, ethyllithium, n-butyllithium, sec-butyllithium, and phenyllithium; organosodium compounds such as n-pentylsodium; organomagnesium compounds such as methylmagnesium iodide, ethylmagnesium bromide, methylmagnesium bromide, n-propylmagnesium bromide, tert-butylmagnesium chloride, and arylmagnesium chloride; organozinc compounds such as diethylzinc; organocadmium compounds such as diethylcadmium; organoboron compounds such as trimethylboron, triethylboron, tri-n-butylboron, triphenylboron, tris(perfluorophenyl) boron, N,N-dimethylanilinium tetrakis(perfluorophenyl)borate, and trityl tetrakis(perfluorophenyl)borate the like.

The transition metal carbene complex catalyst (x–2) is a carbene complex compound of a transition metal of the groups 4 to 8 of the periodic table, and examples thereof include tungsten carbene complex catalysts, molybdenum carbene complex catalysts, rhenium carbene complex catalysts, and ruthenium carbene complex catalysts.

Specific examples of tungsten carbene complex catalysts as mentioned above include the following compounds: $W(N-2,6-Pr^i_2C_6H_3)(CHBu^t)(OBu^t)_2$, $W(N-2,6-Pr^i_2C_6H_3)(CHBu^t)(OCMe_2CF_3)_2$, $W(N-2,6-Pr^i_2C_6H_3)(CHBu^t)(OCMe(CF_3)_2)_2$, $W(N-2,6-Pr^i_2C_6H_3)(CHCMe_2Ph)(OBu^t)_2$, $W(N-2,6-Pr^i_2C_6H_3)(CHCMe_2Ph)(OCMe_2CF_3)_2$, and $W(N-2,6-Pr^i_2C_6H_3)(CHCMe_2Ph)(OCMe(CF_3)_2)_2$.

Specific examples of molybdenum carbene complex catalysts as mentioned above include the following compounds: $Mo(N-2,6-Pr^i_2C_6H_3)(CHBu^t)(OBu^t)_2$, $Mo(N-2,6-Pr^i_2C_6H_3)(CHBu^t)(OCMe_2CF_3)_2$, $Mo(N-2,6-Pr^i_2C_6H_3)(CHBu^t)(OCMe(CF_3)_2)_2$, $Mo(N-2,6-Pr^i_2C_6H_3)(CHCMe_2Ph)(OBu^t)_2$, $Mo(N-2,6-Pr^i_2C_6H_3)(CHCMe_2Ph)(OCMe_2CF_3)_2$, $Mo(N-2,6-Pr^i_2C_6H_3)(CHCMe_2Ph)(OCMe(CF_3)_2)_2$, $Mo(N-2,6-Pr^i_2C_6H_3)(CHCMe_2Ph)(BIPHEN)$, and $Mo(N-2,6-Pr^i_2C_6H_3)(CHCMe_2Ph)(BINO)(THF)$.

Specific examples of rhenium carbene complex catalysts as mentioned above include the following compounds: $Re(CBu^t)(CHBu^t)(O-2,6-Pr^i_2C_6H_3)_2$, $Re(CBu^t)(CHBu^t)(O-2-ButC_6H_4)_2$, $Re(CBu^t)(CHBu^t)(OCMe_2CF_3)_2$, $Re(CBu^t)(CHBu^t)(OCMe(CF_3)_2)_2$, and $Re(CBu^t)(CHBu^t)(O-2,6-Me_2C_6H_3)_2$.

In addition, specific examples of ruthenium carbene complex catalysts as mentioned above include the following compounds: ruthenium carbene complexes in which a hetero atom-containing carbene compound and an electron-donating neutral compound are bonded such as benzylidene (1,3-dimesitylimidazolidin-2-ylidene) (tricyclohexyl-phosphine) ruthenium dichloride, (1,3-dimesitylimidazolidin-2-ylidene) (3-methyl-2-buten-1-ylidene) (tricyclopentylphosphine)ruthenium dichloride, benzylidene(1,3-dimesityl-octahydrobenzimidazol-2-ylidene) (tricyclohexylphosphine)ruthenium dichloride, benzylidene[1,3-di(1-phenylethyl)-4-imidazolin-2-ylidene](tricyclohexylphosphine)ruthenium dichloride, benzylidene(1,3-dimesityl-2,3-dihydrobenzimidazol-2-ylidene) (tricyclohexylphosphine)ruthenium dichloride, benzylidene(tricyclohexyl-phosphine)(1,3,4-triphenyl-2,3,4,5-tetrahydro-1H-1,2,4-triazol-5-ylidene) ruthenium dichloride, (1,3-diisopropylhexahydropyrimidin-2-ylidene) (ethoxymethylene)(tricyclohexylphosphine)ruthenium dichloride, and benzylidene (1,3-dime sitylimidazolidin-2-ylidene)pyridineruthenium dichloride; ruthenium carbene complexes in which two hetero atom-containing carbene compounds are bonded such as benzylidenebis(1,3-dicyclohexylimidazolidin-2-ylidene)ruthenium dichloride, and benzylidenebis(1,3-diisopropyl-4-imidazolin-2-ylidene) ruthenium dichloride; (1,3-dimesitylimidazolidin-2-ylidene) (phenyl-vinylidene) (tricyclohexylphosphine)ruthenium dichloride; (t-butyl-vinylidene) (1,3-diisopropyl-4-imidazolin-2-ylidene) (tricyclopentylphosphine) ruthenium dichloride; and bis(1,3-dicyclohexyl-4-imidazolin-2-ylidene)phenylvinylidene ruthenium dichloride.

These ring-opening metathesis polymerization catalysts can be used alone or in a combination of two or more. Among these catalysts, it is preferable to use a transition metal carbene complex catalyst (x–2) since it does not require a cocatalyst and is highly active, and it is particularly preferable to use a ruthenium carbene complex catalyst in view of the residual catalyst in the polymer.

The amount of metathesis reaction catalyst to be used is in the range of catalyst:cyclic olefin monomer=1:100 to 1:2000000, preferably 1:500 to 1:1000000, and more preferably 1:1000 to 1:700000, as the molar ratio of catalyst to cyclic olefin monomer subjected to the polymerization. When the amount of catalyst is too large, the removal of the catalyst after reaction is difficult, and when the amount of the catalyst is too small, the polymerization activity may be insufficient.

There is no particular limitation regarding the chain transfer agents, and α-olefins such as 1-butene, 1-pentene, 1-hexene, 1-heptene, and 1-octene; and internal olefins such as 2-butene, 2-pentene, 2-hexene, 3-hexene, 2-heptene, 3-heptene, 2-octene, 3-octene, and 4-octene can be used. These chain transfer agents may be substituted by a hydroxyl group, an alkoxy group, an acyl group, a carbonyl group and an alkoxycarbonyl group, a halogen atom, etc. These chain transfer agents may be used alone or as a mixture thereof.

There is no particular limitation regarding the amount of chain transfer agent to be used insofar as a polymer having a sufficient molecular weight can be produced in the polymerization. For example, the amount is in the range of cyclic olefin:chain transfer agent=1000:1 to 20:1, and more preferably 800:1 to 50:1, as the molar ratio of chain transfer agent to cyclic olefin.

(1.2.3) Synthesis of Thermoplastic Resin (A)

The thermoplastic resin (A) can be obtained by performing the ring-opening metathesis polymerization of the above-described cyclic olefin in an inert solvent, if necessary, in the presence a polymerization catalyst, chain transfer agent, etc., as described above. Alternatively, the resin can be obtained by a method of performing non-cyclic diene metathesis polymerization using a chain-like diene compound that has an olefin at both terminals as a starting monomer.

Inert solvents as mentioned above are not particularly limited, and saturated aliphatic hydrocarbons such as hexane, heptane, octane, nonane, decane, dodecane, cyclohexane, cycloheptane, and cyclooctane; aromatic hydrocarbons such as benzene, toluene, xylene, and mesitylene; halogenated hydrocarbons such as methylene chloride, chloroform, and carbon tetrachloride; and ethers such as diethyl ether, tetrahydrofuran, and 1,4-dioxane can be used. In view of easy solvent removal and operability, saturated aliphatic hydrocarbons are preferably used.

The amount of solvent to be used is also not particularly limited, and usually in the range of 1 to 1000 times by weight, preferably 2 to 200 times by weight, and more preferably 3 to 100 times by weight, relative to the cyclic olefin to be used.

The temperature for performing the ring-opening metathesis polymerization cannot be specified since it is varied depending on the type and amount of solvent to be used, but the polymerization is usually carried out in the temperature range of –78° C. to 200° C., and preferably 10° C. to 150° C. The polymerization is preferably carried out in an inert gas atmosphere.

When the thermoplastic resin (A) is polyoctenylene, an example of a production method is as follows. Polyoctenylene can be synthesized by a method of performing a ring-opening metathesis polymerization, using cyclooctene as a raw material monomer and the above-described catalyst, or by a method of performing non-cyclic diene metathesis polymerization, using 1,9-decadiene as a raw material monomer and the same catalyst. Specifically, the above-described catalyst such as benzylidene (1,3-dimesitylimidazolidin-2-ylidene) (tricyclohexylphosphine) ruthenium dichloride, for example, can be used. The polymerization can be carried out without any solvent, and the above-described solvent is used as necessary. The polymerization is carried out usually in the temperature range of –78 to 200° C., usually within 72 hours, depending on the melting point and the boiling point of the solvent used.

(1.2.4) Control of Ratio of Trans Structural Unit in Preparing Thermoplastic Resin (A)

The ratio of "trans structural unit" and "cis structural unit" contained in the thermoplastic resin (A) obtained by the various methods described above is varied depending on the polymerization conditions such as catalyst, solvent, stirring intensity, temperature, etc. Therefore, it is preferable to obtain the thermoplastic resin (A) that contains the above-described transformer structural unit in a ratio of 40% to 90% by suitably controlling the polymerization conditions.

When a ruthenium carbene complex catalyst is used, the ratio of trans structural unit can also be increased due to the isomerization of double bonds by continuing stirring on heating after the termination of the polymerization reaction in the thermoplastic resin (A) production. This isomerization reaction can be accelerated by adding an alcohol such as methanol, ethanol, propanol, and isopropanol.

(1.2.5) Control of Amount of Oligomer in Thermoplastic Resin (A)

In the present invention, it is preferable that the amount of oligomer having a molecular weight of 1000 or less is 6 wt % or less as described above. In connection with the thermoplastic resin (A) obtained by the above-described ring-opening metathesis polymerization, oligomers, i.e., dimer to decamer of cyclic olefin, that is a raw material monomer, are inevitably produced, and it is difficult to suppress this oligomer production. Therefore, it is recommended to remove these oligomers.

There is no particular limitation regarding methods of removing the oligomers. For example, a method of introducing an inert gas such as nitrogen while heating, a method of heating under high vacuum, and a method of performing an azeotropic removal with an azeotropic solvent such as water can be employed after the termination of the polymerization and the removal of the catalyst and solvent.

Furthermore, the oligomers can be removed by carrying out desolvation to remove a catalyst and a solvent after the termination of the polymerization, processing the resin into strands, chips or pellets by a method such as extrusion molding, and washing them by contact with an organic solvent. An organic solvent for use is not particularly limited. Organic solvents that do not substantially dissolve the thermoplastic resin (A) having a molecular weight more than 1000 can be used, and it is preferable to use those that can maintain the form of a polymer. Solvents that can be used include alcohols such as methanol, ethanol, propanol, and isopropanol, ketones such as acetone and methyl ethyl ketone, esters such as methyl acetate and ethyl acetate, and ethers such as diethyl ether and tert-butyl methyl ether. The amount of solvent to be used is also not limited, and is usually 1 to 10000 times by weight relative to the thermoplastic resin (A), and in view of economy and operability, 10 to 1000 times by weight, and more preferably 20 to 800 times by weight. The temperature for carrying out the removal is also not particularly limited, and is usually in the range of –10° C. to 80° C., and in view of operability and the Tg of the polymer, preferably in the range of 0° C. to 60° C.

A method for washing is also not particularly limited. A method of immersing the polymer in a solvent, a method of dispersing the polymer in a solvent and stirring them, a method of circulating a solvent with the fixed polymer as in the fixed-bed method can be employed. After washing, the polymer and a solvent are subjected to a solid-liquid separation, and the solvent remaining in the polymer is removed by a method of distilling off the solvent under a reduced pressure or in an inert gas environment to give a dried thermoplastic resin (A).

On the other hand, conventionally, thermoplastic resins obtained by ring-opening metathesis polymerization have been industrially produced as commercial products in the form containing an oligomer in a certain ratio (see Journal of Molecular Catalysis A; Chemical 213 (2004) 39-45). On the contrary, when a highly polymerized product that does not contain an oligomer is to be obtained under laboratory conditions, a method of removing a low molecular weight compound and a residual solvent by reprecipitation is employed (see Journal of Organometallic Chemistry 691 (2006) 3708-3714 and Polymer Preprints 2000, 41(1) 12-13). However, it is industrially difficult to perform such a method.

In the present invention, the oligomer can be readily removed according to a method such as washing with the above-described solvent. With respect to the thermoplastic resin (A) processed in this manner to have an oligomer content of 6 wt % or less, it is very rare that the oligomer is eluted out of the resin and transferred into other materials even when retort treatment is performed.

(2) Transition Metal Salt (B) and Transition Metal Compound (D)

The transition metal salt (B) has an effect of improving the oxygen scavenging function of the resin composition by facilitating the oxidation reaction of the thermoplastic resin (A). For example, the transition metal salt (B) facilitates a reaction of the thermoplastic resin (A) and oxygen present inside a packaging material obtained from the resin composition of the present invention as well as a reaction of the thermoplastic resin (A) and oxygen that is passing through the packaging material, so that the oxygen scavenging function of the packaging material can be improved.

The transition metal compound (D) functions as an oxidation catalyst in a mechanism that is different from that of the transition metal salt (B). More specifically, the transition metal compound (D) reacts with a peroxide generated by the oxidation reaction of the thermoplastic resin (A) in which the transition metal salt (B) serves as a catalyst to form an oxidative species, so that the double bonds of the thermoplastic resin (A) are epoxidized. In addition to the oxidation of carbons at the allyl positions, epoxidation also progresses, so that the oxygen scavenging function of the composition is improved due to oxygen consumption in this instance.

Examples of transition metals contained in the transition metal salt (B) include, but are not limited to, iron, nickel, copper, manganese, cobalt, rhodium, titanium, chromium, vanadium, and ruthenium. Among these metals, iron, nickel, copper, manganese and cobalt are preferable, with manganese and cobalt being more preferable, and cobalt being even more preferable.

Examples of counter ions for the metals contained in the transition metal salt (B) include an anion derived from an organic acid or a chloride. Examples of the organic acid include, but are not limited to, acetic acid, stearic acid, acetylacetone, dimethyldithiocarbamic acid, palmitic acid, 2-ethylhexanoic acid, neodecanoic acid, linoleic acid, tallic acid, oleic acid, resin acid, capric acid, and naphthenic acid. Particularly preferred salts are cobalt 2-ethylhexanoate, cobalt neodecanoate and cobalt stearate. The metal salts may be a so-called ionomers having a polymeric counter ion.

The transition metal salt (B) is contained in the composition preferably in a ratio of 1 to 50000 ppm in terms of the metal element with respect to the weight of the thermoplastic resin (A). The transition metal salt (B) is contained more preferably in a ratio of 5 to 10000 ppm, and even more preferably 10 to 5000 ppm. When the resin composition of the present invention contains a matrix resin (E) as described below in addition to the thermoplastic resin (A), the transition metal salt (B) is contained preferably in a ratio of 1 to 50000 ppm in terms of the metal element with respect to the total amount of the thermoplastic resin (A) and the matrix resin (E). Moreover, when the resin composition contains a matrix resin (E) and a compatibilizer (F) as described below in addition to the thermoplastic resin (A), the transition metal salt (B) is contained preferably in a ratio of 1 to 50000 ppm in terms of metal element with respect to the total amount of the thermoplastic resin (A), the matrix resin (E) and the compatibilizer (F). In each of the cases, the transition metal salt (B) is contained more preferably in a ratio of 5 to 10000 ppm, and even more preferably 10 to 5000 ppm. If the content of the transition metal salt (B) is less than 1 ppm, the oxygen absorption effect of the resin composition may be insufficient. On the other hand, if the content of the transition metal salt (B) is more than 50000 ppm, the thermal stability of the resin composition may be degraded, and significant amount of decomposed gas, gels or aggregates may be generated.

The transition metals contained in the transition metal compound (D) include titanium, vanadium, molybdenum, chromium, selenium, and tungsten. Specific examples of the transition metal compound (D) include $TiO_2$, $V_2O_5$, $MoO_3$, $CrO_3$, $WO_3$, $WO_2$, $H_2WO_4$, $WCl_2O_2$, $WOCl_4$, and $SeO_2$. These transition metal compounds can be used alone or in a combination of two or more.

The transition metal compound (D) is contained preferably in a ratio of 50 to 50000 ppm, and more preferably 100 to 10000 ppm, in terms of the metal element with respect to the weight of the thermoplastic resin (A). When the amount of transition metal compound (D) is too large, a molded product prepared using the resultant composition may colored.

(3) Antioxidant (C)

The oxygen-absorbing resin composition of the present invention may contain an antioxidant (C). The antioxidant (C) prevents degradation of the oxygen absorbency of the thermoplastic resin (A) due to oxidation of the thermoplastic resin (A) when the resin composition containing the thermoplastic resin (A) is stored under conditions where the resin composition comes into contact with air, or prevents generation of coloring, gels and aggregates resulting from contact with oxygen when molding is carried out by mixing each component of the resin composition and subjecting the mixture to melting by heating.

As the antioxidant (C), for example, the following compounds are included: 2,5-di-tert-butylhydroquinone, 2,6-di-tert-butyl-p-cresol, 4,4'-thiobis-(6-tert-butylphenol), 2,2'-methylene-bis-(4-methyl-6-tert-butylphenol), octadecyl-3-(3',5'-di-tert-butyl-4'-hydroxyphenyl) propionate, 4,4'-thiobis-(6-tert-butylphenol), 2-tert-butyl-6-(3-tert-butyl-2-hydroxy-5-methylbenzyl)-4-methylphenylacrylate, pentaerythritol tetrakis(3-laurylthiopropionate), 2,6-di-(tert-butyl)-4-methylphenol (BHT), 2,2-methylenebis-(6-tert-butyl-p-cresol), triphenyl phosphite, tris-(nonylphenyl) phosphite, dilauryl thiodipropionate, and ascorbic acid.

The amount of antioxidant (C) to be contained in the resin composition is determined as appropriate in view of the kind and amount of each component of the resin composition and the use and the storage conditions of the resin composition, and like factors. Usually, the amount of antioxidant (C) is in a ratio of 10 to 5000 ppm, and preferably 500 to 2000 ppm, based on the weight of the thermoplastic resin (A). When the amount of antioxidant (C) is too large, the reaction of the thermoplastic resin (A) and oxygen is inhibited, so that the oxygen scavenging function of the resin composition of the present invention may be insufficient, and the antioxidant (C) itself may serve as a cause of coloring. On the other hand, when the amount of antioxidant (C) is too small, the reaction with oxygen may proceed during storage or melt-kneading of the thermoplastic resin (A), so that the oxygen scavenging function may be impaired before the resin composition of the present invention is actually put to use.

For example, in the case where the thermoplastic resin (A) is stored at a comparatively low temperature or under an inert gas atmosphere, or in the case where the resin composition is produced by melt-kneading in a sealing with nitrogen, the amount of antioxidant (C) can be small. In the case where an oxidation catalyst is added in a comparatively large amount to facilitate oxidation, a resin composition having a good oxygen scavenging function can be obtained even when the thermoplastic resin (A) contains a certain amount of antioxidant (C).

Since the antioxidant (C) has the function of preventing the oxidation of the thermoplastic resin (A), the antioxidant (C) is often added in advance to the thermoplastic resin (A). In this regard, the antioxidant (C) may be added relatively later during the course of production in the case where the thermoplastic resin (A) do not come into contact with oxygen during the storage of the thermoplastic resin (A) or during the process of producing pellet or molded product by mixing with other components. Considering that the thermoplastic resin (A) itself is susceptible to oxidation, it is preferable to add the antioxidant (C) to the thermoplastic resin (A) after the thermoplastic resin (A) is produced and before the thermoplastic resin (A) comes into contact with oxygen.

For example, the antioxidant (C) can be added to the solvent after the polymerization in the production of the thermoplastic resin (A), added to the thermoplastic resin (A) obtained by removing the solvent after the polymerization, added when pelletizing the thermoplastic resin (A), or added directly to pellets by dry-blending.

(4) Matrix Resin (E)

As described above, the matrix resin (E) is contained as necessary in the oxygen-absorbing resin composition of the present invention. The matrix resin (E) serves as a support to dilute or disperse the thermoplastic resin (A), and has a function to provide the properties of the matrix resin (E) to the resin composition. The matrix resin (E) is selected as appropriate according to the purpose of use of the composition. For example, when gas barrier functions are to be provided to the composition of the present invention, a gas barrier resin is used as the matrix resin (E). When other functions are to be provided, a suitable resin is selected according to the purpose (which will be described below). For example, when the composition containing a gas barrier resin is processed into a specific molded product such as a container, this gas barrier resin functions to control the transfer of oxygen from outside through the molded product.

Among the matrix resins (E), the resin having a gas barrier properties, i.e., an oxygen transmission rate, of preferably 500 ml·20 μM/(m²·day·atm) or less (in 65% RH at 20° C.) are used as gas barrier resins (hereinafter may be simply referred to as gas barrier resins (E.1)). This oxygen transmission rate means the volume of oxygen that is to be transmitted through a film having an area of 1 m² and a thickness of 20 μm per day under a differential pressure of oxygen of 1 atm is 500 ml or less when measurement is performed in a relative humidity of 65% at a temperature of 20° C. If a resin having an oxygen transmission rate of more than 500 ml·20 μm/(m²·day·atm) is employed, the gas barrier properties of the resultant resin composition may be insufficient. The oxygen transmission rate of the gas barrier resin (E.1) is more preferably 100 ml·20 ml/(m²2 day-atm) or less, even more preferably 20 ml·20 μm/(m²·day·atm) or less, and most preferably 5 ml·20 μm/(m²·day·atm) or less. Such a gas barrier resin (E.1) and the thermoplastic resin (A) having carbon-carbon double bonds are contained, so that an oxygen trapping effect is exhibited in addition to the gas barrier properties, and consequently a resin composition having significantly high gas barrier properties can be obtained.

Typical examples of the above-described gas barrier resins (E.1) include a polyvinyl alcohol resin (E.1.1), a polyamide resin (E.1.2), a polyvinyl chloride resin (E.1.3), and a polyacrylonitrile resin (E.1.4), but the gas barrier resins are not limited thereto.

Among the gas barrier resins (E.1), the polyvinyl alcohol resin (E.1.1) is obtained by saponifying a vinyl ester homopolymer or a copolymer of a vinyl ester and another monomer (in particular, a copolymer of a vinyl ester and ethylene) using an alkaline catalyst or the like. A typical compound of the vinyl ester can be vinyl acetate, but other fatty acid vinyl esters (vinyl propionate, vinyl pivalate, etc.) can also be used.

The degree of saponification of the vinyl ester component of the polyvinyl alcohol resin is preferably 90% or more, more preferably 95% or more, and even more preferably 96% or more. If the degree of saponification is less than 90%, the gas barrier properties under high humidity may be impaired. Furthermore, when the polyvinyl alcohol resin is an ethylene-vinyl alcohol copolymer (EVOH), the thermal stability is insufficient, and the resultant molded product tends to contain gels and aggregates.

When the polyvinyl alcohol resin is a blend of at least two kinds of polyvinyl alcohol resins having different degrees of saponification, the average calculated based on the blend weight ratio is determined as the degree of saponification of the blend.

Among the polyvinyl alcohol resins described above, EVOH is preferable because the melt-molding is possible and its gas barrier properties under high humidity are good.

The ethylene content of EVOH is preferably in the range of 5 to 60 mol %. If the ethylene content is less than 5 mol %, the gas barrier properties under high humidity may be poor and the melt moldability may be impaired. The ethylene content of EVOH is preferably 10 mol % or more, more preferably 15 mol % or more, and most preferably 20 mol % or more. In contrast, if the ethylene content exceeds 60 mol %, sufficiently good gas barrier properties may not be obtained. The ethylene content is preferably 55 mol % or less, and more preferably 50 mol % or less.

The EVOH to be used preferably has an ethylene content of 5 to 60 mol % and a degree of saponification of 90% or more as described above. When the multilayered containers containing the resin composition of the present invention is desired to have an excellent impact delamination resistance, it is preferable to employ an EVOH having an ethylene content of 25 mol % or more and 55 mol % or less and a degree of saponification of 90% or more and less than 99%.

When EVOH is a blend of at least two kinds of EVOH having different ethylene contents, the average calculated based on the blend weight ratio is determined as the ethylene content of the blend. In this case, it is preferable that the difference in the ethylene content between the two EVOHs having the largest ethylene content difference from each other is 30 mol % or less and that the difference in the degree of saponification is 10% or less. If these conditions are not satisfied, the transparency of the resin composition may be impaired. The difference in the ethylene content is preferably 20 mol % or less, and more preferably 15 mol % or less. The difference in the degree of saponification is preferably 7% or less, and more preferably 5% or less. When multilayered containers containing the resin composition of the present invention is desired to have higher and balanced impact delamination resistance and gas barrier properties, it is preferable for use to blend an EVOH (E.1.1a) having an ethylene content of 25 mol % or more and 55 mol % or less and a degree of saponification of 90% or more and less than 99% with an EVOH (E.1.1b) having an ethylene content of 25 mol % or more and 55 mol % or less and a degree of saponification of 99% or more at a blend weight ratio (E.1.1a)/(E.1.1b) is 5/95 to 95/5.

The ethylene content and the degree of saponification of EVOH can be determined by nuclear magnetic resonance (NMR).

The EVOH can contain a small amount of a monomer unit other than the ethylene unit and the vinyl alcohol unit as a copolymer unit within a range no interfering with the objects of the present invention. Examples of such monomers include the following compounds: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides and anhydrides thereof; vinylsilane compounds such as vinyltrimethoxysilane, vinyltriethoxysilane, vinyltri(β-methoxy-ethoxy) silane, and γ-methacryloxypropyltrimethoxy-silane; unsaturated sulfonic acids and salts thereof; alkylthiols; and vinylpyrrolidones.

In particular, when the EVOH contains a vinylsilane compound as a copolymerized component in an amount of 0.0002 to 0.2 mol % and when the composition of the present invention containing the EVOH is formed into a multilayered structure together with a resin that is to serve as a base rasin (e.g., polyester; hereinafter may be abbreviated as PES) by coextrusion molding or coinjection molding, the consistency in melt viscosity of the EVOH with the base resin is improved, so that a uniformly molded product can be produced. As a vinylsilane compound, vinyltrimethoxysilane and vinyltriethoxysilane can be preferably used.

Furthermore, EVOH containing a boron compound is also effective in improving the melt viscosity of the EVOH, so that articles can be uniformly molded by coextrusion or coinjection. Here, examples of the boron compounds include a boric acid, a boric acid ester, a borate, and a boron hydridee. Specifically, examples of the boric acids include orthoboric acid (hereinafter may be referred to as "boric acid"), metaboric acid, and tetraboric acid; examples of the boric acid esters include triethyl borate and trimethyl borate; examples of the borates include alkali metal salts and alkaline-earth metal salts of the above-described boric acids, borax, and the like. Among these compounds, orthoboric acid is preferable.

If the boron compound is contained, the boron compound content is preferably in the range of 20 to 2000 ppm, and more preferably 50 to 1000 ppm, in terms of the boron element. With a boron compound being added within this range, EVOH with which torque variations during melting by heating is suppressed can be obtained. If the boron compound content is less than 20 ppm, this effect is minimal. On the other hand, if the boron compound content exceeds 2000 ppm, gelation tends to occur resulting in poor moldability.

It is also effective to add an alkali metal salt to the EVOH preferably in an amount of 5 to 5000 ppm in terms of the alkali metal element in order to improve interlayer adhesion and compatibility. The amount of alkali metal salt added is more preferably in the range of 20 to 1000 ppm, and even more preferably 30 to 500 ppm, in terms of the alkali metal element. Examples of the alkali metals include lithium, sodium, and potassium. Examples of the alkali metal salts include aliphatic carboxylates, aromatic carboxylates, phosphates, and metal complexes of alkali metals. For example, they include sodium acetate, potassium acetate, sodium phosphate, lithium phosphate, sodium stearate, potassium stearate, and a sodium salt of ethylenediaminetetraacetic acid, and among these, sodium acetate, potassium acetate and sodium phosphate are preferable.

It is also preferable to add a phosphate compound to the EVOH in an amount of 20 to 500 ppm, more preferably 30 to 300 ppm, and most preferably 50 to 200 ppm, in terms of thr phosphoric acid radicals. When a phosphate compound is blended with the EVOH in the above-described range, the thermal stability of the EVOH can be improved. In particular, generation of gels or aggregates and coloring when melt molding is carried out for a long period of time can be suppressed.

There is no particulate limitation regarding the kinds of phosphate compound added to the EVOH, and various kinds of acids such as phosphoric acid and phosphorous acid and salts thereof can be used. Phosphates may be in the form of primary phosphates, secondary phosphates or tertiary phosphates. There is no particulate limitation regarding the cationic species of phosphates, but cationic species are preferably alkali metals and alkaline-earth metals. Among these, it is preferable to add the phosphate compound in the form of sodium dihydrogenphosphate, potassium dihydrogenphosphate, disodium hydrogenphosphate, or dipotassium hydrogenphosphate.

A preferable melt flow rate (MFR) of the EVOH (210° C., 2160 g load, according to JIS K7210) is in the range of 0.1 to 100 g/10 min, more preferably 0.5 to 50 g/10 min, and even more preferably 1 to 30 g/10 min.

Among the gas barrier resins (E.1), the kind of the polyamide resin (E.1.2) is not particularly limited. Examples thereof include aliphatic polyamide homopolymers such as polycaproamide (Nylon-6), polyundecanamide (Nylon-11), polylaurolactam (Nylon-12), polyhexamethyleneadipamide (Nylon-6,6), and polyhexamethylenesebacamide (Nylon-6, 10); aliphatic polyamide copolymers such as a caprolactam/laurolactam copolymer (Nylon-6/12), a caprolactam/aminoundecanoic acid copolymer (Nylon-6/11), a caprolactam/ω-aminononanoic acid copolymer (Nylon-6/9), a caprolactam/hexamethylene adipamide copolymer (Nylon-6/6,6), and a caprolactam/hexamethylene adipamide/hexamethylene sebacamide copolymer (Nylon-6/6,6/6,10); and aromatic polyamides such as polymetaxylylene adipamide (MX-Nylon) and a hexamethylene terephthalamide/hexamethylene isophthalamide copolymer (Nylon-6T/6I). These polyamide resins (E.1.2) can be used alone or in a combination of two or more. Among these, polycaproamide (Nylon-6) and polyhexamethylene adipamide (Nylon-6,6) are preferable in view of gas barrier properties.

Examples of the polyvinyl chloride resins (E.1.3) include a homopolymer such as vinyl chloride homopolymer and vinylidene chloride homopolymer and a copolymer containing vinyl chloride or vinyl chloride and further containing vinyl acetate, a maleic acid derivative, a higher alkyl vinyl ether, or the like.

Examples of the polyacrylonitrile resin (E.1.4) include an acrylonitrile homopolymer and copolymers of acrylonitrile and an acrylic ester or the like.

As the gas barrier resin (E.1), one of the above-described resins can be used or two or more can be used in combination. Among those examples, the polyvinyl alcohol resin (E.1.1) are preferable, and the EVOH having an ethylene content of 5 to 60 mol % and a degree of saponification of 90% or more is more preferable.

For resins other than gas barrier resins (E.1) among the matrix resins (E), those that have desired properties are suitably selected according to the purpose as described above. Examples of such resins include the following resins: polyolefins such as polyethylene, polypropylene, ethylene-propylene copolymer, a copolymer including ethylene or propylene (a copolymer of ethylene or propylene and at least one of the following monomers: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; vinyl pyrrolidones and the like), poly(4-methyl-1-pentene), poly(1-butene) and the like; polyesters such as polyethylene terephthalate, polybutylene terephthalate, and polyethylene naphthalate; polystyrenes; polycarbonates; and polyacrylates such as polymethylmethacrylate. Among the above-described resins, polyolefins such as polyethylene and polypropylene can be preferably used in view of moldability of the resin composition.

It is possible to blend to the matrix resin (E) described above a thermal stabilizer, an ultraviolet absorber, a colorant, a filler or the like in advance, within a range no interfering with the objects of the present invention.

When the oxygen-absorbing resin composition of the present invention contains the matrix resin (E) as a resin component in addition to the thermoplastic resin (A), it is preferable to contain the thermoplastic resin (A) in a ratio of 30 to 1 wt % and to contain the matrix resin (E) in a ratio of 70 to 99 wt %, when the total weight of the thermoplastic resin (A) and the matrix resin (E) is 100 wt %. For example, when the matrix resin (E) is the gas barrier resin (E.1) and when the content of the matrix resin is less than 70 wt %, the gas barrier properties against oxygen gas or carbon dioxide gas may deteriorate. On the other hand, when the content of the matrix resin exceeds 99 wt %, the oxygen scavenging function may deteriorate since the content of the thermoplastic resin (A) is small. The content of the thermoplastic resin (A) is more preferably in the range of 20 to 2 wt %, even more preferably 15 to 3 wt %, and the content of the matrix resin (E) is more preferably 80 to 98 wt %, and even more preferably 85 to 97 wt %.

(5) Compatibilizer (F)

The compatibilizer (F) is contained, if necessary, for the purpose of improving the compatibility of resins and allowing the resultant resin composition to provide a stable morphology when the thermoplastic resin (A) and the matrix resin (E) are contained, or when another resin (G) which will be described later is further contained, in the resin composition of the present invention. For example, the compatibilizer (F) is added for the purpose of improving miscibility when the above-described resins are mixed therewith, and as a result, to sufficiently attain the effects in transparency, cleanability, oxygen absorbency, barrier properties, mechanical properties, product texture and the like. There is no particular limitation regarding the kind of compatibilizer (F), but the compatibilizer can be selected as appropriate according to the combination of the thermoplastic resin (A), the matrix resin (E) and the like that are to be used.

For example, when the matrix resin (E) is a highly polar resin such as a polyvinyl alcohol resin, the compatibilizer (F) is preferably a hydrocarbon polymer containing a polar group, or an ethylene-vinyl alcohol copolymer. For example, when the compatibilizer (F) is a hydrocarbon polymer containing a polar group, a polyhydrocarbon moiety in the polymer, the moiety accounting for the main portion, enhances the affinity between the compatibilizer (F) and the thermoplastic resin (A). Moreover, due to the polar group of the compatibilizer (F), the affinity between the compatibilizer (F) and the matrix resin (E) is improved. As a result, the resultant resin composition can be provided with a stable morphology.

Examples of monomers that can form the polyhydrocarbon moiety that accounts for the main portion of the hydrocarbon polymer containing a polar group include the followings: α-olefins such as ethylene, propylene, 1-butene, isobutene, 3-methyl pentene, 1-hexene, and 1-octene; styrenes such as styrene, α-methylstyrene, 2-methylstyrene, 4-methylstyrene, 4-propylstyrene, 4-tert-butylstyrene, 4-cyclohexylstyrene, 4-dodecylstyrene, 2-ethyl-4-benzylstyrene, 4-(phenylbutyl) styrene, 2,4,6-trimethylstyrene, monofluorostyrene, difluorostyrene, monochlorostyrene, dichlorostyrene, methoxystyrene, and tert-buthoxystyrene; vinylnaphthalenes such as 1-vinylnaphthalene and 2-vinylnaphthalene the like; vinylene group-containing aromatic compounds such as indene and acenaphthylene; and conjugated diene compounds such as butadiene, isoprene, 2,3-dimethyl butadiene, pentadiene, and hexadiene. The hydrocarbon polymer may primarily contain one of these monomers, or may be primarily contain two or more of these monomers.

Using above-described monomers, a hydrocarbon polymer containing a polar group is prepared as described below, and the monomer forms a polyhydrocarbon moiety corresponding to one of the following polymers: olefin polymers such as polyethylene (very low density polyethylene, low density polyethylene, linear low density polyethylene, medium density polyethylene or high density polyethylene), ethylene-(meth)acrylic ester (methyl ester, ethyl ester, etc.) copolymer, ethylene-vinyl acetate copolymer, ethylene-vinyl alcohol copolymer, polypropylene, ethylene-propylene copolymer; stylene polymers such as polystyrene, styrene-acrylonitrile copolymer, styrene-acrylonitrile-butadiene copolymer, styrene-diene block copolymer (styrene-isoprene diblock copolymer, styrene-butadiene diblock copolymer, styrene-isoprene-styrene triblock copolymer, etc.) and styrene-hydrogenated diene block polymer which is a hydrogenated product thereof; (meth)acrylic ester polymers such as polymethyl acrylate, polyethyl acrylate, and polymethyl methacrylate; halogenated vinyl polymers such as polyvinyl chloride and vinylidene fluoride; semi-aromatic polyesters such as polyethylene terephthalate and polybutylene terephthalate; aliphatic polyesters such as polyvalerolactone, polycaprolactone, polyethylene succinate, and polybutylene succinate. Among these, styrene-diene block copolymers (styrene-isoprene diblock copolymer, styrene-butadiene diblock copolymer, styrene-isoprene-styrene triblock copolymer, etc.) and styrene-hydrogenated diene block polymers which are hydrogenated products thereof are preferable.

There is no particular limitation regarding the polar group contained in the compatibilizer (F), but an oxygen-containing functional group is preferable. Specific examples include active hydrogen-containing polar groups (—$SO_3H$, —$SO_2H$, —SOH, —$CONH_2$, —CONHR, —CONH—, —OH, etc.), nitrogen-containing polar groups that are free from active hydrogen (—NCO, —OCN, —NO, —$NO_2$, —$CONR_2$, —CONR—, etc.), an epoxy group, carbonyl group-containing polar groups (—CHO, —COOH, —COOR, —COR, >C=O, —CSOR, —CSOH, etc.), phosphorus-containing polar groups (—$P(OR)_2$, —$PO(OR)_2$, —$PO(SR)_2$, —PS$(OR)_2$, —PO(SR)(OR), —PS(SR)(OR), etc.), boron-containing polar groups, and the like. Here, in the above formulae, R represents an alkyl group, a phenyl group or an alkoxy group.

There is no particular limitation regarding a method for producing the hydrocarbon polymer containing the polar group. Examples include the following methods: 1) a method of copolymerizing a monomer that can form the polyhydrocarbon moiety and a monomer containing a polar group (or a group that can form the polar group); 2) a method of utilizing an initiator or a chain transfer agent having the above-described polar group (or a group that can form the polar group) when polymerizing monomers that can form the polyhydrocarbon moiety; 3) a method of subjecting monomers that can form the polyhydrocarbon moiety to living polymerization and utilizing a monomer having the above-described polar group (or a group that can form the polar group) as a terminator (i.e., an end treatment agent); and 4) a method of polymerizing monomers that can form the polyhydrocarbon moiety, a monomer having the above-described polar group (or a group that can form the polar group) to a reactive moiety of the resultant polymer, for example, a carbon-carbon double bond moiety by a reaction. In the method 1), any one of polymerization method of random copolymerization, block copolymerization and graft copolymerization can be employed when performing copolymerization.

When the compatibilizer (F) is a hydrocarbon polymer, particularly preferable polar groups are carboxyl groups such as a carboxyl group, a carboxylic acid anhydride group, and a carboxylate group, boron-containing polar groups such as a boronic acid group, a boronic ester group, a boronic acid anhydride group, and a boronate group.

When the polar group is a carboxyl group, the resultant resin composition has high thermal stability. As described above, when the resin composition contains a transition metal salt (B) in an excessive amount, the thermal stability of the resin composition may be deteriorated, but when a compatibilizer (F) having a carboxyl group is contained together with the transition metal salt (B), the thermal stability of the resin composition can be maintained. The reason of this effect is not clear, but it is presumed that this is caused by some interaction between the transition metal salt (B) and the compatibilizer (F). When the polar group is a boron-containing polar group, the compatibility of the thermoplastic resin (A) and the matrix resin (E) is significantly improved in the resultant resin composition, and stable morphology can be provided.

Such polar group-containing compatibilizers are disclosed in detail in, for example, Japanese Laid-Open Patent Publication No. 2002-146217. Among the compatibilizers disclosed therein, a styrene-hydrogenated diene block copolymer containing a boronic ester group is preferable.

As described above, an ethylene-vinyl alcohol copolymer can also be used as the compatibilizer (F). In particular, when the matrix resin (E) is EVOH, its effect as a compatibilizer is sufficiently exhibited. Among these, an ethylene-vinyl alcohol copolymer having an ethylene content of 70 to 99 mol % and a degree of saponification of 40% or more is preferable in view of compatibility improvement. The ethylene content is more preferably 72 to 96 mol %, and even more preferably 72 to 94 mol %. When the ethylene content is less than 70 mol %, the affinity with the thermoplastic resin (A) may be deteriorated. When the ethylene content exceeds 99 mol %, the affinity with the EVOH may be deteriorated. Furthermore, the degree of saponification is preferably 45% or more. There is no particular limitation regarding upper limit of the degree of saponification, and those that have a degree of saponification of substantially 100% can be used as well. When the degree of saponification is less than 40%, the affinity with the EVOH may be deteriorated.

The compatibilizers (F) described above can be used alone or in combination of two or more.

When the oxygen-absorbing resin composition of the present invention contains the matrix resin (E) and the compatibilizer (F) as resin components in addition to the thermoplastic resin (A), it is preferable that the thermoplastic resin (A) is contained in a ratio of 29.9 to 1 wt %, the matrix resin (E) is contained in a ratio of 70 to 98.9 wt %, and the compatibilizer (F) is contained in a ratio of 29 to 0.1 wt %, when the total weight of the thermoplastic resin (A), the matrix resin (E) and the compatibilizer (F) is 100 wt %. If the content of the matrix resin (E) is less than 70 wt %, the gas barrier properties of the resin composition against oxygen gas or carbon dioxide gas may deteriorate. On the other hand, if the content of the matrix resin (E) exceeds 98.9 wt %, the oxygen scavenging function may deteriorate, and the stability of the morphology of the entire resin composition may be impaired since the contents of the thermoplastic resin (A) and the compatibilizer (F) are small. The content of the thermoplastic resin (A) is more preferably in the range of 19.5 to 2 wt % and even more preferably 14 to 3 wt %. The content of the matrix resin (E) is more preferably in the range of 80 to 97.5 wt % and even more preferably 85 to 96 wt %. The content of the compatibilizer (F) is more preferably in the range of 18 to 0.5 wt % and even more preferably 12 to 1 wt %.

(6) Other Thermoplastic Resins (G) and Additives

The oxygen-absorbing resin composition of the present invention may contain a thermoplastic resin (G) other than the thermoplastic resin (A), the matrix resin (E) and the compatibilizer (F) insofar as the effects of the present invention are not impaired. The thermoplastic resins (G) are not particularly limited. When the matrix resin (E) is the gas barrier resin (E.1), examples of the thermoplastic resin (G) include the following resins: polyolefins such as polyethylene, polypropylene, ethylene-propylene copolymer, a copolymer including ethylene or propylene (copolymer including ethylene or propylene and at least one of the following monomers as a copolymerized unit: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; vinyl pyrrolidones and the like), poly(4-methyl-1-pentene), and poly(1-butene); polyesters such as polyethylene terephthalate, polybutylene terephthalate, and polyethylene naphthalate; polystyrenes; polycarbonates; and polyacrylates such as polymethylmethacrylate.

The thermoplastic resin (G) can be contained in a ratio of 10 wt % or less of the total weight of the resin composition.

In the resin composition of the present invention, various additives may be added within the range not interfering with the functions and effects of the present invention. Examples of such additives include plasticizers, thermal stabilizers (melt stabilizers), photoinitiators, deodorants, ultraviolet absorbers, antistatic agents, lubricants, colorants, fillers, drying agents, filling agents, pigments, dyes, processing aids, flame retardants, antifogging agents, and other polymeric compounds. Such additives are disclosed in detail, for example, in Japanese Laid-Open Patent Publication No. 2002-146217.

(7) Oxygen-Absorbing Resin Composition and Molded Products Using the Same

The oxygen-absorbing resin composition of the present invention contains, as described above, the thermoplastic resin (A) and the transition metal salt (B), and as necessary, the antioxidant (C), the transition metal compound (D), the matrix resin (E), the compatibilizer (F), the other thermoplastic resins (G), and various additives.

In the oxygen-absorbing resin compositions of the present invention that contain a certain resins other than the thermoplastic resin (A), such as the matrix resin (E), it is recommended that particles of the thermoplastic resin (A) are dispersed in a matrix containing resin(s) other than the thermoplastic resin (A) (i.e., at least one of the matrix resin (E), the compatibilizer (F) and the thermoplastic resin (G)), the transition metal salt (B), and as necessary, the antioxidant (C), the transition metal compound (D), and various additives. For example, when the oxygen-absorbing resin composition of the present invention is composed of the thermoplastic resin (A) and the matrix resin (E), it is recommended that particles of the thermoplastic resin (A) are dispersed in the matrix of the matrix resin (E). Various molded products made of the composition of such a configuration have a particularly excellent oxygen scavenging function and excellent transparency. Moreover, the function of the matrix resin (E) is sufficiently provided. For example, when the matrix resin (E) is a gas barrier resin (E.1), molded products exhibit good gas barrier properties.

The average particle size of the particles of the thermoplastic resin (A) is preferably such that the major axis thereof is 4 μm or less, more preferably 2 μm or less and even more preferably 1 μm or less, and the minor axis thereof is 3 μm or less, more preferably 1 μm or less and even more preferably 0.5 μm or less. Such an average particle size of the thermoplastic resin (A) is obtained as a result of measurement by an osmium staining method as described in the examples below.

By setting the particle size to such values, improved oxygen absorbency can be obtained. Although a specific reason for the improved oxygen absorbency is not clear, it is presumed that as the thermoplastic resin (A) is oxidized, crosslinked products are formed at the interface between the thermoplastic resin (A) and the matrix resin (E), thereby preventing oxygen from entering into the thermoplastic resin (A), or that the transition metal salt (B) remains in the vicinity of the interface between the thermoplastic resin (A) and the matrix resin (E), and thus an oxidation reaction is unlikely to occur in the internal portion of the thermoplastic resin (A). When the particle size is large, the oxygen absorbency may be insufficient.

Furthermore, when the matrix resin (E) is a highly polar resin such as a polyvinyl alcohol resin, it is preferable that the thermoplastic resin (A) has the above-described hydrophilic functional group (a hydroxyl group, an alkoxy group having 1 to 10 carbon atoms, an amino group, an aldehyde group, a carboxyl group, an epoxy group, an ester group, a carboxylic anhydride group, a boron-containing polar group (e.g., a boronic acid group, a boronic ester group, a boronic anhydride group, a boronate group), etc. In particular, it is preferable that the thermoplastic resin (A) has a hydroxyl group, an epoxy group or an acid anhydride group.

Moreover, when the oxygen-absorbing resin composition of the present invention contains a suitable amount of the compatibilizer (F), the effects described above can be consistently obtained.

A preferable melt flow rate (MFR) (210° C., 2160 g load, according to JIS K7210) of the oxygen-absorbing resin composition of the present invention is 0.1 to 100 g/10 min, more preferably 0.5 to 50 g/10 min, and even more preferably 1 to 30 g/10 min. When the melt flow rate of the resin composition of the present invention fails to fall within the above range, the processability during melt-molding may often become poor.

The oxygen absorption rate of the oxygen-absorbing resin composition of the present invention is preferably 0.01 ml/(g·day) or more, and more preferably 0.05 ml/(g·day) or more. Here, the oxygen absorption rate is a volume of oxygen that is absorbed by a film made of the resin composition per unit weight of in a unit time, when the film is left to stand in the air with a predetermined volume. A specific measurement method will be shown in Examples described below. The composition can be formed into a molded product having a desired shape by mixing and molding the components of the composition as described below.

The oxygen-absorbing resin composition of the present invention can exhibit a high oxygen absorption rate during the initial stage, i.e., within 1 to 3 days after production. The oxygen-absorbing resin composition of the present invention, even when a gas barrier resin is used as the matrix resin (E), can be configured to exhibit an initial oxygen absorption rate per mol of carbon-carbon double bond as measured until the third day in 100% RH at 23° C. according to the method described below of 0.10 mol/day or more, or can be configured to exhibit 0.15 mol/day or more.

In the oxygen-absorbing resin composition of the present invention, high transparency can be achieved, even when the thermoplastic resin (A) and the matrix resin (E) have different refractive indexes. The inner haze of the resin composition of the present invention can be controlled to 10 or less, more preferably 5.0 or less, and even more preferably 1.0 or less, even when the matrix resin (E) is contained and the components (A) and (E) do not have the same refractive index.

The components of the oxygen-absorbing resin composition of the present invention are mixed and processed into a desired product. A method for mixing the components of the resin composition of the present invention is not particularly limited. The order of mixing the components is also not particularly limited. For example, when the thermoplastic resin (A), the transition metal salt (B), the matrix resin (E), the compatibilizer (F) and the antioxidant (C) are mixed, they may be mixed simultaneously, or the thermoplastic resin (A), the antioxidant (C), the transition metal salt (B) and the compatibilizer (F) may be mixed first and then the matrix resin (E) is mixed therewith. Alternatively, the thermoplastic resin (A), the antioxidant (C) and the compatibilizer (F) may be mixed first, and then the transition metal salt (B) and the matrix resin (E) may be mixed therewith; or the transition metal salt (B) and the matrix resin (E) may be mixed first, and then the thermoplastic resin (A), the antioxidant (C) and the compatibilizer (F) may be mixed therewith. Moreover, the thermoplastic resin (A), the antioxidant (C), the matrix resin (E) and the compatibilizer (F) may be mixed first, and then the transition metal salt (B) may be mixed therewith; or the transition metal salt (B) and the compatibilizer (F) may be mixed first, and then the thermoplastic resin (A), the antioxidant (C) and the matrix resin (E) may be mixed therewith. In addition, a mixture obtained by mixing the thermoplastic resin (A), the antioxidant (C), the matrix resin (E) and the compatibilizer (F) may be mixed with a mixture obtained by mixing the transition metal salt (B) and the matrix resin (E).

A specific mixing method is preferably the melt-kneading method in view of the process simplicity and the cost. In this case, it is preferable to use an apparatus that has high kneading ability to allow the components to be finely and uniformly dispersed, because this can provide good oxygen absorbency and good transparency and can prevent gels and aggregates from being generated or mixed.

Examples of apparatuses that can provide high kneading level include continuous kneaders such as a continuous intensive mixer, a kneading-type twin screw extruder (co-rotation or counter-rotation), a mixing roll, and a Ko-kneader; batch kneaders such as a high-speed mixer, a Banbury mixer, an intensive mixer, and a pressure kneader; an apparatus using a rotary disk having a trituration mechanism such as a stone mill, for example, KCK kneading extruder from KCK Co., Ltd.; an apparatus with a single screw extruder provided with a kneading section (e.g., Dulmage and CTM); simple kneaders such as a ribbon blender and a Brabender mixer. Among these apparatuses, continuous kneaders are preferable. Examples of commercially available continuous intensive mixers include FCM from Farrel Corp., CIM from The Japan Steel Works, Ltd., and KCM, LCM and ACM from Kobe Steel, Ltd. It is preferable to employ an apparatus equipped with a single screw extruder downstream of such a kneader to perform kneading and extrusion-pelletizing simultaneously. Moreover, examples of twin screw kneading extruders equipped with a kneading disk or a kneading rotor include TEX from Japan Steel Works, Ltd., ZSK from Werner & Pfleiderer Corp., TEM from Toshiba Machine Co., Ltd., and PCM from Ikegai Tekko Co, Ltd. A single kneader may be used, or two or more kneaders may be coupled for use.

The kneading temperature is usually in the range of 50 to 300° C. It is preferable to perform extrusion at low temperatures with the hopper port sealed with nitrogen in order to prevent the oxidation of the thermoplastic resin (A). The longer the kneading time is, the better the results is. However, in view of prevention of the oxidation of the thermoplastic resin (A) and the production efficiency, the kneading time is usually 10 to 600 seconds, preferably 15 to 200 seconds, and even more preferably 15 to 150 seconds.

The resin composition of the present invention can be molded into various molded products such as films, sheets, containers, or other packaging materials by using various molding methods as appropriate. In this instance, the resin composition of the present invention may be pelletized first and then subjected to molding, or the components of the resin composition may be dry-blended and subjected directly to molding.

With respect to molding methods and molded products, for example, the resin composition can be molded into films, sheets, pipes and the like by melt extrusion molding, into containers by injection molding, and into bottle-like hollow containers by blow molding. For blow molding, it is preferable to employ extrusion blow molding where a parison is formed by extrusion molding and blown to obtain a molded product, as well as injection blow molding where a preform is formed by injection molding and is blown to obtain a molded product.

In the present invention, a molded product produced by the above-described molding method may be composed of a single layer, but it is preferable that the molded product is in the form of a multilayered structure obtained by laminating layers made of the resin composition of the present invention and other layers, in view of providing characteristics such as mechanical properties, water vapor barrier properties, and additional oxygen barrier properties.

Examples of a layer structure of the multilayered structure includes x/y, x/y/x, x/z/y, x/z/y/z/x, x/y/x/y/x, and x/z/y/z/x/z/y/z/x where x denotes a layer made of a resin other than the resin composition of the present invention, y denotes a layer of the resin composition of the present invention, and z denotes an adhesive resin layer, but the structure is not limited to these examples. When a plurality of x layers are provided, the kind of each layer may be the same or different. A layer of a recovered resin made of scraps generated by trimming during molding may be separately formed, or such a recovered resin may be blended in a layer made of another resin. The thickness of each layer of the multilayered structure is not particularly limited. The ratio of the thickness of the y layer relative to the total thickness of all the layers is preferably 2 to 20% in view of the moldability, the cost or the like.

A thermoplastic resin is preferable as a resin for use in the x layer in view of the processability or the like. Examples of such a thermoplastic resin include, but are not limited to, the following resins: polyolefins such as polyethylene, polypropylene, ethylene-propylene copolymer, a copolymer including ethylene or propylene (a copolymer including ethylene or propylene and at least one of the following monomers: α-1-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; vinyl pyrrolidones and the like), poly(4-methyl-1-pentene), and poly(1-butene); polyesters such as polyethylene terephthalate, polybutylene terephthalate, and polyethylene naphthalate; polyamides such as poly ε-caprolactam, polyhexamethylene adipamide, and polymetaxylylene adipamide; polyvinylidene chloride; polyvinyl chloride; polystyrenes; polyacrylonitriles; polycarbonates; and polyacrylates. The layer made of such a thermoplastic resin may be not oriented, or uniaxially or biaxially oriented or rolled.

Among the thermoplastic resins, polyolefins are preferable because of their moisture-resistance, mechanical properties, economy, heat sealing properties and the like. Polyesters are preferable because of their mechanical properties, heat resistance and the like.

On the other hand, there is no particular limitation regarding the adhesive resin for use in the z layer, as long as it can bind the layers each other. Preferably used are polyurethane or polyester one-component or two-component curing adhesives, and carboxylic acid-modified polyolefin resins and the like. The carboxylic acid-modified polyolefin resin is an olefin polymer or a copolymer including a unsaturated carboxylic acid or an anhydride thereof (e.g., maleic anhydride) as a copolymerized component; or a graft copolymer obtained by grafting an unsaturated carboxylic acid or an anhydride thereof to an olefin polymer or a copolymer.

Among these, a carboxylic acid-modified polyolefin resin is more preferable. In particular, the adhesion with the y layer is superior when the x layer is a polyolefin resin. Examples of such a carboxylic acid-modified polyolefin resin include a resin obtained by carboxylic acid modification of a polyethylene (very low density polyethylene, low density polyethylene, linear low density polyethylene), polypropylene, polypropylene copolymer, an ethylene-vinyl acetate copolymer, and an ethylene-(meth)acrylic ester (methyl ester, ethyl ester or the like) copolymer.

Examples of methods for producing the multilayered structure include, but are not limited to, extrusion lamination, dry lamination, coinjection molding, and coextrusion molding. Examples of coextrusion molding include coextrusion lamination, coextrusion sheet molding, blown film coextrusion, and coextrusion blow molding.

A sheet, film, parison and the like of the thus obtained multilayered structure may further be reheated at a temperature below the melting point of the contained resins and uniaxially or biaxially stretched by thermoforming such as draw forming, rolling, pantographic orientation, blown film orientation or extrusion blow molding, so that a stretched molded product can be obtained.

The molded products using the multilayered structure can be used in various applications. In particular, the advantages provided by the multilayered structure are prominent when the multilayered structure is used as a multilayered container. Furthermore, a multilayered structure in which layers having strong water vapor barrier properties are provided on both sides of a layer made of the resin composition of the present invention or on the side exposed to high humidity when the multilayered structure is used is preferable in that the retention period of oxygen scavenging function of the multilayered structure is particularly prolonged, and as a result, very strong gas barrier properties can be maintained for a long time. On the other hand, a multilayered container having the resin composition layer as the innermost layer is preferable in that the oxygen scavenging function is promptly exerted inside the container.

Furthermore, the resin composition of the present invention exhibits good transparency by selecting an appropriate resin. Thus, such a composition is most suitable for use as a packaging container through which the content thereof is clearly visible. In connection with such packaging containers, the following two embodiments of packaging containers satisfy a strict requirement for transparency and thus particularly receive a benefit from the resin composition of the present invention. That is, one embodiment is a container composed of a multilayered film having a total thickness of 300 µm or less and including a layer made of the resin composition of the present invention, and the other embodiment is a multilayered container including at least one layer made of the resin composition of the present invention and at least one thermoplastic polyester (PES) layer. Embodiments of such containers will be described below in this order.

The container composed of a multilayered film having a total thickness of 300 µm or less and including a layer made of the resin composition of the present invention is a flexible container composed of a multilayered structure having a relatively small total thickness and is usually processed into the form of a pouch or the like. This container has excellent gas barrier properties and, in addition, has a continuous oxygen scavenging function, and the production thereof is simple. Thus, this container is very useful for packaging of a product that is high sensitivity to oxygen and susceptible to degradation.

In the thin multilayered film having a total thickness of 300 µm or less, even if the transparency thereof is deteriorated over time, the extent of transparency deterioration is small, and consequently the transparency of the multilayered film container can be maintained. As described above, the thickness of this multilayered film is preferably 300 µm or less, more preferably 250 µm or less, and even more preferably 200 µm or less, to retain the good transparency and flexibility. On the other hand, the total thickness of all layers is preferably 10 µm or more, more preferably 20 µm or more, and even more preferably 30 µm or more, in view of the mechanical strength as a container.

When producing the multilayered container composed of a multilayered film having a total thickness of 300 µm or less, there is no particular limitation regarding a method for producing the multilayered film. For example, the multilayered film can be obtained by laminating a layer of the resin composition of the present invention and a layer of another thermoplastic resin by a technique such as dry lamination or coextrusion lamination.

In the case of dry lamination, non-oriented films, uniaxially oriented films, biaxial oriented films, rolled films and the like can be used. Among such films, a biaxially oriented polypropylene film, a biaxially oriented polyethylene terephthalate film and a biaxially oriented poly ε-caprolactam film are preferable in view of mechanical strength. The biaxially oriented polypropylene film is particularly preferable also in view of moisture-resistance. When a non-oriented film or an uniaxially oriented film is used, the laminated film may be re-heated and stretched uniaxially or biaxially by thermoforming such as draw forming, rolling, pantographic orientation or blown film orientation, so that an oriented multilayered film can be formed.

In order to seal the obtained multilayered container, it is also preferable to form a layer made of a heat-sealable resin on at least one outermost layer surface of the multilayered film in the process of producing multilayered film. Such heat-sealable resins include polyolefins such as polyethylene, and polypropylene.

The thus obtained multilayered film can be processed into, for example, a bag shape and thus can be used as a packaging container to be filled with a material. Such a packaging container is flexible and convenient, and has good transparency and oxygen scavenging properties, and therefore it is very useful for packaging of materials that are susceptible to degradation in the presence of oxygen, in particular, for food or the like.

The multilayered container including at least one layer made of the resin composition of the present invention and at least one PES layer has superior gas barrier properties and an excellent oxygen scavenging function, and in addition, exhibits good transparency by selecting an appropriate resin. Therefore, the multilayered container is used in various forms such as a bag-shaped container, cup-shaped container, blow-molded container or the like. Among these, this embodiment can be applied particularly well to blow-molded containers, especially bottles.

For PES for use in the multilayered container of the present invention including a layer made of the thermoplastic resin composition of the present invention and the PES layer, a condensation polymer including an aromatic dicarboxylic acid or an alkyl ester thereof and a diol as main components is used. In particular, PES including ethylene terephthalate as the main component is preferable in attaining the purpose of the present invention. Specifically, the total ratio (mol %) of a terephthalic acid unit and an ethylene glycol unit is preferably 70 mol % or more, and more preferably 90 mol % or more, of the total moles of all the structural units of the PES. If the total ratio of the terephthalic acid unit and the ethylene glycol unit is less than 70 mol %, the resultant PES is amorphous, so that mechanical strength is insufficient. In addition, when a container is formed by stretching and then materials are hot-filled into the container, the thermal contraction is so large that it may make not be put to practical use. Moreover, when solid-phase polymerization is carried out to reduce oligomers contained in the resin, sticking is likely to occur due to the softening of the resin, which may make production difficult. The PES described above may contain as necessary a bifunctional compound unit other than the terephthalic acid unit and the ethylene glycol unit. More specifically, the PES may contain a neopentyl glycol unit, a cyclohexane dimethanol unit, a cyclohexane dicarboxylic acid unit, an isophthalic acid unit, a naphthalenedicarboxylic acid unit or the like in the range where the above-described problems are not caused. There is no particular limitation regarding a method for producing the PES, and a known method can be selected as appropriate.

The method for producing the multilayered container of the present invention including at least one layer made of the resin composition and at least one PES layer is not particularly limited, but it is preferable to employ coinjection blow molding in view of productivity. In coinjection blow molding, the container is produced by subjecting a container precursor (parison) obtained by coinjection molding to stretch blow molding.

In coinjection molding, in general, the resins to constitute the layers of the multilayered structure are each guided into concentric nozzles from two or more injection cylinders and are injected into a single mold simultaneously or alternately at non-synchronized timings, and one clamping operation is then performed for molding. For example, a parison may be produced by, but not limited to, the following methods: (1) PES layers for the inner and outer layers are first injected, then the resin composition for the intermediate layer is injected, thereby giving a molded container of a three-layer structure of PES/resin composition/PES; and (2) PES layers for the inner and outer layers are first injected, then the resin composition is injected, and another PES layer is injected simultaneously with the injection of the resin composition or thereafter, thereby giving a molded container of a five-layer structure of PES/resin composition/PES/resin composition/PES. Moreover, an adhesive resin layer may be disposed as necessary between the resin composition layer and the PES layer in the above-described layered structures.

Regarding the conditions for injection molding, the PES is preferably injected at a temperature in the range of 250 to 330° C., more preferably 270 to 320° C., and even more preferably 280 to 310° C. If the injection temperature for PES is lower than 250° C., the PES does not sufficiently melt, and the resultant molded product may contain non-molten substances (i.e., fisheyes), thereby worsening the appearance, and moreover, causing the deterioration of the mechanical strength of the molded product. In some extreme cases, the screw torque for the PES injection may increase, so that the molding machine may have operational malfunction. On the other hand, if the injection temperature for PES exceeds 330° C., decomposition of PES is significant, which may lead to a lowered molecular weight, so that mechanical strength of the molded product may be lowered. Moreover, gases such as acetaldehyde generated during the decomposition may deteriorate the properties of the materials to be filled into the molded product, and in addition, the oligomers generated during the decomposition may stain the mold significantly, the resultant molded product has a poor appearance.

The resin composition is preferably injected at a temperature in the range of 170 to 250° C., more preferably 180 to 240° C., and even more preferably 190 to 230° C. If the injection temperature for resin composition is lower than 170° C., the resin composition may not sufficiently melt, and the resultant molded product may contain non-molten substances (i.e., fisheyes), thereby worsening the appearance. In some extreme cases, the screw torque for the injection may increase, so that the molding machine nay have operational malfunction. On the other hand, when the injection temperature for resin composition exceeds 250° C., oxidation of the thermoplastic resin (A) may proceed, so that the gas barrier properties and oxygen scavenging function of the resin composition may be degraded. At the same time, the resultant molded product may have a poor appearance by coloring and gelled materials, or the fluidity of the resin composition being injected may be disordered or blocked by the decomposition gas and gelled materials, so that the resin composition layer may have failed areas. In some extreme cases, gelled materials make it impossible to perform injection molding. It is preferable to seal the supply hopper with nitrogen in order to suppress the progress of the oxidation of the composition during melting.

The resin composition of the present invention may be first formed into pellets by melt-blending raw material components, and then the pellets may be supplied to the molding machine. Alternatively, the components may be dry-blended, and then the dry blend may be fed to the molding machine.

The total thickness of the thus obtained parison is preferably in the range of 2 to 5 mm, and the total thickness of the resin composition layer(s) is preferably in the range of 10 to 500 μm.

The above-described parison is directly in its high-temperature state, otherwise after having been re-heated with a heating member such as a block heater, infrared heater or the like, transferred to the stretch blowing process. In the stretch blowing process, the heated parison is stretched one- to five-fold in the machine direction and then blown one- to four-fold with compressed air or the like, so that the injection blow-molded multilayered container of the present invention can be produced. The temperature of the parison is preferably in the range of 75 to 150° C., more preferably 85 to 140° C., even more preferably 90 to 130° C., and most preferably 95 to 120° C. If the temperature of the parison exceeds 150° C., the PES tends to be crystallized, which may result in whitening in the resultant container or increased interlayer delaminatin in the container. On the other hand, if the temperature of the parison is less than 75° C., the PES may be crazed and appear in a pearl-like color, so that the transparency of the container may be impaired.

The total thickness of the body part of the thus obtained multilayered container is usually in the range of 100 to 2000 μm and preferably 150 to 1000 μm, and may vary depending on the use. In this instance, the total thickness of the resin composition layers is preferably in the range of 2 to 200 μm, and more preferably 5 to 100 μm.

In this manner, the multilayered container including the layer made of the resin composition of the present invention and the PES layer is obtained. The container can attain high transparency and have excellent gas barrier properties and oxygen scavenging function, and does not generate any odorous substance from oxygen absorption. The container is therefore of use as a container for materials susceptible to degradation in the presence of oxygen, such as foods and pharmaceutical products. In particular, it is of significant use as a container for foods and beverages such as beer with which flavor is important.

Furthermore, the resin composition of the present invention is suitable for use as a container packing (gasket), especially as a gasket for container cap. In this case, there is no particular limitation regarding the material of the cap body, and the materials that are generally used in the art of thermoplastic resins and metals can be used. The cap furnished with this gasket exhibits excellent gas barrier properties and a long-lasting oxygen scavenging function, and does not generate any odorous substance from oxygen absorption. Therefore, this cap is very useful as a cap used for containers of a product that is high sensitivity to oxygen and susceptible to degradation, in particular, foods and beverages with which flavor is important.

EXAMPLES

Hereinafter, the present invention will be described in more detail by way of examples, but the invention is not limited thereto. In the following examples and comparative examples, analysis and evaluation were performed in the following manner.

(1) Molecular Structure of the Thermoplastic Resin (A):

The molecular structure was determined based on the spectrum obtained by $^1$H-NMR (nuclear magnetic resonance) measured using deuterated chloroform as a solvent ("JNM-GX-500 Model" manufactured by JEOL Ltd. was used).

(2) Ratio of the Trans Structural Units in the Thermoplastic Resin (A):

The ratio was determined based on the spectrum obtained by $^{13}$C-NMR (nuclear magnetic resonance) measured using deuterated chloroform as a solvent ("JNM-GX-500 Model" manufactured by JEOL Ltd. was used).

(3) Weight Average Molecular Weight and Number Average Molecular Weight of Thermoplastic Resin (A):

Measurement was performed by gel permeation chromatography (GPC), and the values were represented in terms of polystyrene. The detail conditions of the measurement are as follows:

<Analytical Conditions>

Apparatus: gel permeation chromatography (GPC) SYSTEM-11 manufactured by Shodex
Column: KF-806L (Shodex) (column temperature: 40° C.)
Mobile phase: tetrahydrofuran (THF) (flow rate: 1.0 ml/min)
Run: 15 min Detector: RI
Filtration: 0.45 µm filter
Concentration: 0.1%
Injection amount: 100 µl
Specimen: polystyrene
Analysis: Empower The amount of oligomer having a molecular weight of 1000 or less was calculated by dividing the area of the portion corresponding to the molecular weight of 1000 or less in terms of polystyrene by the total peak area in a chart of the above-described GPC.

(4) Ethylene Content and Degree of Saponification of EVOH:

The ethylene content and the degree of saponification of EVOH were calculated based on the spectrum obtained by $^1$H-NMR measured using deuterated dimethyl sulfoxide as a solvent ("JNM-GX-500" manufactured by JEOL Ltd., was used).

(5) Size of Thermoplastic Resin (A) Particles Dispersed in Resin Composition:

Measurement was performed by the two methods (method a and method b) described below:

(5.1) Method a (ordinary observation method): The components of the resin composition were kneaded and molded, so that a film having a predetermined thickness was obtained. According to a standard method, this film was cut with a microtome in a direction perpendicular to the film surface, and platinum was vapor-deposited in a reduced pressure atmosphere on the cross-section exposed by the cutting. The cross-section on which platinum had been vapor-deposited was photographed using a scanning electron microscope (SEM) at 10000-fold magnification. An area containing about 20 particles of the thermoplastic resin (A) was selected in this photograph and the particle size of each particle image present in the area was measured. The average was calculated and employed as the size of dispersed particles. For the particle size of each particle, the major axis (length of the longest portion) observed in the photograph was measured and this was employed as the particle size. The film cutting was performed in any direction for a press film and performed perpendicularly to the extrusion direction for an extruded film, and the cross-sectional faces were photographed from the direction perpendicular to the cross-section.

(5.2) Method b (osmium staining method: hereinafter sometimes referred to as the "Os staining method" or "Os method"): The components of the resin composition were kneaded and molded, so that a film having a specific thickness (20 µm) was obtained. This film was cut to a predetermined size and subjected to resin embedding using a EPON812 set manufactured by TAAB Laboratories Equipment Ltd., and cut in the direction perpendicular to the film surface at ordinary temperatures using a microtome (Ultracut-S manufactured by Leica). For example, a film having an orientation, such as an extrusion-molded film, was cut in the longitudinal direction (MD direction) or in the direction perpendicular to the longitudinal direction (TD direction) as necessary. Cutting was performed using a diamond knife at a rate of 0.8 µm/sec to give a piece having a thickness of 70 nm. Next, this piece was subjected to staining by allowing the piece to stand in an osmium tetroxide vapor phase atmosphere for three hours, and the resultant sample piece was photographed with a digital camera system (HITACHI UKT-2500) using a transmission-type electron microscope (TEM) (HITACHI H-800 ELECTRON MICROSCOPE) at an accelerating voltage of 100 kV and a magnification setting of 3000. The particles of the thermoplastic resin (A) in the photograph were observed, and the length of the major axis and the minor axis of each particle having a size of 0.005 µm or more shown in one image (length 6.89 µm×width 8.63 µm) of the photograph were measured, and the average of the major axis and the average of the minor axis were calculated. For the measurement and the calculation of the values, Image-Pro Plus Ver. 4.0 manufactured by Planetron was used, scale-calibration of image data was performed based on the magnification of the photograph to give values in unit of µm.

When the two methods described above are compared, the particle size obtained by the method b may be observed significantly smaller than that obtained by the method a of the same sample. This may be because in the method a, a portion of the base resin adjacent to the particles of the thermoplastic resin (A) is recognized as a portion of the particles. On the other hand, it is presumed that in the method b, since the double bond portion in the resin is stained, a more accurate particle size can be identified. In the present specification, unless otherwise specified, the measurement was performed by the method a, and when indicated as the Os method, the measurement was performed by the method h.

Synthesis Example 1

Synthesis of Polyoctenylene (A-1)

A 5 L glass three-neck flask equipped with a stirrer and a thermometer was purged with dry nitrogen, and then was charged with 624 g of heptane in which 110 g (1.0 mol) of cis-cyclooctene and 187 mg (1.7 mmol) of cis-4-octene were dissolved into the flask.

Then, a catalyst solution in which 8.48 mg (10 μmol) of benzylidene (1,3-dimesitylimidazolidin-2-ylidene) (tricyclohexylphosphine) ruthenium dichloride had been dissolved in 1 g of toluene was prepared, and this solution was added quickly to the heptane solution to effect ring-opening metathesis polymerization at 70° C. Five minutes later, analysis was performed by gas chromatography (GC-14B manufactured by Shimadzu Corporation; column: G-100 manufactured by Chemical Product Inspection Society), and it was confirmed that the cis-cyclooctene had disappeared.

Then, 600 g of methanol was added to the resultant reaction mixture and stirred at 40° C. for 30 min. Thereafter, the mixture was allowed to stand still at 40° C. for one hour for separation and then the lower layer (methanol layer) was removed. Then, 600 g of methanol was again added thereto and stirred at 40° C. for 30 min. Thereafter, the mixture was allowed to stand still at 40° C. for one hour for separation and then the lower layer (methanol layer) was removed. The remaining upper layer (heptane layer) was distilled to remove heptane under a reduced pressure, and the residue was dried by a vacuum dryer at 50 Pa at 40° C. for 24 hours to give 101.2 g (yield: 90%) of a polymer having a weight average molecular weight of 158000 and containing an oligomer having a molecular weight of 1000 or less in a ratio of 8.5%. The ratio of trans structural unit in the main chain of this polymer (polyoctenylene (A-1)) was 77%. Moreover, in this polymer (polyoctenylene (A-1)), the ratio of carbon-carbon double bond in the side chains relative to the total carbon-carbon double bonds was 0%. The ratio relative to the total carbon-carbon double bonds can be represented as $100 \times b/(a+b)$ where the amount of carbon-carbon double bond in the main chain is a (mol/g) and the amount of carbon-carbon double bond in the side chains is b (mol/g).

Synthesis Example 2

Synthesis of Polyoctenylene (A-2)

The same operation was performed as in Synthesis Example 1 except that the amount of cis-4-octene was 374 mg (3.3 mmol), and a polymer having a weight average molecular weight of 89000 and containing an oligomer having a molecular weight of 1000 or less in a ratio of 8.7% was obtained in an amount of 91.5 g (yield: 83%). The ratio of trans structural unit in the main chain of this polymer (polyoctenylene (A-2)) was 76%. Moreover, in this polymer (polyoctenylene (A-2)), the ratio of carbon-carbon double bond in the side chains relative to the total carbon-carbon double bonds was 0%.

Synthesis Example 3

Synthesis of Polyoctenylene (A-3)

The same operation was performed as in Synthesis Example 1 except that the amount of cis-4-octene was 18.7 mg (0.17 mmol), and a polymer having a weight average molecular weight of 390000 and containing an oligomer having a molecular weight of 1000 or less in a ratio of 8.3% was obtained in an amount of 97.0 g (yield: 88%). The ratio of trans structural unit in the main chain of this polymer (polyoctenylene (A-3)) was 79%. Moreover, in this polymer (polyoctenylene (A-3)), the ratio of carbon-carbon double bond in the side chains relative to the total carbon-carbon double bonds was 0%.

Synthesis Example 4

Synthesis of Compatibilizer (F-1)

First, styrene-hydrogenated butadiene-styrene triblock copolymer was fed to a co-rotational twin-screw extruder TEM-35B (manufactured by Toshiba Machine Co., Ltd.) at a rate of 7 kg/hour while purging the feeding port with nitrogen at a rate of 1 L/min. This styrene-hydrogenated butadiene-styrene triblock copolymer had the following physical properties: weight average molecular weight=100400; styrene/hydrogenated butadiene=18/82 (weight ratio); molar ratio of 1,2-bond/1,4-bond in butadiene unit=47/53; hydrogenation degree of the butadiene unit=97%; amount of double bond=430 μmol/g; melt flow rate (MFR)=5 g/10 min (230° C., 2160 g load); density=0.89 g/cm³. Then, a mixture of borane-triethylamine complex (TEAB) and boric acid 1,3-butanediol ester (BBD) (weight ratio of TEAB/BBD=29/71) was supplied from a liquid feeder 1 at a rate of 0.6 kg/hour, and 1,3-butanediol was supplied from a liquid feeder 2 at a rate of 0.4 kg/hour, and continuously kneaded. During kneading, the pressure was regulated such that the gauges at vent 1 and vent 2 indicated about 2.7 kPa. As a result, a triblock copolymer (F-1) containing a boronic acid 1,3-butanediol ester group (BBDE) was obtained at a rate of 7 kg/hour from the discharge port. The amount of the boronic acid 1,3-butanediol ester group in the copolymer was 210 μmol/g.

The structure and the operation conditions of the twin-screw extruder used for the reaction are as follows:

Screw diameter: 37 mmΦ

L/D: 52 (15 blocks)

Liquid feeder: C3 (liquid feeder 1), C11 (liquid feeder 2)

Vent position: C6 (vent 1), C14 (vent 2)

Screw structure: Seal rings were used between C5 and C6, between C10 and C11 and at the position of C12

| Temperature setting: | C1 | Water-cooling |
|---|---|---|
| | C2 to C3 | 200° C. |
| | C4 to C15 | 250° C. |
| | die | 250° C. |
| Screw rotation: | 400 rpm | |

Comparative Synthesis Example 1

Synthesis of Epoxy Group-Containing Polybutadiene (A'-2)

As a raw material, polybutadiene "Nipol BR1220" manufactured by ZEON CORPORATION (number average molecular weight: 160000; hereinafter simply referred to as polybutadiene (A'-1)) was used. The ratio of trans structural unit in the main chain of this polymer (polybutadiene (A'-1)) was 98%. Moreover, in this polymer (polybutadiene (A'-1)), the ratio of carbon-carbon double bond in the side chains relative to the total carbon-carbon double bonds was 2%.

To a 300 ml separable flask equipped with a condenser, a dropping funnel, a thermometer and a mechanical stirrer, 25 g of polybutadiene (A'-1), 250 g of cyclohexane and 0.32 g of trioctylmethylammonium chloride were added, and completely dissolved while stirred at 60° C. The resultant solution was heated to 70° C., and an aqueous solution having a pH of 3.1 that had been prepared by dissolving 0.15 g (0.05 mmol) of ammonium tungstate and 0.33 g (3.3 mmol) of phosphoric acid in 20 g of water was added thereto. Then, while the resultant mixture was stirred vigorously at 70° C., 5.21 g (0.046 mol) of a 30% aqueous hydrogen peroxide solution was added dropwise over 4 hours, and the reaction mixture was further stirred for 2 hours. After stirring was stopped, the mixture was separated into an organic layer (cyclohexane layer) and an aqueous layer at 60° C. The aqueous layer was separated and removed, and the organic layer was washed with 100 ml of water, then washed with 100 ml of a 5% aqueous sodium carbonate solution, and further washed twice with 100 ml of water. Cyclohexane in the organic layer was removed by distillation under a reduced pressure and the resultant residue was dried at 80° C. and a pressure of 800 Pa for 8 hours to give a product. The resultant epoxy group-containing polybutadiene (A'-2) (yield: 33.2 g) was analyzed with $^1$H-NMR. The conversion ratio of the double bonds (ratio of the consumed carbon-carbon double bonds) was 10%, the epoxidation ratio (epoxy group formation ratio based on the amount of original carbon-carbon double bonds) was 9.85%, and thus the selectivity ratio (epoxy group formation ratio based on the amount of the consumed carbon-carbon double bonds) was 98.5%. In this polymer, the ratio of carbon-carbon double bonds in the side chains relative to the total carbon-carbon double bonds was 2%.

Comparative Synthesis Example 2

Synthesis of Hydroxyl Group-Containing Polybutadiene (A'-3)

To a 300 ml separable flask equipped with a condenser, a dropping funnel, a thermometer and a mechanical stirrer, 25 g of the epoxy group-containing polybutadiene (A'-2) that was obtained in Comparative Synthesis Example 1, 250 g of THF and 10 g of a 0.1% aqueous perchloric acid solution were added, and the mixture was stirred at 60° C. for 6 hours. After stirring was stopped, the mixture was cooled to 25° C. and neutralized with 10 ml of a 5% aqueous ammonia solution. The resultant reaction mixture was added to 500 g of methanol, and a precipitated product was collected and dried at 80° C. and a pressure of 800 Pa for 8 hours. The resultant hydroxyl group-containing polybutadiene (A'-3) (yield: 23.5 g) was analyzed with $^1$H-NMR. The conversion ratio of epoxy groups (ratio of the consumed epoxy groups) was 100%, the hydrolysis ratio (hydroxyl group formation ratio based on the amount of original carbon-carbon double bonds) was 98.5%, and thus the selectivity ratio (hydroxyl group formation ratio based on the amount of the consumed epoxy groups) was 98.5%. In this polymer, the ratio of carbon-carbon double bond in the side chains relative to the total carbon-carbon double bonds was 2%.

Comparative Synthesis Example 3

Synthesis of Styrene-Isoprene-Styrene Triblock Copolymer (A'-4)

First, 600 parts by volume of cyclohexane, 0.16 parts by volume of N,N,N',N'-tetramethylethylenediamine (TMEDA) and 0.094 parts by volume of n-butyllithium as an initiator were placed into a stirrer-equipped autoclave previously purged with dry nitrogen. The temperature was raised to 50° C. and 4.25 parts by volume of styrene monomer was fed thereto, and polymerization was carried out for 1.5 hours. Next, the temperature was reduced to 30° C. and 120 parts by volume of isoprene was fed thereto, and polymerization was carried out for 2.5 hours. Furthermore, the temperature was raised again to 50° C. and 4.25 parts by volume of styrene monomer was fed thereto, and polymerization was carried out for 1.5 hours.

To the resultant reaction mixture 2-tert-butyl-6-(3-tert-butyl-2-hydroxy-5-methylbenzyl)-4-methylphenyl acrylate and pentaerythritol tetrakis(3-laurylthiopropionate) as antioxidants were added in an amount of 0.15 parts by weight each with respect to 100 parts by weight as the total amount of the styrene and isoprene. The reaction mixture was poured into methanol to precipitate a product. This product was separated and dried to give a styrene-isoprene-styrene triblock copolymer (A'-4) to which the antioxidant were added.

The number average molecular weight of this triblock copolymer (A'-4) was 85000, the styrene content was 14 mol %, and the melt flow rate (MFR) (210° C., 2160 g load) was 7.7 g/10 min. Moreover, the content of carbon-carbon double bonds in this resultant triblock copolymer (A'-4) was 0.014 mol/g, and the ratio of carbon-carbon double bond in the side chains with respect to the total carbon-carbon double bonds was 55%. This resin included 0.12 wt % of 2-tert-butyl-6-(3-tert-butyl-2-hydroxy-5-methylbenzyl)-4-methylphenylacrylate and 0.12 wt % of pentaerythritoltetrakis(3-laurylthiopropionate).

Example 1.1

First, 100 parts by weight of the polyoctenylene (A-1) obtained in Synthesis Example 1 and 0.85 parts by weight of cobalt(II) stearate (800 ppm in terms of cobalt atom) were dry-blended, and melt-kneaded in a total resin amount of 70.59 g using a roller mixer (LABO PLASTOMIL MODEL R100 manufactured by Toyo Seiki Seisakusho Ltd.) at a screw rotation of 60 rpm at 190° C. while purging the chamber with nitrogen, and the blend was removed after 5 minutes in the bulk form. The obtained bulk product was cut into pellets to give resin composition pellets made of the polyoctenylene (A-1) and cobalt stearate.

The obtained resin composition pellets were supplied to a compression molding machine (manufactured by Shindo Metal Industries) and molded at an extrusion temperature of 200° C. to give a sheet having a thickness of 100 μm. The obtained sheet was cut to obtain a sample sheet of 0.1 g and the sheet was precisely weighed. The obtained sheet was rolled 5 hours after the sheet formation and placed in a standard bottle having an internal volume of 260 ml that had been filled with 50% RH air at 23° C. The air in the standard bottle contained oxygen and nitrogen in a volume ratio of 21:79. Then, 5 ml of water was added to the standard bottle, and the opening of the standard bottle was sealed with a multilayered sheet including an aluminum layer using an epoxy resin, and the bottle was left to stand at 60° C. After the sealing, the inner air was sampled with a syringe periodically to measure the oxygen concentration of the air by gas chromatography. The small hole formed through the multilayered sheet during the measurement was sealed with the epoxy resin every time the hole was formed. The oxygen absorption amount of the resin composition in a 100% RH atmosphere at 60° C. was obtained by calculating the amount of oxygen decreased based on the volume ratio of oxygen to nitrogen obtained by the measurement. FIG. 1 and Table 1.1 show the oxygen absorption amount (cumulative amount) in 1 day (24 hours), 4 days (96 hours), 7 days (168 hours) and 14 days (336 hours) after sealing. The oxygen absorption rate was calculated based on the results obtained 4 days after and 7 days after the start of the measurement, the rate was 8.3 ml/(g·day). Furthermore, the oxygen absorption amount after 14 days (cumulative amount of oxygen absorption) was adopted to calculate the oxygen absorption amount of the resin per 1 mol of carbon-carbon double bond of the resin contained in the resin composition, and the result was 1.88 mols. The results are shown in Table 1.1.

Separately, 1 g of the same sheet was precisely weighed, rolled 5 hours after the sheet formation and placed in a standard bottle having an internal volume of 85 ml that had been filled with 50% RH air at 23° C. Then, 1 ml of water was added to the standard bottle, and the opening of the standard bottle was sealed with a multilayered sheet including an aluminum layer using an epoxy resin, and the bottle was left to stand at 60° C. for 2 weeks. Then, 10 ml of the headspace gas of the sample in the bottle was sampled with a gas-tight syringe, and the gas was collected and concentrated in a TENAX-TA tube at −40° C. The collected gas was desorbed by rapid heating at 320° C. and introduced into GC/MS. The concentration and the introduction into GC/MS of the generated gas were performed using a concentrating apparatus, Head Space Sampler JHS-100A.

The measurement conditions of GC/MS are as follows.

Heat desorption apparatus: Head Space Sampler JHS-100A (manufactured by Japan Analytical Industry Co., Ltd.)

Redesorption temperature: 320° C., 25 sec.

MS apparatus: Mass spectrometer JMS SX102A (manufactured by JEOL Ltd.)

Data processing: Data processing system MS-MP 7000 (manufactured by JEOL Ltd.)

GC apparatus: HP 5890 (manufactured by Hewlett Packard)

Carrier gas: Helium 20 ml/min

Column: Pora PROT Q 25 m×0.32 mmID

Column temperature: 80° C. to 250° C. (temperature increase rate: 8° C./min)

Inlet temperature: 270° C.

Separator temperature: 270° C.

Acetone gas was collected in a vacuum collecting bottle and diluted with nitrogen gas to prepare a standard gas (concentration: 4 μg/ml to 5 μg/ml). Using this standard gas, a calibration curve was prepared. This calibration curve was used to calculate the amounts of gases shown in Table 1.2. The weight of various gases generated and contained in the headspace was converted to a gas weight per unit weight of the measurement sample based on the following equation, and the resultant value was taken as the amount of generated gas (gas analysis value; unit: ppm).

Amount of gas generated (ppm=μg/g)=Amount detected (μg)×(85/10)/1

85: volume (ml) of standard bottle
10: volume (ml) of headspace gas
1: total amount (g) of sample sheet used
The results of gas analysis values are shown in Table 1.2.

Example 1.2

Resin composition pellets were obtained and a sheet was prepared in the same manner as in Example 1.1 except that the polyoctenylene (A-2) obtained in Synthesis Example 2 was used in place of the polyoctenylene (A-1). Using this sheet, the oxygen absorption amount was obtained, and the oxygen absorption rate and the oxygen absorption amount (mol) per mol of carbon-carbon double bonds were calculated, in the same manner as in Example 1.1. The results are shown in FIG. 1 and Table 1.1.

Comparative Example 1.1

Resin composition pellets were obtained and a sheet was prepared in the same manner as in Example 1.1 except that the polybutadiene (A'-1) was used in place of the polyoctenylene (A-1). Using this sheet, the oxygen absorption amount was obtained, and the oxygen absorption rate and the oxygen absorption amount (mol) per mol of carbon-carbon double bonds were calculated, in the same manner as in Example 1.1. The results are shown in FIG. 1 and Table 1.1. Furthermore, an analysis of the generated gas was performed in the same manner as in Example 1.1. The results are shown in Table 1.2.

Comparative Example 1.2

Resin composition pellets were obtained and a sheet was prepared in the same manner as in Example 1.1 except that the hydroxyl group-containing polybutadiene (A'-3) obtained in Comparative Synthesis Example 2 was used in place of the polyoctenylene (A-1). Using this sheet, the oxygen absorption amount was obtained, and the oxygen absorption rate and the oxygen absorption amount (mol) per mol of carbon-carbon double bonds were calculated, in the same manner as in Example 1.1. The results are shown in FIG. 1 and Table 1.1. Furthermore, an analysis of the generated gas was performed in the same manner as in Example 1.1. The results are shown in Table 1.2.

Comparative Example 1.3

Resin composition pellets were obtained and a sheet was prepared in the same manner as in Example 1.1 except that the "Polybutadiene, cis and trans" manufactured by Scientific Polymer Products Inc., was used in place of the polyoctenylene (A-1). Using this sheet, an analysis of a generated gas was performed in the same manner as in Example 1.1. The results are shown in Table 1.2. The ratio of carbon-carbon double bonds in the side chains relative to the total carbon-carbon double bonds of this polybutadiene was 9%.

Comparative Example 1.4

Resin composition pellets were obtained, a sheet was prepared, and the oxygen absorption amount was obtained, in the same manner as in Example 1.1 except that the styrene-isoprene-styrene triblock copolymer (A'-4) obtained in Comparative Synthesis Example 3 was used in place of the polyoctenylene (A-1). The results are shown in Table 1.1 and FIG. 1. Furthermore, an analysis of the generated gas was performed in the same manner as in Example 1.1. The results are shown in Table 1.2.

TABLE 1.1

|  | Resin (A) | Oxygen absorption amount (ml/g) | | | | Oxygen absorption rate (ml/(g · day)) | Oxygen absorption amount (mol O₂/mol C=C) |
|  |  | 1 Day | 4 Days | 7 Days | 14 Days |  |  |
| --- | --- | --- | --- | --- | --- | --- | --- |
| Example 1.1 | POE(1) | 324 | 411 | 436 | 466 | 8.3 | 1.88 |
| Example 1.2 | POE(2) | 310 | 400 | 430 | 460 | 10.0 | 1.86 |
| Comparative Example 1.1 | PBd(1) | 114 | 151 | 196 | 228 | 15.0 | 0.45 |
| Comparative Example 1.2 | PBd-OH | 120 | 160 | 200 | 210 | 13.3 | 0.49 |
| Comparative Example 1.4 | SIS | 99 | 153 | 179 | 202 | 8.7 | 0.59 |

POE(1): Polyoctenylene (A-1)
POE(2): Polyoctenylene (A-2)
PBd(1): Polybutadiene (A'-1)
PBd-OH: Hydroxyl group-containing polybutadiene (A'-3)
SIS: Styrene-isoprene-styrene triblock copolymer (A'-4)

TABLE 1.2

| Generated Gas | Example 1.1 | Comparative Example 1.1 | Comparative Example 1.2 | Comparative Example 1.3 | Comparative Example 1.4 |
| --- | --- | --- | --- | --- | --- |
| Acetone | 1.0 | 0.7 | 0.4 | 2.1 | 9.3 |
| Methyl ethyl ketone | 1.0 | 4.9 | 4.3 | 5.3 | 5.6 |
| Propionaldehyde | ND | ND | ND | 0.3 | 0.7 |
| Furans | 1.0 | 4.9 | 3.2 | 8.0 | 10.9 |
| Propene | 0.2 | 0.2 | 0.4 | 0.5 | 0.8 |
| Butene | 0.2 | 0.5 | 1.2 | 0.6 | 4.2 |
| Cyclohexane | ND | ND | ND | ND | 0.3 |
| Methylenecyclobutane | ND | ND | ND | ND | 0.5 |

Unit: ppm
ND: Not detected

Example 2.1

In this example, Example 2.2 and Comparative Examples 2.1 to 2.6 below, EVOH having the following composition and physical properties (EVOH containing a phosphate compound and a sodium salt; hereinafter referred to as "EVOH (E-1)") was used as a matrix resin (E).

Ethylene content: 32 mol %
Degree of saponification: 99.6%
MFR: 3.1 g/10 min (210° C., 2160 g load)
Phosphate compound content: 100 ppm (in terms of phosphoric acid radical)
Sodium salt content: 65 ppm (in terms of sodium)
Melting point: 183° C.
Oxygen transmission rate: 0.4 ml·20 μm/(m²·day·atm)(20° C., 65% RH).

First, 90 parts by weight of the EVOH (E-1), 10 parts by weight of the polyoctenylene (A-1) and 0.85 parts by weight of cobalt(II) stearate (800 ppm in terms of cobalt atom) were dry-blended, and melt-kneaded at a total resin amount of 70.59 g using a roller mixer (LABO PLASTOMIL MODEL R100 manufactured by Toyo Seiki Seisakusho Ltd.) at a screw rotation of 60 rpm at 200° C. while purging the chamber with nitrogen. The mixture was removed in the bulk form after 5 minutes. The obtained bulk product was cut into pellets to give resin composition pellets composed of the EVOH (E-1), the polyoctenylene (A-1) and cobalt stearate.

The obtained resin composition pellets were supplied to a compression molding machine (manufactured by Shindo Metal Industries) and processed into a sheet at an extrusion temperature of 210° C. to give a sheet having a thickness of 100 μm. Observation of the cross-section of the sheet through an electron microscope revealed that the polyoctenylene (A-1) was dispersed in the form of particles having a size of 1 μm or less in the matrix of the EVOH (E-1).

Then, this sheet was cut to obtain a sample sheet of 0.5 g and the sheet was precisely weighed, and as in Example 1.1, placed in a standard bottle, left to stand at 60° C., and subjected to a measurement of the oxygen absorption amount, to obtain the oxygen absorption amount of the resin composition in a 100% RH atmosphere at 60° C. The results are shown in Table 2.1. The oxygen absorption rate calculated from the results obtained 2 days after and 7 days after the start of the measurement was 2.0 ml/(g·day). Furthermore, using the oxygen absorption amount (cumulative amount) in 14 days, the oxygen absorption amount per 1 mol of carbon-carbon double bond of the resin contained in the resin composition was calculated to be 2.03 mols. The results are shown in FIG. 2 and Table 2.1.

Figure 3:
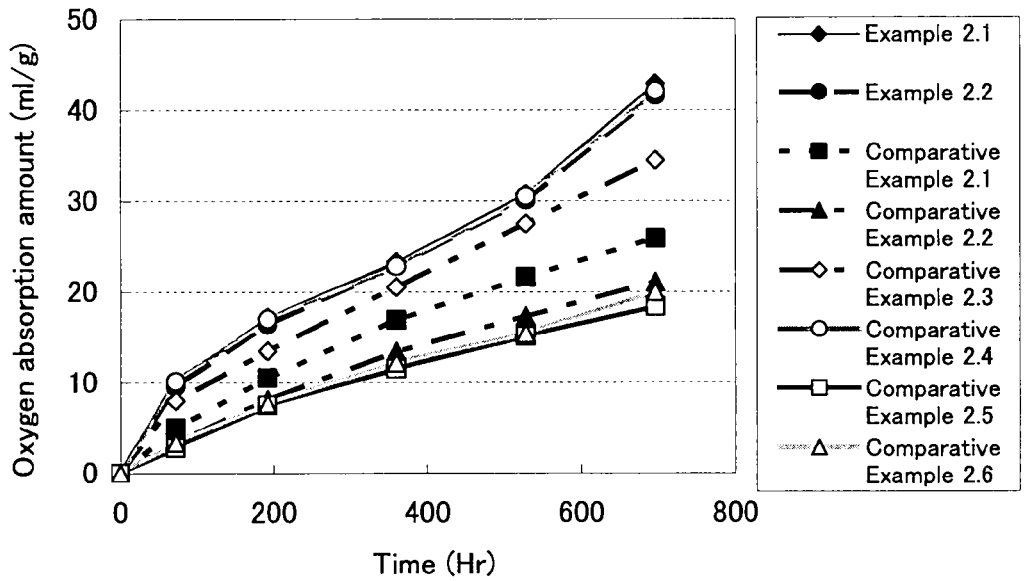
FIG. 3 is a graph in which the oxygen absorption amounts of the sheets of Examples 2.1 and 2.2 and Comparative Examples 2.1 to 2.6 under a 100% RH atmosphere at 23° C. against time are plotted.

Next, a measurement was performed in the same manner as above, except that the sheet was left to stand at a temperature of 23° C., to obtain the oxygen absorption amount of the resin composition in a 100% RH atmosphere at 23° C. The oxygen absorption rate calculated from the results obtained 3 days after and 8 days after the start of the measurement was 1.4 ml/(g-day). The results are shown in FIG. 3 and Table 2.2.

Figure 2:
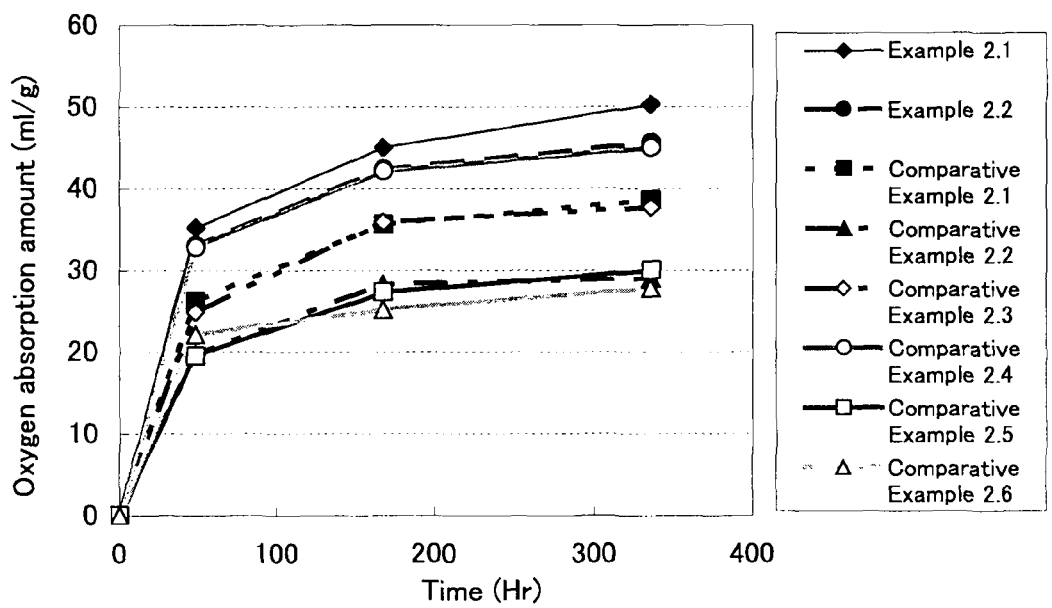
FIG. 2 is a graph in which the oxygen absorption amounts of the sheets of Examples 2.1 and 2.2 and Comparative Examples 2.1 to 2.6 under a 100% RH atmosphere at 60° C. against time are plotted.

FIG. 2 and Table 2.1 as well as FIG. 3 and Table 2.2 also show the results of the same evaluation as described above in Example 2.2 and Comparative Examples 2.1 to 2.6 below.

Example 2.2

A sheet made of a resin composition was obtained in the same manner as in Example 2.1 except that the polyoctenylene (A-2) obtained in Synthesis Example 2 was used in place of the thermoplastic resin (A-1). Observation of the cross-section of the sheet through an electron microscope revealed that the polyoctenylene (A-2) was dispersed in the form of particles having a size of 1 μm or less in the matrix of the EVOH (E-1). Using this sheet, evaluation was performed in the same manner as in Example 2.1.

Comparative Example 2.1

Resin composition pellets were obtained and a sheet was prepared in the same manner as in Example 2.1 except that the polybutadiene (A'-1) was used in place of the polyoctenylene (A-1). Observation of the cross-section of the sheet through an electron microscope revealed that the polybutadiene (A'-1) was dispersed in the form of particles having a size of 1 μm or less in the matrix of the EVOH (E-1). Using this sheet, evaluation was performed in the same manner as in Example 2.1.

Comparative Example 2.2

A sheet made of a resin composition was obtained in the same manner as in Example 2.1 except that the epoxy group-containing polybutadiene (A'-2) obtained in Comparative Synthesis Example 1 was used in place of the polyoctenylene (A-1). Observation of the cross-section of the sheet through an electron microscope revealed that the epoxy group-containing polybutadiene (A'-2) was dispersed in the form of particles having a size of 1 to 2 μm in the matrix of the EVOH (E-1). Using this sheet, evaluation was performed in the same manner as in Example 2.1.

Comparative Example 2.3

A sheet made of a resin composition was obtained in the same manner as in Example 2.1 except that the hydroxyl group-containing polybutadiene (A'-3) obtained in Comparative Synthesis Example 2 was used in place of the polyoctenylene (A-1). Observation of the cross-section of the sheet through an electron microscope revealed that the hydroxyl group-containing polybutadiene (A'-3) was dispersed in the form of particles having a size of 1 to 2 μm in the matrix of the EVOH (E-1). Using this sheet, evaluation was performed in the same manner as in Example 2.1.

Comparative Example 2.4

A sheet made of a resin composition was obtained in the same manner as in Example 2.1 except that a polybutadiene (number average molecular weight: 45000, the ratio of carbon-carbon double bonds in the side chains relative to the total carbon-carbon double bonds: 5%, hereinafter simply referred to as polybutadiene (A'-5)) was used in place of the polyoctenylene (A-1). Observation of the cross-section of the sheet through an electron microscope revealed that the polybutadiene (A'-5) was dispersed in the form of particles having a size of 1 to 2 μm in the matrix of the EVOH (E-1). Using this sheet, evaluation was performed in the same manner as in Example 2.1.

Comparative Example 2.5

A sheet made of a resin composition was obtained in the same manner as in Example 2.1 except that a polybutadiene "Polyoil 130" manufactured by ZEON CORPORATION (number average molecular weight: 3000, the ratio of carbon-carbon double bonds in the side chains relative to the total carbon-carbon double bonds: 1%, hereinafter simply referred to as polybutadiene (A'-6)) was used in place of the polyoctenylene (A-1). Observation of the cross-section of the sheet through an electron microscope revealed that the polybutadiene (A'-6) was dispersed in the form of particles having a size of 1 to 10 μm in the matrix of the EVOH (E-1). Using this sheet, evaluation was performed in the same manner as in Example 2.1.

Comparative Example 2.6

A sheet made of a resin composition was obtained in the same manner as in Example 2.1 except that the styrene-isoprene-styrene triblock copolymer (A'-4) obtained in Comparative Synthesis Example 3 was used in place of the polyoctenylene (A-1). Observation of the cross-section of the sheet through an electron microscope revealed that the styrene-isoprene-styrene triblock copolymer (A'-4) was dispersed in the form of particles having a size of 1 to 2 μm in the matrix of the EVOH (E-1). Using this sheet, evaluation was performed in the same manner as in Example 2.1.

TABLE 2.1

|  | Resin (A) | A/E*1 (Weight ratio) | Oxygen absorption amount (ml/g)*2 | | | Oxygen absorption rate (ml/(g · day)) | Oxygen absorption amount (mol $O_2$/mol C=C) |
| --- | --- | --- | --- | --- | --- | --- | --- |
|  |  |  | 2 Days | 7 Days | 14 Days |  |  |
| Example 2.1 | POE(1) | 10/90 | 35.2 | 45.0 | 50.3 | 2.0 | 2.03 |
| Example 2.2 | POE(2) | 10/90 | 33.0 | 42.3 | 45.6 | 1.9 | 1.84 |
| Comparative Example 2.1 | PBd(1) | 10/90 | 26.2 | 35.6 | 38.6 | 1.9 | 0.76 |
| Comparative Example 2.2 | Ep-PBd | 10/90 | 19.7 | 28.3 | 29.0 | 1.7 | 0.66 |
| Comparative Example 2.3 | PBd-OH | 10/90 | 24.9 | 35.9 | 37.7 | 2.2 | 0.88 |
| Comparative Example 2.4 | PBd(2) | 10/90 | 32.8 | 42.1 | 45.0 | 1.9 | 0.89 |
| Comparative Example 2.5 | PBd(3) | 10/90 | 19.5 | 27.3 | 30.0 | 1.6 | 0.59 |

TABLE 2.1-continued

| | Resin (A) | A/E*1 (Weight ratio) | Oxygen absorption amount (ml/g)*2 | | | Oxygen absorption rate (ml/(g · day)) | Oxygen absorption amount (mol O$_2$/mol C=C) |
|---|---|---|---|---|---|---|---|
| | | | 2 Days | 7 Days | 14 Days | | |
| Comparative Example 2.6 | SIS | 10/90 | 22.1 | 25.2 | 27.8 | 0.6 | 0.82 |

POE(1): Polyoctenylene (A-1)
POE(2): Polyoctenylene (A-2)
PBd(1): Polybutadiene (A'-1)
Ep-PBd Epoxy group-containing polybutadiene (A'-2)
PBd-OH: Hydroxyl group-containing polybutadiene (A'-3)
PBd(2): Polybutadiene (A'-5)
PBd(3): Polybutadiene (A'-6)
SIS: Styrene-isoprene-styrene triblock copolymer (A'-4)
*1Weight ratio of thermoplastic resin (A) to matrix resin (E)
*2Oxygen absorption amount in 100% RH at 60° C.

TABLE 2.2

| | Oxygen absorption amount (ml/g)*1 | | | | | Oxygen absorption rate (ml/(g · day)) |
|---|---|---|---|---|---|---|
| | 3 Days | 8 Days | 15 Days | 22 Days | 29 Days | |
| Example 2.1 | 10.0 | 17.2 | 23.3 | 30.8 | 42.9 | 1.4 |
| Example 2.2 | 9.6 | 16.4 | 22.8 | 30.1 | 41.6 | 1.4 |
| Comparative Example 2.1 | 5.0 | 10.5 | 16.9 | 21.6 | 25.9 | 1.1 |
| Comparative Example 2.2 | 3.4 | 8.1 | 13.4 | 17.3 | 21.1 | 0.9 |
| Comparative Example 2.3 | 8.0 | 13.5 | 20.5 | 27.5 | 34.5 | 1.1 |
| Comparative Example 2.4 | 10.1 | 17.0 | 22.8 | 30.5 | 42.1 | 1.4 |
| Comparative Example 2.5 | 2.8 | 7.5 | 11.5 | 15.1 | 18.4 | 0.9 |
| Comparative Example 2.6 | 3.4 | 7.7 | 12.2 | 15.4 | 20.0 | 0.9 |

*1Oxygen absorption amount in 100% RH at 23° C.

Example 3.1

First, 95 parts by weight of the EVOH (E-1), 5 parts by weight of the polyoctenylene (A-1) and 0.85 parts by weight of cobalt(II) stearate (800 ppm in terms of cobalt atom) were dry-blended and pelletized by extrusion using a 25 mmΦ twin-screw extruder (LABO PLASTOMIL MODEL 15C300 manufactured by Toyo Seiki Seisakusho Ltd.) at a screw rotation of 100 rpm at 210° C. at an extruded resin amount of 6 kg/hour. The pellets were then dried under a reduced pressure at 40° C. for 16 hours to give resin composition pellets composed of the EVOH (E-1), the polyoctenylene (A-1) and cobalt stearate.

The obtained resin composition pellets were subjected to extrusion molding at an extrusion temperature of 210° C. to give a film having a thickness of 20 μm. Observation of the cross-section of the film through an electron microscope revealed that the polyoctenylene (A-1) was dispersed in the form of particles having a size of 1 μm or less in the matrix of the EVOH (E-1).

Figure 4:
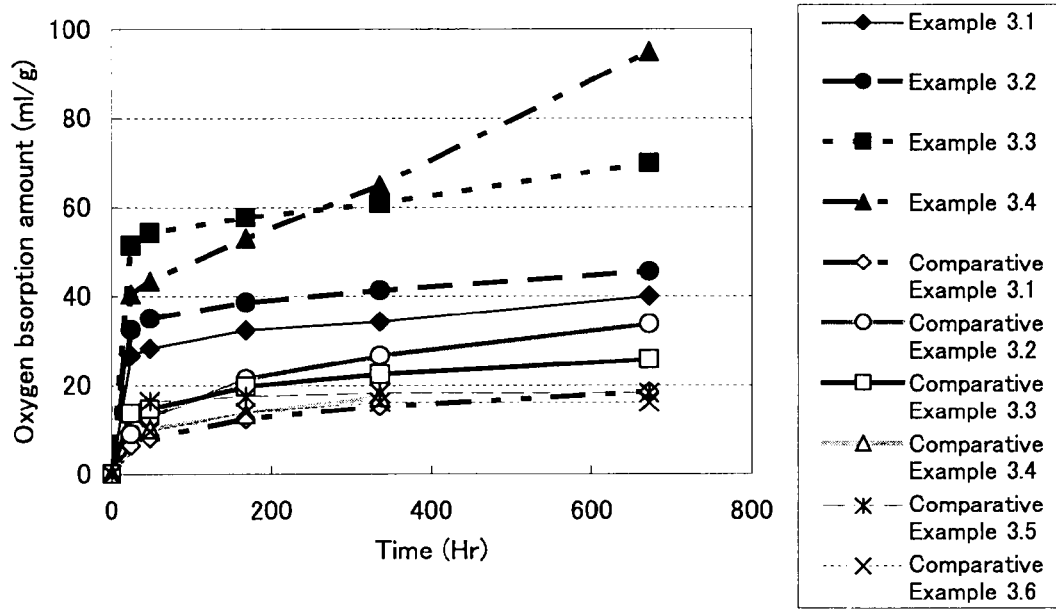
FIG. 4 is a graph in which the oxygen absorption amounts of the films of Examples 3.1 to 3.4 and Comparative Examples 3.1 to 3.6 under a 100% RH atmosphere at 60° C. against time are plotted.
Figure 5:
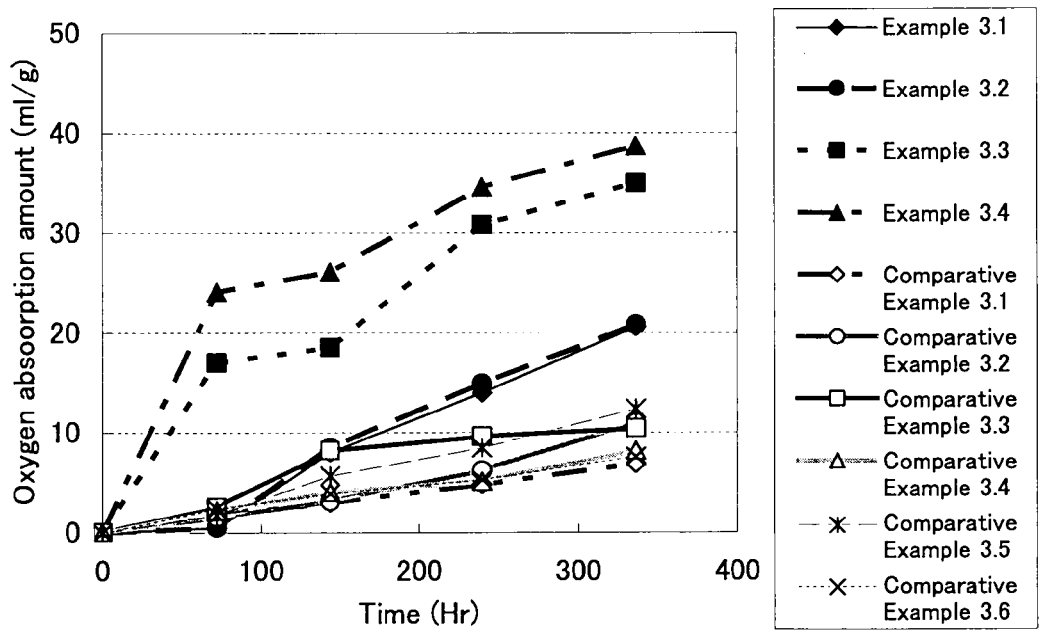
FIG. 5 is a graph in which the oxygen absorption amounts of the films of Examples 3.1 to 3.4 and Comparative Examples 3.1 to 3.6 under a 100% RH atmosphere at 23° C. against time are plotted.
Figure 6:
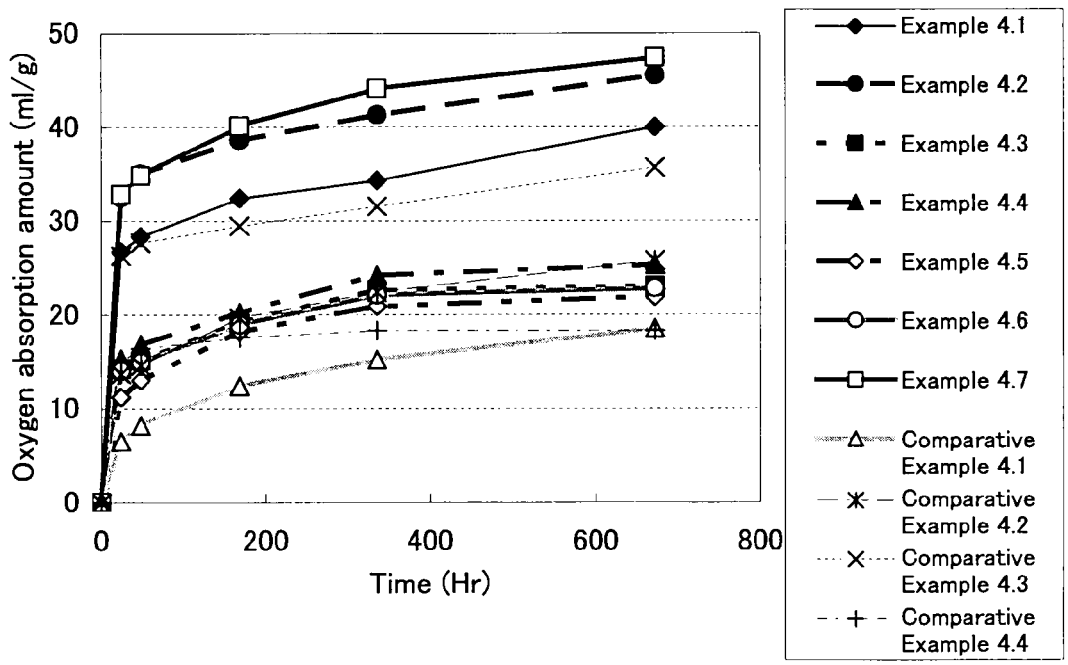
FIG. 6 is a graph in which the oxygen absorption amounts of the films of Examples 4.1 to 4.7 and Comparative Examples 4.1 to 4.4 under a 100% RH atmosphere at 60° C. against time are plotted.

Using this film, the oxygen absorption amount was obtained by a measurement carried out after a period (days) indicated in Tables 3.1 and 3.2 in the same manner as in Example 2.1, and the oxygen absorption rate and the oxygen absorption amount (mol) per mol of carbon-carbon double bond were calculated. The oxygen absorption rate in a 100% RH atmosphere at 23° C. was calculated from the results obtained 3 days after and 6 days after the start of the measurement. The results are shown in FIGS. 4 and 5 and Tables 3.1 and 3.2.

Furthermore, odor evaluation was performed in the manner described below. The results of the odor evaluation are shown in Table 3.2.

<Odor Evaluation>

The film was cut to obtain a sample film of 1 g and the film was cut to the film was precisely weighed. The film was rolled 5 hours after the film formation and placed in a standard bottle having an internal volume of 85 ml that had been filled with 50% RH air at 23° C. Then, 1 ml of water was added to the standard bottle, and the opening of the standard bottle was sealed with a multilayered film including an aluminum layer using an epoxy resin, and the bottle was left to stand at 60° C. for 2 weeks. Thereafter, the odor of the headspace gas of the samples was subjected to sensory evaluation by a panel of 5 people.

Each of 5 panelists evaluated that almost no odor is present in the headspace gas. The results are shown in Table 3.2, in which ⊚ indicates that almost no odor is present in the headspace gas; ○ indicates that odor is present in the headspace gas to a low level; Δ indicates that odor is present in the headspace gas; and x indicates that strong odor is present in the headspace gas.

FIGS. 4 and 5, and Tables 3.1 and 3.2 also show the results of the same evaluation as described above carried out in Examples 3.2 to 3.4 and Comparative Examples 3.1 to 3.6 described below.

Example 3.2

Resin composition pellets were obtained and extrusion-molded to give a film in the same manner as in Example 3.1 except that 93 parts by weight of the EVOH (E-1), 5 parts by weight of the polyoctenylene (A-1), 2 parts by weight of the compatibilizer (F-1) and 0.85 parts by weight of cobalt(II) stearate (800 ppm in terms of cobalt atom) were used. Observation of the cross-section of the film through an electron microscope revealed that the polyoctenylene (A-1) was dispersed in the form of particles having a size of 1 μm or less in the matrix of the EVOH (E-1). Using this film, evaluation was performed in the same manner as in Example 3.1.

Example 3.3

Resin composition pellets were obtained and extrusion-molded to give a film in the same manner as in Example 3.1 except that 90 parts by weight of the EVOH (E-1), 8 parts by weight of the polyoctenylene (A-1), 2 parts by weight of the compatibilizer (F-1) and 0.85 parts by weight of cobalt(II) stearate (800 ppm in terms of cobalt atom) were used. Observation of the cross-section of the film through an electron microscope revealed that the polyoctenylene (A-1) was dispersed in the form of particles having a size of 1 μm or less in the matrix of the EVOH (E-1). Using this film, evaluation was performed in the same manner as in Example 3.1.

Example 3.4

Resin composition pellets were obtained and extrusion-molded to give a film in the same manner as in Example 3.1 except that 90 parts by weight of a polyethylene resin "Mirason 11" manufactured by Mitsui Chemicals, Inc., (hereinafter simply referred to as polyethylene (E-2)) in place of the EVOH (E-1) and 10 parts by weight of the polyoctenylene (A-1) were used. Observation of the cross-section of the film through an electron microscope revealed that the polyoctenylene (A-1) was dispersed in the form of particles having a size of 1 μm or less in the matrix of the polyethylene (E-2). Using this film, evaluation was performed in the same manner as in Example 3.1.

Comparative Example 3.1

Resin composition pellets were obtained and a film was prepared in the same manner as in Example 3.1 except that the polybutadiene (A'-1) was used in place of the polyoctenylene (A-1). Observation of the cross-section of the film through an electron microscope revealed that the polybutadiene (A'-1) was dispersed in the form of particles having a size of 1 to 5 μm in the matrix of the EVOH (E-1). Using this film, evaluation was performed in the same manner as in Example 3.1.

Comparative Example 3.2

Resin composition pellets were obtained and extrusion-molded to give a film in the same manner as in Example 3.1 except that 10 parts by weight of the polybutadiene (A'-1) was used in place of the polyoctenylene (A-1) and the amount of the EVOH (E-1) was 90 parts by weight. Observation of the cross-section of the film through an electron microscope revealed that the polybutadiene (A'-1) was dispersed in the form of particles having a size of 1 to 5 μm in the matrix of the EVOH (E-1). Using this film, evaluation was performed in the same manner as in Example 3.1.

Comparative Example 3.3

Resin composition pellets were obtained and extrusion-molded to give a film in the same manner as in Example 3.1 except that 5 parts by weight of the polybutadiene (A'-1) was used in place of the polyoctenylene (A-1), the amount of the EVOH (E-1) was 93 parts by weight, and the compatibilizer (F-1) was used in 2 parts by weight. Observation of the cross-section of the film through an electron microscope revealed that the polybutadiene (A'-1) was dispersed in the form of particles having a size of 1 to 2 μm in the matrix of the EVOH (E-1). Using this film, evaluation was performed in the same manner as in Example 3.1.

Comparative Example 3.4

Resin composition pellets were obtained and a film was prepared in the same manner as in Example 3.1 except that the polybutadiene (A'-1) was used in place of the polyoctenylene (A-1) and the polyethylene (E-2) was used in place of the EVOH (E-1). Observation of the cross-section of the film through an electron microscope revealed that the polybutadiene (A'-1) was dispersed in the form of particles having a size of 1 to 5 μm in the matrix of the polyethylene (E-2). Using this film, evaluation was performed in the same manner as in Example 3.1.

Comparative Example 3.5

Resin composition pellets were obtained and extrusion-molded to give a film in the same manner as in Example 3.1 except that the styrene-isoprene-styrene triblock copolymer (A'-4) obtained in Comparative Synthesis Example 3 was used in place of the polyoctenylene (A-1). Observation of the cross-section of the film through an electron microscope revealed that the copolymer (A'-4) was dispersed in the form of particles having a size of 1 to 2 μm in the matrix of the EVOH (E-1). Using this film, evaluation was performed in the same manner as in Example 3.1.

Comparative Example 3.6

Resin composition pellets were obtained and extrusion-molded to give a film in the same manner as in Example 3.1 except that a mix-polybutadiene "Nipol BR1242" manufactured by ZEON CORPORATION (the ratio of carbon-carbon double bonds in the side chains relative to the total carbon-carbon double bonds: 12.5%, hereinafter referred to as polybutadiene (A'-7)) was used in place of the polyoctenylene (A-1). Observation of the cross-section of the film through an electron microscope revealed that the polybutadiene (A'-7) was dispersed in the form of particles having a size of 1 to 5 μm in the matrix of the EVOH (E-1). Using this film, evaluation was performed in

TABLE 3.1

| | Matrix resin Resin (A) | Compa- tibilize r (F) (E) | A/E/F[*1] (Weight ratio) | Oxygen absorption amount (ml/g)[*2] | | | | | Oxygen absorption rate (ml/(g · day)) | Oxygen absorption amount (mol O$_2$/mol C=C) |
|---|---|---|---|---|---|---|---|---|---|---|
| | | | | 1 Day | 2 Days | 7 Days | 14 Days | 28 Days | | |
| Example 3.1 | POE(1) | EVOH(E-1) — | 5/95/0 | 26.7 | 28.3 | 32.4 | 34.3 | 40.0 | 0.8 | 2.77 |
| Example 3.2 | POE(1) | EVOH(E-1) F-1 | 5/93/2 | 32.5 | 35.0 | 38.6 | 41.3 | 45.5 | 0.7 | 3.33 |
| Example 3.3 | POE(1) | EVOH(E-1) F-1 | 8/90/2 | 51.4 | 54.2 | 57.7 | 60.9 | 69.9 | 0.7 | 3.07 |
| Example 3.4 | POE(1) | PE(E-2) — | 10/90/0 | 40.4 | 43.3 | 53.0 | 64.8 | 95.0 | 1.9 | 2.62 |
| Comparative Example 3.1 | PBd(1) | EVOH(E-1) — | 5/95/0 | 6.5 | 8.2 | 12.4 | 15.2 | 18.5 | 0.8 | 0.60 |
| Comparative Example 3.2 | PBd(1) | EVOH(E-1) — | 10/90/0 | 9.0 | 12.7 | 21.4 | 26.6 | 33.7 | 1.7 | 0.53 |
| Comparative Example 3.3 | PBd(1) | EVOH(E-1) F-1 | 5/93/2 | 13.7 | 14.6 | 19.7 | 22.4 | 25.8 | 1.0 | 0.89 |
| Comparative Example 3.4 | PBd(1) | PE(E-2) — | 5/95/0 | — | 10.1 | 13.5 | 17.3 | — | 0.7 | 0.69 |
| Comparative Example 3.5 | SIS | EVOH(E-1) — | 5/95/0 | — | 16.4 | 17.6 | 18.3 | 18.3 | 0.2 | 1.07 |
| Comparative Example 3.6 | mix-PBd | EVOH(E-1) — | 5/95/0 | — | 9.7 | 14.0 | 16.2 | 16.2 | 0.9 | 0.64 |

POE(1): Polyoctenylene (A-1)
PBd(1): Polybutadiene (A'-1)
SIS: Styrene-isoprene-styrene triblock copolymer (A'-4)
mix-PBd: Polybutadiene (A'-7)
PE(E-2): Polyethylene
[*1]Weight ratio of thermoplastic resin (A) to matrix resin (E) to compatibilizer (F)
[*2]Oxygen absorption amount in 100% RH at 60° C.

TABLE 3.2

| | Oxygen absorption amount (ml/g)[*1] | | | | Oxygen absorption rate (ml/(g · day)) | Odor evaluation |
|---|---|---|---|---|---|---|
| | 3 Days | 6 Days | 10 Days | 14 Days | | |
| Example 3.1 | 0.5 | 8.0 | 14.0 | 20.6 | 2.5 | ◎ |
| Example 3.2 | 0.5 | 8.5 | 14.9 | 20.8 | 2.7 | ◎ |
| Example 3.3 | 17.0 | 18.5 | 30.8 | 35.0 | 0.5 | ◎ |
| Example 3.4 | 24.1 | 26.1 | 34.6 | 38.7 | 0.7 | ◎ |
| Comparative Example 3.1 | 1.7 | 3.0 | 4.8 | 6.9 | 0.4 | ◎ |
| Comparative Example 3.2 | 1.5 | 3.1 | 6.2 | 11.0 | 0.5 | ◎ |
| Comparative Example 3.3 | 2.5 | 8.2 | 9.6 | 10.4 | 1.9 | ◎ |
| Comparative Example 3.4 | 2.2 | 4.0 | 5.1 | 8.2 | 0.6 | ○ |
| Comparative Example 3.5 | 1.8 | 5.7 | 8.5 | 12.4 | 1.3 | X |
| Comparative Example 3.6 | 2.4 | 3.9 | 5.3 | 7.6 | 0.5 | Δ |

[*1]Oxygen absorption amount in 100% RH at 23° C.

Example 4.1

First, 95 parts by weight of the EVOH (E-1), 5 parts by weight of the polyoctenylene (A-1) and 0.85 parts by weight of cobalt(II) stearate (800 ppm in terms of cobalt atom) were dry-blended and pelletized by extrusion using a 25 mmΦ twin-screw extruder (LABO PLASTOMIL MODEL 15C300 manufactured by Toyo Seiki Seisakusho Ltd.) at a screw rotation of 100 rpm at 210° C. at an extruded resin amount of 6 kg/hour. The pellets were then dried under a reduced pressure at 40° C. for 16 hours to give resin composition pellets composed of the EVOH (E-1), the polyoctenylene (A-1) and cobalt stearate.

The obtained resin composition pellets were subjected to extrusion molding at 210° C. to give a film having a thickness of 20 μm. Observation of the cross-section of the film through an electron microscope revealed that the polyoctenylene (A-1) was dispersed in the form of particles having a size of 1 μm or less in the matrix of the EVOH (E-1).

The dispersed particle size of the polyoctenylene (A-1) in the EVOH (E-1) in the above-described film was measured by the Os staining method. Table 4 shows the average size of major axis and the average size of minor axis of the polyoctenylene (A-1) particles in a photograph obtained when the cross section obtained by cutting the film in the direction (TD direction) perpendicular to the extrusion direction (MD direction) of the film was photographed from the MD direction (hereinafter referred to as the "photograph observed from the MD direction"). Furthermore, Table 4 also shows the average size of major axis and the average size of minor axis of the polyoctenylene (A-1) particles in a photograph obtained when the cross section obtained by cutting the film in the direction parallel to the extrusion direction (MD direction) of the film was photographed in the TD direction (hereinafter referred to as the "photograph observed from the TD direction"). Using this film, the oxygen absorption amount of the resin composition in 100% RH at 60° C. was measured in the same manner as in Example 3.1, and the oxygen absorption rate and the oxygen absorption amount (mol) per mol of carbon-carbon double bond were calculated. The results are shown in Table 4. Table 4 also shows the results of the same evaluation as described above carried out in Examples 4.2 to 4.7 and Comparative Examples 4.1 to 4.4 below.

Example 4.2

Resin composition pellets were obtained and extrusion-molded to give a film in the same manner as in Example 4.1 except that 93 parts by weight of the EVOH (E-1), 5 parts by weight of the polyoctenylene (A-1), 2 parts by weight of the compatibilizer (F-1) and 0.85 parts by weight of cobalt(II) stearate (800 ppm in terms of cobalt atom) were used. Observation of the cross-section of the film through an electron microscope revealed that the polyoctenylene (A-1) was dispersed in the form of particles having a size of 1 μm or less in the matrix of the EVOH (E-1). Using this film, evaluation was performed in the same manner as in Example 4.1.

Example 4.3

A film was obtained in the same manner as in Example 4.1 except that the polyoctenylene (A-3) obtained in Synthesis Example 3 was used in place of the polyoctenylene (A-1). Observation of the cross-section of the film through an electron microscope revealed that the polyoctenylene (A-3) was dispersed in the form of particles having a size of 1 to 5 μm or less in the matrix of the EVOH (E-1). Using this film, evaluation was performed in the same manner as in Example 4.1.

Example 4.4

Resin composition pellets were obtained and extrusion-molded to give a film in the same manner as in Example 4.1 except that 93 parts by weight of the EVOH (E-1), 5 parts by weight of the polyoctenylene (A-3), 2 parts by weight of the compatibilizer (F-1) and 0.85 parts by weight of cobalt(II) stearate (800 ppm in terms of cobalt atom) were used. Observation of the cross-section of the film through an electron microscope revealed that the polyoctenylene (A-3) was dispersed in the form of particles having a size of 1 to 5 μm in the matrix of the EVOH (E-1). Using this film, evaluation was performed in the same manner as in Example 4.1.

Example 4.5

First, 95 parts by weight of the EVOH (E-1), 5 parts by weight of the polyoctenylene (A-1) and 0.85 parts by weight of cobalt(II) stearate (800 ppm in terms of cobalt atom) were dry-blended, and melt-kneaded in a total resin amount of 70.59 g using a roller mixer (LABO PLASTOMIL MODEL R100 manufactured by Toyo Seiki Seisakusho Ltd.) at a screw rotation of 10 rpm at 200° C. while purging the chamber with nitrogen, and removed 5 minutes later in the bulk form. This operation was repeated 8 times, and the obtained bulk product was cut into pellets to give resin composition pellets composed of the EVOH (E-1), the polyoctenylene (A-1) and cobalt stearate.

The obtained resin composition pellets were subjected to extrusion molding at 210° C. to give a film having a thickness of 20 μm. Observation of the cross-section of the film through an electron microscope revealed that the polyoctenylene (A-1) was dispersed in the form of particles having a size of 1 to 10 μm in the matrix of the EVOH (E-1). Using this film, evaluation was performed in the same manner as in Example 4.1.

Example 4.6

A resin composition was obtained and extrusion-molded to give a film in the same manner as in Example 4.5 except that 93 parts by weight of the EVOH (E-1), 5 parts by weight of the polyoctenylene (A-1), 2 parts by weight of the compatibilizer (F-1) and 0.85 parts by weight of cobalt(II) stearate (800 ppm in terms of cobalt atom) were used. Observation of the cross-section of the film through an electron microscope revealed that the polyoctenylene (A-1) was dispersed in the form of particles having a size of 1 to 5 μm in the matrix of the EVOH (E-1). Using this film, evaluation was performed in the same manner as in Example 4.1.

Example 4.7

A resin composition was obtained and extrusion-molded to give a film in the same manner as in Example 4.1 except that the polyethylene (E-2) was used in place of the EVOH (E-1). Observation of the cross-section of the film through an electron microscope revealed that the polyoctenylene (A-1) was dispersed in the form of particles having a size of 1 μm or less in the matrix of the polyethylene (E-2). Using this film, evaluation was performed in the same manner as in Example 4.1.

Comparative Example 4.1

Resin composition pellets were obtained and extrusion-molded to give a film in the same manner as in Example 4.1 except that the polybutadiene (A'-1) was used in place of the polyoctenylene (A-1). Observation of the cross-section of the film through an electron microscope revealed that the polybutadiene (A'-1) was dispersed in the form of particles having a size of 1 to 5 μm in the matrix of the EVOH (E-1). Using this film, evaluation was performed in the same manner as in Example 4.1.

Comparative Example 4.2

Resin composition pellets were obtained and extrusion-molded to give a film in the same manner as in Example 4.1 except that 93 parts by weight of the EVOH (E-1), 5 parts by weight of the polybutadiene (A'-1), 2 parts by weight of the compatibilizer (F-1) and 0.85 parts by weight of cobalt(II) stearate (800 ppm in terms of cobalt atom) were used. Observation of the cross-section of the film through an electron microscope revealed that the polybutadiene (A'-1) was dispersed in the form of particles having a size of 1 to 2 μm in the matrix of the EVOH (E-1). Using this film, evaluation was performed in the same manner as in Example 4.1.

Comparative Example 4.3

Resin composition pellets were obtained and extrusion-molded to give a film in the same manner as in Example 4.1 except that the polybutadiene (A'-5) was used in place of the polyoctenylene (A-1). Observation of the cross-section of the film through an electron microscope revealed that the polybutadiene (A'-5) was dispersed in the form of particles having a size of 2 μm or less in the matrix of the EVOH (E-1). Using this film, evaluation was performed in the same manner as in Example 4.1.

Comparative Example 4.4

Resin composition pellets were obtained and extrusion-molded to give a film in the same manner as in Example 4.1 except that the styrene-isoprene-styrene triblock copolymer (A'-4) obtained in Comparative Synthesis Example 3 was used in place of the polyoctenylene (A-1). Observation of the cross-section of the film through an electron microscope revealed that the styrene-isoprene-styrene triblock copolymer (A'-4) was dispersed in the form of particles having a size of 1 to 2 μm in the matrix of the EVOH (E-1). Using this film, evaluation was performed in the same manner as in Example 4.1.

Synthesis Example 5

Synthesis of Polyoctenylene (A-4)

The polyoctenylene (A-1) obtained in Synthesis Example 1 was crushed into pieces having a length of about 1 mm on each side and placed in a 500-ml separable flask equipped with a stirrer, a condenser and a thermometer. Then, 300 g of acetone was added thereto, and the mixture was stirred at 40° C. for 3 hours. The acetone was removed by decantation, and 300 g of acetone was added again and the mixture was stirred at 40° C. for 3 hours. The acetone was removed by decantation and then by distillation under a reduced pressure. The

TABLE 4

| | Resin (A) | A/E/F*1 (Weight ratio) | Kneading condition*2 | MD direction*3 Major axis | MD direction*3 Minor axis | TD direction*4 Major axis | TD direction*4 Minor axis |
|---|---|---|---|---|---|---|---|
| Example 4.1 | POE(1) | 5/95/0 | (i) | 0.25 | 0.15 | 0.80 | 0.24 |
| Example 4.2 | POE(1) | 5/93/2 | (i) | 0.09 | 0.05 | 0.12 | 0.06 |
| Example 4.3 | POE(3) | 5/95/0 | (i) | 2.5 | 2.0 | 2.5 | 2.0 |
| Example 4.4 | POE(3) | 5/93/2 | (i) | 1.5 | 1.2 | 1.5 | 1.2 |
| Example 4.5 | POE(1) | 5/95/0 | (ii) | 3.0 | 2.1 | 4.0 | 3.2 |
| Example 4.6 | POE(1) | 5/93/2 | (ii) | 2.0 | 1.6 | 2.0 | 1.6 |
| Example 4.7 | POE(1) | 5/95/0 | (i) | 0.08 | 0.04 | 0.1 | 0.06 |
| Comparative Example 4.1 | PBd(1) | 5/95/0 | (i) | 2.5 | 0.21 | 2.5 | 0.15 |
| Comparative Example 4.2 | PBd(1) | 5/93/2 | (i) | 1.5 | 0.15 | 1.5 | 0.26 |
| Comparative Example 4.3 | PBd(2) | 5/95/0 | (i) | 0.23 | 0.13 | 0.79 | 0.20 |
| Comparative Example 4.4 | SIS | 5/95/0 | (i) | 0.20 | 0.13 | 2.16 | 0.30 |

| | Oxygen absorption amount (ml/g)*5 | | | | | Oxygen absorption rate (ml/(g·day)) | Oxygen absorption amount (mol $O_2$/mol C=C) |
|---|---|---|---|---|---|---|---|
| | 1 Day | 2 Days | 7 Days | 14 Days | 28 Days | | |
| Example 4.1 | 26.7 | 28.3 | 32.4 | 34.3 | 40.0 | 0.8 | 2.77 |
| Example 4.2 | 32.5 | 35.0 | 38.6 | 41.3 | 45.5 | 0.7 | 3.33 |
| Example 4.3 | 14.2 | 15.1 | 19.2 | 22.6 | 23.0 | 0.8 | 1.82 |
| Example 4.4 | 15.3 | 16.8 | 20.2 | 24.2 | 25.3 | 0.7 | 1.95 |
| Example 4.5 | 11.2 | 13.0 | 18.2 | 20.9 | 21.9 | 1.0 | 1.69 |
| Example 4.6 | 14.0 | 14.9 | 18.9 | 22.1 | 22.8 | 0.8 | 1.78 |
| Example 4.7 | 32.8 | 34.8 | 40.1 | 44.1 | 47.4 | 1.1 | 3.56 |
| Comparative Example 4.1 | 6.5 | 8.2 | 12.4 | 15.2 | 18.5 | 0.8 | 0.60 |
| Comparative Example 4.2 | 13.7 | 14.6 | 19.7 | 22.4 | 25.8 | 1.0 | 0.89 |
| Comparative Example 4.3 | 26.3 | 27.7 | 29.5 | 31.6 | 35.7 | 0.4 | 1.25 |
| Comparative Example 4.4 | 15.0 | 16.4 | 17.6 | 18.3 | 18.3 | 0.2 | 1.07 |

POE(1): Polyoctenylene (A-1)
POE(3): Polyoctenylene (A-3)
PBd(1): Polybutadiene (A'-1)
PBd(2): Polybutadiene (A'-5)
SIS: Styrene-isoprene-styrene triblock copolymer (A'-4)
*1Weight ratio of thermoplastic resin (A) to matrix resin (E) to compatibilizer (F) Matrix resin (E) was polyethylene (E-2) in Example 4.7 and EVOH (E-1) in the other examples. Compatibilizer (F): F-1
*2(i) Extrusion/pelletization at 210° C. at 100 rpm
(ii) Melt-kneading/pelletization of bulk at 200° C. and 10 rpm
*3Analysis of a photograph observed from MD direction
*4Analysis of a photograph observed from TD direction
*5Oxygen absorption amount in 100% RH at 60° C.

residue was dried in a vacuum dryer at 50 Pa and 100° C. for 6 hours to give 96.1 g of a polymer having a weight average molecular weight of 163000 and containing an oligomer having a molecular weight of 1000 or less in a ratio of 3.1%.

Synthesis Example 6

Synthesis of Polyoctenylene (A-5)

Acetone washing was carried out in the same manner as in Synthesis Example 5 except that the polyoctenylene (A-2) obtained in Synthesis Example 2 was used in place of the polyoctenylene (A-1), and as a result, 87.8 g of a polymer having a weight average molecular weight of 94000 and an oligomer content of 3.3% was obtained.

Example 5.1

First, 100 parts by weight of the polyoctenylene (A-4) obtained in Synthesis Example 5 and 0.85 parts by weight of cobalt(II) stearate (800 ppm in terms of cobalt atom) were dry-blended, and melt-kneaded in a total resin amount of 70.59 g using a roller mixer (LABO PLASTOMIL MODEL R100 manufactured by Toyo Seiki Seisakusho Ltd.) at a screw rotation of 60 rpm at 190° C. while purging the chamber with nitrogen, and removed 5 minutes later in the bulk form. The obtained bulk product was cut into pellets to give resin composition pellets composed of the polyoctenylene (A-4) and cobalt stearate.

The obtained resin composition pellets were supplied to a compression molding machine (manufactured by Shindo Metal Industries) and molded at an extrusion temperature of 200° C. to give a sheet having a thickness of 100 µm. Then, this sheet was cut to obtain a sample sheet of 0.1 g and the sheet was precisely weighed. The sheet was rolled 5 hours after the sheet formation and placed in a standard bottle having an internal volume of 260 ml that had been filled with 50% RH air at 23° C. The air in the standard bottle contained oxygen and nitrogen in a volume ratio of 21:79. Then, 5 ml of water was added to the standard bottle, and the opening of the standard bottle was sealed with a multilayered sheet including an aluminum layer using an epoxy resin, and the bottle was left to stand at 60° C. After the sealing, the inner air was sampled with a syringe periodically to measure the oxygen concentration in the air by gas chromatography. The small hole formed in the multilayered sheet during the measurement was sealed with the epoxy resin every time the hole was formed. The oxygen absorption amount of the resin composition in a 100% RH atmosphere at 60° C. was obtained by calculating the amount of oxygen decreased based on the volume ratio of oxygen to nitrogen obtained by the measurement. Table 5.1 shows the oxygen absorption amount (cumulative amount) in 1 day (24 hours), 4 days (96 hours), 7 days (168 hours) and 14 days (336 hours) after sealing. The oxygen absorption amount in 14 days (cumulative amount of oxygen absorption) was adopted to calculate the oxygen absorption amount per 1 mol of carbon-carbon double bonds of the resin contained in the resin composition, and the result was 2.07 mols.

Separately, 1 g of the same sheet was precisely weighed, rolled 5 hours after the sheet formation and placed in a standard bottle having an internal volume of 85 ml that had been filled with 50% RH air at 23° C. Then, 1 ml of water was added to the standard bottle, and the opening of the standard bottle was sealed with a multilayered sheet including an aluminum layer using an epoxy resin, and the bottle was left to stand at 60° C. for 2 weeks. Then, 10 ml of the headspace gas of the sample in the bottle was sampled with a gas-tight syringe, and the gas was collected and concentrated in a TENAX-TA tube at −40° C. The collected gas was desorbed by rapid heating at 320° C. and introduced into GC/MS. The concentration and the introduction into GC/MS of the generated gas were performed using a concentrating apparatus, Head Space Sampler JHS-100A.

The measurement conditions of GC/MS are as follows.

Heat desorption apparatus: Head Space Sampler JHS-100A (manufactured by Japan Analytical Industry Co., Ltd.)

Redesorption temperature: 320° C., 25 sec.

MS apparatus: Mass spectrometer JMS SX102A (manufactured by JEOL Ltd.)

Data processing: Data processing system MS-MP 7000 (manufactured by JEOL Ltd.)

GC apparatus: HP 5890 (manufactured by Hewlett Packard)

Carrier gas: Helium 20 ml/min

Column: Pora PROT Q 25 m×0.32 mmID

Column temperature: 80° C. to 250° C. (temperature increase rate: 8° C./min)

Inlet temperature: 270° C.

Separator temperature: 270° C.

Acetone gas was collected in a vacuum collecting bottle and diluted with nitrogen gas to prepare a standard gas (concentration: 4 µg/ml to 5 µg/ml). Using this standard gas, a calibration curve was prepared. This calibration curve was used to calculate the amounts of gases shown in Table 5.2. The weight of various gases generated and contained in the headspace was converted to a gas weight per unit weight of the measurement sample based on the following equation, and the resultant value was taken as the amount of generated gas (gas analysis value; unit: ppm).

$$\text{Amount of gas generated (ppm=µg/g)} = \text{Amount detected (µg)} \times (85/10)/1$$

85: volume (ml) of standard bottle
10: volume (ml) of headspace gas
1: total amount (g) of sample sheet used The results of gas analysis values are shown in Table 5.2.

Example 5.2

Resin composition pellets were obtained and a sheet was prepared in the same manner as in Example 5.1 except that the polyoctenylene (A-5) obtained in Synthesis Example 6 was used in place of the polyoctenylene (A-4). Using this sheet, the oxygen absorption amount was obtained, and the oxygen absorption amount (mol) per mol of carbon-carbon double bond were calculated, in the same manner as in Example 5.1. The results are shown in Table 5.1.

Comparative Examples 5.1 to 5.3

Resin composition pellets were obtained and sheets were prepared in the same manner as in Example 5.1 except that the polybutadiene (A'-1), the hydroxyl group-containing polybutadiene (A'-3) obtained in Comparative Synthesis Example 2 or the styrene-isoprene-styrene triblock copolymer (A'-4) obtained in Comparative Synthesis Example 3 was used in place of the polyoctenylene (A-4). Using these sheets, the oxygen absorption amount was obtained, and the oxygen absorption amount (mol) per mol of carbon-carbon double bonds was calculated, in the same manner as in Example 5.1. Moreover, using these sheets, the amount of generated gas was calculated in the same manner as in Example 5.1. The results are shown in Tables 5.1 and 5.2.

TABLE 5.1

|  | Resin (A) | Oxygen absorption amount (ml/g) | | | | Oxygen absorption amount (mol $O_2$/mol C=C) |
|---|---|---|---|---|---|---|
|  |  | 1 Day | 4 Days | 7 Days | 14 Days |  |
| Example 5.1 | POE(4) | 356.4 | 452.1 | 479.6 | 512.6 | 2.07 |
| Example 5.2 | POE(5) | 341 | 440 | 473 | 506 | 2.04 |
| Comparative Example 5.1 | PBd(1) | 114 | 151 | 196 | 228 | 0.45 |
| Comparative Example 5.2 | PBd-OH | 120 | 160 | 200 | 210 | 0.49 |
| Comparative Example 5.3 | SIS | 99 | 153 | 179 | 202 | 0.59 |

POE(4): Polyoctenylene (A-4)
POE(5): Polyoctenylene (A-5)
PBd(1): Polybutadiene (A'-1)
PBd-OH: Hydroxyl group-containing polybutadiene (A'-3)
SIS: Styrene-isoprene-styrene triblock copolymer (A'-4)

TABLE 5.2

| Generated Gas | Example 5.1 | Comparative Example 5.1 | Comparative Example 5.2 | Comparative Example 5.3 |
|---|---|---|---|---|
| Acetone | 1.0 | 0.7 | 0.4 | 9.3 |
| Methyl ethyl ketone | 0.5 | 4.9 | 4.3 | 5.6 |
| Propionaldehyde | ND | ND | ND | 0.7 |
| Furans | 0.5 | 4.9 | 3.2 | 10.9 |
| Propene | 0.1 | 0.2 | 0.4 | 0.8 |
| Butene | 0.1 | 0.5 | 1.2 | 4.2 |
| Cyclohexane | ND | ND | ND | 0.3 |
| Methylene-cyclobutane | ND | ND | ND | 0.5 |

Unit: ppm
ND: Not detected

Example 6.1

In this example, Examples 6.2 and 6.3 and Reference Examples 1.1 and 1.2, EVOH (E-1) as used in Example 2.1 was used as the matrix resin (E). The composition and physical properties of the EVOH (E-1) are as follows:

Ethylene content: 32 mol %
Degree of saponification: 99.6%
MFR: 3.1 g/10 min (210° C., 2160 g load)
Phosphate compound content: 100 ppm
(in terms of phosphoric acid radical)
Sodium salt content: 65 ppm (in terms of sodium)
Melting point: 183° C.
Oxygen transmission rate: 0.4 ml·20 μm/($m^2$·day·atm)(20° C., 65% RH).

First, 90 parts by weight of the EVOH (E-1), 10 parts by weight of the polyoctenylene (A-4) and 0.85 parts by weight of cobalt(II) stearate (800 ppm in terms of cobalt atom) were dry-blended, and melt-kneaded in a total resin amount of 70.59 g using a roller mixer (LABO PLASTOMIL MODEL R100 manufactured by Toyo Seiki Seisakusho Ltd.) at a screw rotation of 60 rpm at 200° C. while purging the chamber with nitrogen. The mixture was removed in the bulk form after 5 minutes. The obtained bulk product was cut into pellets to give resin composition pellets composed of the EVOH (E-1), the polyoctenylene (A-4) and cobalt stearate.

The obtained resin composition pellets were supplied to a compression molding machine (manufactured by Shindo Metal Industries) and processed into a sheet at an extrusion temperature of 210° C. to give a sheet having a thickness of 100 μm. Observation of the cross-section of the sheet through an electron microscope revealed that the polyoctenylene (A-4) was dispersed in the form of particles having a size of 1 μm or less in the matrix of the EVOH (E-1).

Then, this sheet was cut to obtain a sample sheet of 0.5 g and the sheet was precisely weighed and, as in Example 5.1, placed in a standard bottle. A measurement was carried out as in Example 5.1, except that the temperature at which the sheet was left to stand was 23° C., to obtain the oxygen absorption amount of the resin composition in a 100% RH atmosphere at 23° C. The initial oxygen absorption rate calculated from the results obtained 3 days after the start of the measurement was 3.7 ml/(g·day). Using this value, the oxygen absorption amount per 1 mol of carbon-carbon double bonds of the resin contained in the resin composition was calculated to be 0.18 mol/day. The results are shown in Table 6. The results obtained in Examples 6.2 and Reference Examples 1.1 to 1.2 below are also shown in Table 6.

Example 6.2

A sheet made of a resin composition was obtained in the same manner as in Example 6.1 except that the polyoctenylene (A-5) obtained in Synthesis Example 6 was used in place of the polyoctenylene (A-4). Using this sheet, evaluation was carried out in the same manner as in Example 6.1. Observation of the cross-section of the sheet through an electron microscope as in Example 6.1 revealed that the polyoctenylene (A-5) was dispersed in the form of particles having a size of 1 μm or less in the matrix of the EVOH (E-1).

Example 6.3

A sheet made of a resin composition was obtained in the same manner as in Example 6.1 except that 91 parts by weight of the EVOH (E-1), 8 parts by weight of the polyoctenylene (A-4) and 1 part by weight of the compatibilizer (F-1). Observation of the cross-section of the sheet through an electron microscope as in Example 6.1 revealed that the polyoctenylene (A-4) was dispersed in the form of particles having a size of 1 μm or less in the matrix of the EVOH (E-1). The obtained sheet exhibited good oxygen absorption.

Reference Examples 1.1 and 1.2

Sheets made of resin compositions were obtained in the same manner as in Example 6.1 except that the polymers obtained in Synthesis Examples 1 and 2 (corresponding to the polymers before acetone washing in Synthesis Examples 5 and 6, respectively) were used as thermoplastic resins (A). Using these sheets, evaluation was carried out in the same manner as in Example 6.1.

Example 7.1

With respect to the resin composition obtained in Example 6.1, an odor evaluation was carried out according to the following method.
(i) Odor Evaluation of Resin Composition Sheet
The sheet having a thickness of 100 μm obtained in Example 6.1 was cut to obtain a sample sheet of 1 g and the Examples 7.2 and 7.3

Evaluation was carried out in the same manner as in Example 7.1 except the resin compositions obtained in Examples 6.2 and 6.3 were used as resin compositions.

Reference Examples 2.1 and 2.2

Resin compositions were obtained in the same manner as in Example 6.1 except that the polymers obtained in Synthesis Example 1 and 2 (corresponding to the polymers before acetone washing in Synthesis Examples 5 and 6, respectively) were used in place of the polyoctenylene (A-4). Using the resin compositions, evaluation was carried out in the same manner as in Example 7.1.

TABLE 6

| | Resin (A) | | A/E*1 | Oxygen absorption amount (ml/g)*2 | | | | | Initial oxygen absorption rate (ml/(g · day)) | Oxygen absorption rate (ml/(g · day)) | Oxygen absorption amount (mol O$_2$/mol C=C · day) |
| | Polymer | Acetone washing | (Weight ratio) | 3 Days | 8 Days | 15 Days | 22 Days | 29 Days | | | |
| --- | --- | --- | --- | --- | --- | --- | --- | --- | --- | --- | --- |
| Example 6.1 | POE(4) | Performed | 10/90 | 11.0 | 18.9 | 25.6 | 33.9 | 47.2 | 3.7 | 1.6 | 0.18 |
| Example 6.2 | POE(5) | Performed | 10/90 | 10.6 | 18.0 | 25.1 | 33.1 | 45.8 | 3.5 | 1.5 | 0.17 |
| Reference Example 1.1 | POE(1) | Not performed | 10/90 | 10.0 | 17.2 | 23.3 | 30.8 | 42.9 | 3.3 | 1.4 | 0.16 |
| Reference Example 1.2 | POE(2) | Not performed | 10/90 | 9.6 | 16.4 | 22.8 | 30.1 | 41.6 | 3.2 | 1.4 | 0.16 |

*1Weight ratio of thermoplastic resin (A) to matrix resin (E)
*2Oxygen absorption amount in 100% RH at 23° C.
POE(1): Polyoctenylene (A-1)
POE(2): Polyoctenylene (A-2)
POE(4): Polyoctenylene (A-4)
POE(5): Polyoctenylene (A-5)

sheet was precisely weighed. The sheet was rolled 5 hours after the sheet formation and placed in a standard bottle having an internal volume of 85 ml that had been filled with 50% RH air at 23° C. Then, 1 ml of water was added to the standard bottle, and the opening of the standard bottle was sealed with a multilayered sheet including an aluminum layer using an epoxy resin, and the bottle was left to stand at 60° C. for 2 weeks. Thereafter, the odor of the headspace gas of the sample was subjected to sensory evaluation by a panel of 5 people.

The results are shown in Table 7. In Table 7, ⊚ indicates that almost no odor is present in a headspace gas; ○ indicates that odor is present in a headspace gas to a low level; Δ indicates that odor is present in a headspace gas; and x indicates that strong odor is present in a headspace gas. In this example and in the examples and reference examples described below, the results of the evaluations by the 5 panelists were in agreement.
(ii) Odor Evaluation of Water after Hot Water Treatment
To 100 parts by weight of the resin composition pellets obtained in Example 6.1, 500 parts by weight of water at 80° C. was added, and subjected to hot water extraction for 3 hours. The resin composition pellets were then removed. The results of odor evaluation of the hot water by the panelists are shown in Table 7. The symbols for evaluation results are the same as those described above.

TABLE 7

| | Resin (A) | | A/E/F*1 | Odor | |
| | Polymer | Acetone washing | (Weight ratio) | Sheet*2 | Hot water treatment*3 |
| --- | --- | --- | --- | --- | --- |
| Example 7.1 | POE(4) | Performed | 10/90/0 | ⊚ | ○ |
| Example 7.2 | POE(5) | Performed | 10/90/0 | ⊚ | ○ |
| Example 7.3 | POE(4) | Performed | 8/91/1 | ⊚ | ○ |
| Reference Example 2.1 | POE(1) | Not performed | 10/90/0 | ⊚ | Δ |
| Reference Example 2.2 | POE(2) | Not performed | 10/90/0 | ⊚ | Δ |

POE(1): Polyoctenylene (A-1)
POE(2): Polyoctenylene (A-2)
POE(4): Polyoctenylene (A-4)
POE(5): Polyoctenylene (A-5)
*1Weight ratio of thermoplastic resin (A) to matrix resin (E) to compatibilizer (F)
*2Odor of sheet
*3Odor of water after hot water treatment As described above, when samples having a high oligomer content and samples having a reduced oligomer content (sheets and pellets) are compared, the samples themselves do not show any difference in odor of the water used in the treatment, but once subjected to a hot water treatment, there is a large difference in odor. The reason therefor is not clear, but it is presumed that the oligomer itself having a molecular weight of 1000 or less does not give out any odor because of being prevented by a gas barrier resin, but once subjected to a hot water treatment, part of the oligomer undergoes bleed-out because the hydrogen bonding in the gas barrier resin is weakened, and in addition, the apparent vapor pressure is increased due to the azeotropy with water, and thereby the odor is felt. Therefore, by reducing the oligomer content as described above, a composition that is useful in applications such as food containers or the like that are subjected, in particular, to a retort treatment or the like can be provided, and it is thus expected to make contributions to the enhanced safety of food container.

Example 8.1

The polyoctenylene (A-1) obtained in Synthesis Example 1 and 500 ppm of Irganox 1076 (hereinafter referred to as the antioxidant (C-1)) were immediately dry-blended and melt-kneaded in a total resin amount of 70.59 g using a roller mixer (LABO PLASTOMIL MODEL R100 manufactured by Toyo Seiki Seisakusho Ltd.) at a screw rotation of 60 rpm at 190° C. while purging the chamber with nitrogen, and removed as a bulk after 5 minutes. The obtained bulk product was cut into pellets to give a mixture (I) of the polyoctenylene (A-1) and the antioxidant (C-1). This mixture (I) in the form of pellets was stored for 30 days in a polyethylene bag in 65% RH air at 20° C.

First, the mixture (I) after storage (100 parts by weight in terms of the polyoctenylene (A-1)) and 0.85 parts by weight of cobalt(II) stearate (800 ppm in terms of cobalt atom) were dry-blended, melt-kneaded in a total resin amount of 70.59 g using a roller mixer (LABO PLASTOMIL MODEL R100 manufactured by Toyo Seiki Seisakusho Ltd.) at a screw rotation of 60 rpm at 190° C. while purging the chamber with nitrogen, and removed as a bulk after 5 minutes. The obtained bulk product was cut into pellets to give resin composition pellets composed of the polyoctenylene (A-1), the antioxidant (C-1) and cobalt stearate.

The resin composition pellets were supplied to a compression molding machine (manufactured by Shindo Metal Industries) and molded at an extrusion temperature of 200° C. to give a sheet having a thickness of 100 μm. From the appearance of the obtained sheet, the extent of coloring and gel generation was evaluated. Table 8 shows the results. With regard to sheet coloring in Table 8, ⊚ indicates no sheet coloring, Δ indicates slight sheet coloring, and x indicates significant sheet coloring. With regard to gel generation, ⊚ indicates no gel generation in the sheet, ○ indicates a slight presence of gel in the sheet at a level free of problem in appearance, and Δ indicates a presence of some gel in the sheet.

Examples 8.2 to 8.4

Mixtures (II) to (IV) in the form of pellets were obtained in the same manner as in Example 8.1 except that the amounts of the antioxidant (C-1) were 1000 ppm, 2000 ppm and 5000 ppm, respectively. Using the pellets, evaluation was carried out in the same manner as in Example 8.1. The results are shown in FIG. 8.

Reference Examples 3.1 and 3.2

Mixtures (V) and (VI) in the form of pellets were obtained in the same manner as in Example 8.1 except that the amounts of the antioxidant (C-1) were 10 ppm and 10000 ppm, respectively. Using the pellets, evaluation was carried out in the same manner as in Example 8.1. The results are shown in FIG. 8.

TABLE 8

| | Resin (A) | Antioxidant (C-1) (ppm) | Appearance of sheet | |
|---|---|---|---|---|
| | | | Coloration | Gelation |
| Example 8.1 | POE(1) | 500 | ⊚ | ⊚ |
| Example 8.2 | POE(1) | 1,000 | ⊚ | ⊚ |
| Example 8.3 | POE(1) | 2,000 | ⊚ | ⊚ |
| Example 8.4 | POE(1) | 5,000 | ⊚ | ⊚ |
| Reference Example 3.1 | POE(1) | 10 | X | Δ |
| Reference Example 3.2 | POE(1) | 10,000 | Δ | ○ |

POE(1): Polyoctenylene (A-1)
Coloration ⊚: no sheet coloring
Coloration Δ: slight sheet coloring
Coloration X: significant sheet coloring
Gelation ⊚: no gel generation
Gelation ○: slight presence of gel in the sheet to an extent free of problem
Gelation Δ: presence of some gel in the sheet Example 9.1

First, 90 parts by weight of the EVOH (E-1), 10 parts by weight of the mixture (I) of the polyoctenylene (A-1) and the antioxidant (C-1) and 0.85 parts by weight of cobalt(II) stearate (800 ppm in terms of cobalt atom) were dry-blended and pelletized by extrusion using a 25 mmΦ twin-screw extruder (LABO PLASTOMIL MODEL 15C300 manufactured by Toyo Seiki Seisakusho Ltd.) at a screw rotation of 100 rpm at 210° C. in an extruded resin amount of 6 kg/hour. Then, the pellets were dried under a reduced pressure at 40° C. for 16 hours to give resin composition pellets composed of the EVOH (E-1), the polyoctenylene (A-1), the antioxidant (C-1) and cobalt stearate.

The pellets were placed in an aluminium bag and stored for 180 days, and then using the resin composition pellets, extrusion molding was performed at an extrusion temperature of 210° C. to give a film having a thickness of 20 μm. Then, the obtained film was cut to obtain a sample film of 0.1 g and the film was precisely weighed. The film was rolled 5 hours after the film formation and placed in a standard bottle having an internal volume of 260 ml that had been filled with 50% RH air at 23° C. The air in the standard bottle contained oxygen and nitrogen in a volume ratio of 21:79. Then, 5 ml of water was added to the standard bottle, and the opening of the standard bottle was sealed with a multilayered sheet including an aluminum layer using an epoxy resin, and the bottle was left to stand at 60° C. After the sealing, the inner air was sampled with a syringe periodically to measure the oxygen concentration in the air by gas chromatography. The small hole formed in the multilayered sheet during the measurement was sealed with the epoxy resin every time the hole was formed. The oxygen absorption amount of the resin composition in a specific period of time in a 100% RH atmosphere at 60° C. was obtained by calculating the amount of oxygen decreased based on the volume ratio of oxygen to nitrogen obtained by the measurement. The results are shown in Table 9.

The polyoctenylene (A-1) was confirmed as showing a good oxygen absorbency and oxygen absorption rate.

Examples 9.2 to 9.4

Resin composition pellets were obtained, films were prepared and evaluation was carried out in the same manner as in Example 9.1 except that the mixtures (II) to (IV) described above were used. The results are shown in Table 9.

Reference Examples 4.1 and 4.2

Resin composition pellets were obtained, films were prepared and evaluation was carried out in the same manner as in Example 9.1 except that the mixtures (V) and (VI) described above were used. The results are shown in Table 9.

TABLE 9

| | Resin (A) | Anti-oxidant (C-1) (ppm) | Oxygen absorption amount (ml/g)*1 | | | |
|---|---|---|---|---|---|---|
| | | | 1 Day | 7 Days | 14 Days | 23 Days |
| Example 9.1 | POE(1) | 500 | 46.7 | 48.8 | 50.8 | 52.8 |
| Example 9.2 | POE(1) | 1,000 | 43.0 | 44.6 | 47.1 | 49.0 |
| Example 9.3 | POE(1) | 2,000 | 37.8 | 49.5 | 52.3 | 56.7 |
| Example 9.4 | POE(1) | 5,000 | 33.9 | 48.8 | 51.6 | 52.4 |
| Reference Example 4.1 | POE(1) | 10 | 48.9 | 49.9 | 51.8 | 54.5 |
| Reference Example 4.2 | POE(1) | 10,000 | 20.1 | 23.2 | 26.1 | 27.2 |

POE(1): Polyoctenylene (A-1)
*1Oxygen absorption amount in 100% RH at 60° C.

As is clear from Tables 8 and 9, in the resin compositions containing the antioxidant (C-1) in specific ratios (500 ppm to 5000 ppm), even when the polyoctenylene (A-1) is stored for a relatively long period of time after production, the oxidation of the polyoctenylene during storage is suppressed. Therefore, sheets having excellent moldability and a superior appearance can be obtained, and the oxygen absorbency thereof is also good.

Resin compositions themselves have, in nature, excellent moldability and good oxygen absorbency, and can produce sheets having a superior appearance. However, it can be understood that, when a resin composition having an excessively small amount of antioxidant is stored for a long time, a change in appearance and deterioration of oxygen absorbency occur due to coloring and gelation.

In a resin composition containing an excessively large amount of antioxidant, pellets are colored due to the oxidation of the antioxidant itself, and as a result, a sheet having a good appearance cannot be obtained. Moreover, it is presumed that original oxygen absorption of the oxygen-absorbing resin composition itself is inhibited by the prevention of oxidation, so that oxygen absorbency is reduced.

Synthesis Example 7

Synthesis of Polyoctenylene (A-6)

(i) Preparation of Monomer Solution

First, a 3 L glass three-neck flask equipped with a stirrer and a thermometer was purged with dry nitrogen, and then 502 g of decane in which 320 g (2.9 mol) of cis-cyclooctene and 543 mg (4.9 mmol) of cis-4-octene had been dissolved was placed therein to prepare a monomer solution.

(ii) Preparation of Catalytic Solution

First, a 3 L glass three-neck flask equipped with a stirrer and a thermometer was purged with dry nitrogen, and then 779 g of decane was placed therein. Then, a solution was prepared by dissolving 24.6 mg (29 μmol) of benzylidene(1,3-dimesitylimidazolidin-2-ylidene) (tricyclohexylphosphine) ruthenium dichloride in 1 g of toluene, and this solution was promptly added to the above-described decane to prepare a catalytic solution.

(iii) Continuous Polymerization Process

The monomer solution and the catalytic solution prepared as above were both supplied at a flow rate of 100 ml/min to a static mixer equipped with a thermometer (manufactured by Noritake Co., Limited; a static mixer in which two T3-17, two T4-21 and one T4-15 were connected), and a ring-opening metathesis polymerization was carried out at 100° C. The discharged fluid was analyzed by gas chromatography (GC-14B manufactured by Shimadzu Corporation; column: G-100 manufactured by Chemical Product Inspection Society), and it was confirmed that the conversion ratio of cis-cyclooctene was 95%.

To the reaction mixture obtained by supplying the monomer solution and the catalytic solution for 6 minutes, 720 g of methanol was added, and the mixture was stirred at 40° C. for 30 minutes. The mixture was left to stand still at 40° C. for 1 hour and separated, and the lower layer (methanol layer) was removed. Again, 720 g of methanol was added thereto, and the mixture was stirred at 40° C. for 30 minutes. The mixture was left to stand still at 40° C. for 1 hour and separated, and the lower layer (methanol layer) was removed. The remaining upper layer (decane layer) was distilled to remove decane under a reduced pressure, and dried by a vacuum dryer at 50 Pa at 40° C. for 24 hours to give 155.2 g (yield: 86%) of a polymer having a weight average molecular weight of 164000 and containing an oligomer having a molecular weight of 1000 or less in a ratio of 8.1%. The ratio of trans structural unit present in the main chain of this polymer (polyoctenylene (A-6)) was 50%.

Example 10.1

First, 90 parts by weight of the EVOH (E-1), 10 parts by weight of the polyoctenylene (A-1) obtained in Synthesis Example 1 and 0.85 parts by weight of cobalt(II) stearate (800 ppm in terms of cobalt atom) were dry-blended, and pelletized by extrusion using a 25 mmΦ twin-screw extruder (LABO PLASTOMIL MODEL 15C300 manufactured by Toyo Seiki Seisakusho Ltd.) at a screw rotation of 100 rpm at 210° C. in an extruded resin amount of 6 kg/hour. Then, the pellets were dried under a reduced pressure at 40° C. for 16 hours to give resin composition pellets composed of the EVOH (E-1), the polyoctenylene (A-1) and cobalt stearate.

Using the resin composition pellets thus obtained, extrusion molding was performed at an extrusion temperature of 210° C. to give a film having a thickness of 20 μm.

Then, the obtained film was cut to obtain a sample film of 0.1 g and the film was precisely weighed. The film was rolled 5 hours after the sheet formation and placed in a standard bottle having an internal volume of 260 ml that had been filled with 50% RH air at 23° C. The air in the standard bottle contained oxygen and nitrogen in a volume ratio of 21:79. Then, 5 ml of water was added to the standard bottle, and the opening of the standard bottle was sealed with a multilayered sheet including an aluminum layer using an epoxy resin, and the bottle was left to stand at 60° C. After the sealing, the inner air was sampled with a syringe periodically to measure the oxygen concentration in the air by gas chromatography. The small hole formed in the multilayered sheet during the measurement was sealed with the epoxy resin every time the hole was formed. The oxygen absorption amount of the resin composition in a 100% RH atmosphere at 23° C. was obtained by calculating the amount of oxygen decreased based on the volume ratio of oxygen to nitrogen obtained by the measurement. Table 10 shows the oxygen absorption amount (cumulative amount) in 3 days (72 hours) after sealing. The oxygen absorption rate calculated from the results obtained 3 days after the start of the measurement was 5.2 ml/(g·day).

The oxygen absorption amount in a 80% RH atmosphere at 30° C. was obtained in the same manner. Table 10 shows the oxygen absorption amount (cumulative amount) in 7 days (168 hours) after sealing. The oxygen absorption rate calculated from the results obtained 7 days after the start of the measurement was 0.9 ml/(g·day).

Example 10.2

Resin composition pellets were obtained and a film was prepared in the same manner as in Example 10.1 except that the polyoctenylene (A-6) obtained in Synthesis Example 7 was used in place of the polyoctenylene (A-1). Using this film, the oxygen absorption amount was obtained in the same manner as in Example 10.1. Table 10 shows the results.

appearance of the sheet, the handling properties and moldability of the resin composition pellets were evaluated. The results are shown Table 11.

Example 11.2

Resin composition pellets were obtained and a sheet was prepared in the same manner as in Example 11.1 except that the polyoctenylene (A-6) obtained in Synthesis Example 7 was used in place of the polyoctenylene (A-1).

A sheet having a thickness of 100 μm was obtained in the same manner as in Example 11.1 using the resin composition pellets obtained in Example 11.2. From the appearance of the sheet, the handling properties and moldability of the resin composition pellets were evaluated.

When the ratio of trans structural unit in the main chain is low, it is likely that, although the oxygen absorption rate is increased, the fluidity is high, the temperature control range is narrow, and the adhesion to the extruder screw is extensive. Moreover, it is likely that sheets after molding are somewhat adhesive to each other, and the handling properties during storage after processing is likely to be detriorated to some degree. The results are shown Table 11.

TABLE 10

| | Resin (A) | | Oxygen absorption amount (ml/g) | | Oxygen absorption rate (ml/(g · day)) | |
|---|---|---|---|---|---|---|
| | | | 23° C. 100% | 30° C. 80% | 23° C. 100% | 30° C. 80% |
| | Polymer | cis/trans ratio*[1] | (3 days) | (7 days) | (3 days) | (7 days) |
| Example 10.1 | POE(1) | 23/77 | 15.5 | 6.0 | 5.2 | 0.9 |
| Example 10.2 | POE(6) | 50/50 | 20.9 | 8.1 | 7.0 | 1.2 |

POE(1): Polyoctenylene (A-1)
POE(6): Polyoctenylene (A-6)
*[1]Ratio of cis structural unit to trans structural unit Example 11.1

First, 100 parts by weight of the polyoctanylene (A-1) obtained in Synthesis Example 1 and 0.85 parts by weight of cobalt(II) stearate (800 ppm in terms of cobalt atom) were dry-blended, melt-kneaded in a total resin amount of 70.59 g using a roller mixer (LABO PLASTOMIL MODEL R100 manufactured by Toyo Seiki Seisakusho Ltd.) at a screw rotation of 60 rpm at 190° C. while purging the chamber with nitrogen, and removed as a bulk in 5 minutes. The obtained bulk product was cut into pellets to give resin composition pellets composed of the polyoctenylene (A-1) and cobalt stearate.

The obtained resin composition pellets were supplied to a compression molding machine (manufactured by Shindo Metal Industries) and molded at an extrusion temperature of 200° C. to give a sheet having a thickness of 100 μm. From the

TABLE 11

| | Resin (A) | | Handling | |
|---|---|---|---|---|
| | Polymer | cis/trans ratio*[1] | properties | Moldability |
| Example 11.1 | POE(1) | 23/77 | ○ | ○ |
| Example 11.2 | POE(6) | 50/50 | Δ | Δ |

POE(1): Polyoctenylene (A-1)
POE(6): Polyoctenylene (A-6)
*[1]Ratio of cis structural unit to trans structural unit
Handling properties ○: Storable without problem after molding
Handling properties Δ: Sheet somewhat adhesive after molding, handling properties during storage somewhat poor
Moldability ○: Good moldability
Moldability Δ: Adhesion to a screw observed during molding Example 12.1

First, 100 parts by weight of the polyoctenylene (A-1) obtained in Synthesis Example 1, 0.42 parts by weight of cobalt(II) stearate (400 ppm in terms of cobalt atom) and 0.013 parts by weight of tungsten trioxide (100 ppm in terms of tungsten atom) were dry-blended, melt-kneaded in a total resin amount of 70.31 g using a roller mixer (LABO PLASTOMIL MODEL R100 manufactured by Toyo Seiki Seisakusho Ltd.) at a screw rotation of 60 rpm at 100° C. while purging the chamber with nitrogen, and removed as a bulk after 5 minutes. The obtained bulk product was cut into pellets to give resin composition pellets composed of the polyoctenylene (A-1), cobalt stearate and tungsten trioxide.

Figure 7:
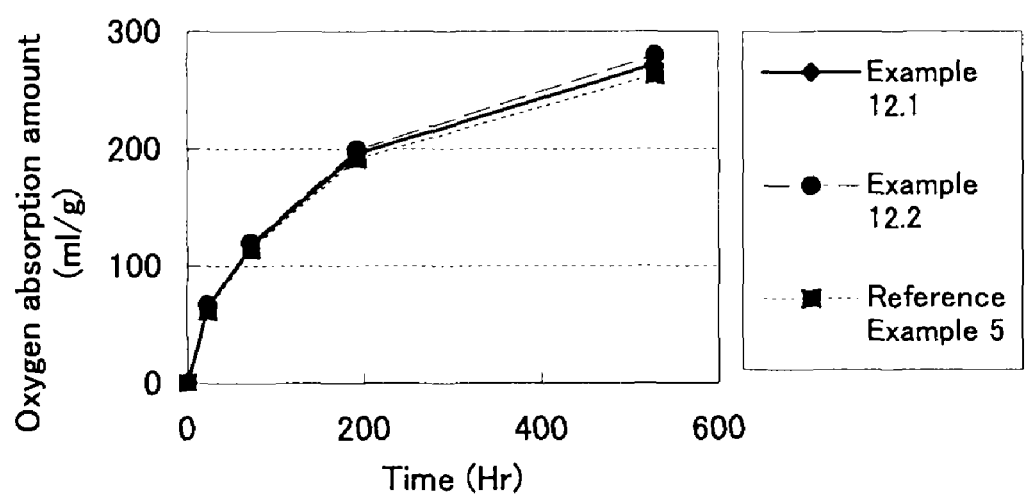
FIG. 7 is a graph in which the oxygen absorption amounts of the films of Examples 12.1 and 12.2 and Reference Example 5 under a 100% RH atmosphere at 23° C. against time are plotted.

The obtained resin composition pellets were crushed by a grinder and passed through a 60/80 mesh sieve, and powder was thus obtained. Then, 0.1 g of this powder was precisely weighed and placed in a standard bottle having an internal volume of 260 ml that had been filled with 100% RH air at 23° C. The air in the standard bottle contained oxygen and nitrogen in a volume ratio of 21:79. Then, 5 ml of water was added to the standard bottle, and the opening of the standard bottle was sealed with a multilayered sheet including an aluminum layer using an epoxy resin. After the sealing, the inner air was periodically sampled with a syringe to measure the oxygen concentration in the air by gas chromatography. The small hole formed in the multilayered sheet during the measurement was sealed with the epoxy resin every time the hole was formed. The oxygen absorption amount of the resin composition in a 100% RH atmosphere at 23° C. was obtained by calculating the amount of oxygen decreased based on the volume ratio of oxygen to nitrogen obtained by the measurement. FIG. 7 and Table 12 show the oxygen absorption amount (cumulative amount) in 1 day (24 hours), 3 days (72 hours), 8 days (192 hours) and 22 days (528 hours) from the time of sealing. The oxygen absorption rate calculated from the results of 3 days after and 8 days after the start of the measurement was 15.7 ml/(g·day).

Example 12.2

First, 100 parts by weight of the polyoctenylene (A-1) obtained in Synthesis Example 1, 0.42 parts by weight of cobalt(II) stearate (400 ppm in terms of cobalt atom) and 0.25 parts by weight of tungsten trioxide (2000 ppm in terms of tungsten atom) were dry-blended, melt-kneaded in a total resin amount of 70.47 g using a roller mixer (LABO PLASTOMIL MODEL R100 manufactured by Toyo Seiki Seisakusho Ltd.) at a screw rotation of 60 rpm at 100° C. while purging the chamber with nitrogen, and removed as a bulk after 5 minutes. The obtained bulk product was cut into pellets to give resin composition pellets composed of the polyoctenylene (A-1), cobalt stearate and tungsten trioxide.

Using the obtained resin composition pellets, evaluation was carried out in the same manner as in Example 12.1. The results are shown in FIG. 7 and Table 12.

Reference Example 5

First, 100 parts by weight of the polyoctenylene (A-1) obtained in Synthesis Example 1 and 0.42 parts by weight of cobalt(II) stearate (400 ppm in terms of cobalt atom) were dry-blended, melt-kneaded in a total resin amount of 70.30 g using a roller mixer (LABO PLASTOMIL MODEL R100 manufactured by Toyo Seiki Seisakusho Ltd.) at a screw rotation of 60 rpm at 100° C. while purging the chamber with nitrogen, and removed as a bulk after 5 minutes. The obtained bulk product was cut into pellets to give resin composition pellets composed of the polyoctenylene (A-1) and cobalt stearate.

Using the obtained resin composition pellets, evaluation was carried out in the same manner as in Example 12.1. The results are shown in FIG. 7 and Table 12.

TABLE 12

| | POE(1) (g) | Cobalt (ppm)[*1] | Tungsten (ppm)[*2] | Oxygen absorption amount (ml/g)[*3] | | | | Oxygen absorption rate (ml/(g·day)) |
|---|---|---|---|---|---|---|---|---|
| | | | | 1 Day | 3 Days | 8 Days | 22 Days | |
| Example 12.1 | 70 | 400 | 100 | 65.5 | 117.4 | 195.9 | 271.7 | 15.7 |
| Example 12.2 | 70 | 400 | 2,000 | 66.9 | 119.6 | 199.3 | 279.8 | 15.9 |
| Reference Example 5 | 70 | 400 | 0 | 62.0 | 114.3 | 191.5 | 263.2 | 15.4 |

POE(1): Polyoctenylene (A-1)
[*1]Cobalt atom content in cobalt stearate
[*2]Tungsten atom content in tungsten trioxide
[*3]Oxygen absorption amount in 100% RH at 23° C.

INDUSTRIAL APPLICABILITY

The present invention provides an oxygen-absorbing resin composition that has excellent oxygen absorbency and does not generate an unpleasant odor as a result of oxygen absorption.

Moreover, the present invention can provide a resin composition having, in addition to the properties described above, a high oxygen absorption rate. Furthermore, the present invention can provide a resin composition that has, in addition to the properties described above, good handling properties during processing, undergoes little coloring and gel generation in a molded product obtained therefrom, and has excellent transparency. Moreover, the present invention can provide an oxygen-absorbing resin composition that does not generate an unpleasant odor even when subjected to processing in the presence of hot water, such as retort processing.

Using the resin composition, a variety of molded products containing the resin composition and having high oxygen absorbency, such as multilayered films and multilayered containers, caps, and the like including a layer made of the resin composition, can be produced. In particular, the composition is preferable for use in containers suitable for storing articles such as foods and cosmetics that are susceptible to degradation by oxygen and whose flavor is important. The composition can be preferably used also as a packaging material for food that requires retort processing. Furthermore, the composition has a strong oxygen scavenging function and thus is of use as an easy-to-handle oxygen absorbent.

The invention claimed is:

1. An oxygen-absorbing resin composition comprising a thermoplastic resin (A) having carbon-carbon double bonds substantially only in the main chain, a transition metal salt (B), and a transition metal compound (D);
    wherein in the thermoplastic resin (A), each carbon-carbon double bond is separated by three or more methylenes; and
    wherein the transition metal compound (D) is at least one metal compound selected from the group consisting of $TiO_2$, $V_2O_5$, $MoO_3$, $CrO_3$, $WO_3$, $WO_2$, $H_2WO_4$, $WCl_2O_2$, $WOCl_4$, and $SeO_2$.

2. The resin composition of claim 1, wherein the thermoplastic resin (A) has a structural unit as represented by a formula (1):

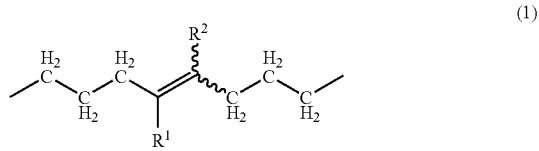

wherein $R^1$ and $R^2$ are each independently a hydrogen atom, an alkyl group that may be substituted, an aryl group that may be substituted, an alkylaryl group that may be substituted, $-COOR^3$, $-OCOR^4$, a cyano group or a halogen atom, and $R^3$ and $R^4$ are each independently a hydrogen atom or an alkyl group having 1 to 10 carbon atoms.

3. The resin composition of claim 1, wherein the thermoplastic resin (A) is a ring-opening metathesis polymer of a cyclic olefin having 7 or more carbon atoms.

4. The resin composition of claim 1, wherein the thermoplastic resin (A) has a weight average molecular weight of 60000 or more.

5. The resin composition of claim 1, wherein a trans structural unit in the main chain of the thermoplastic resin (A) accounts for 40% or more and 90% or less of the total thermoplastic resin (A).

6. The resin composition of claim 1, wherein the thermoplastic resin (A) is polyoctenylene.

7. The resin composition of claim 1 further comprising an antioxidant (C).

8. The resin composition of claim 7, wherein the antioxidant (C) is contained in a ratio of 100 to 5000 ppm based on the weight of the thermoplastic resin (A).

9. The resin composition of claim 1, wherein the transition metal compound (D) is contained in a ratio of 50 to 50000 ppm in terms of metal element based on the weight of the thermoplastic resin (A).

10. The resin composition of claim 1, wherein the transition metal salt (B) is at least one metal salt selected from the group consisting of an iron salt, a nickel salt, a copper salt, a manganese salt and a cobalt salt.

11. The resin composition of claim 10, wherein the transition metal salt (B) is contained in a ratio of 1 to 50000 ppm based on the weight of the thermoplastic resin (A).

12. The resin composition of claim 1 further comprising a matrix resin (E).

13. The resin composition of claim 12, wherein particles of the thermoplastic resin (A) are dispersed in a matrix of the matrix resin (E).

14. The resin composition of claim 12, wherein the average particle size of the particles of the thermoplastic resin (A) is 4 μm or less.

15. The resin composition of claim 12, wherein the thermoplastic resin (A) is contained in a ratio of 30 to 1 wt % and the matrix resin (E) is contained in a ratio of 70 to 99 wt %, when the total weight of the thermoplastic resin (A) and the matrix resin (E) is determined to be 100 wt %.

16. The resin composition of claim 12, wherein the matrix resin (E) is a gas barrier resin (E.1) having an oxygen transmission rate of 500 ml·20 μm/(m²·day·atm) or less in 65% RH at 20° C.

17. The resin composition of claim 12, wherein the gas barrier resin (E.1) is at least one resin selected from the group consisting of a polyvinyl alcohol resin, a polyamide resin, a polyvinyl chloride resin and a polyacrylonitrile resin.

18. The resin composition of claim 17, wherein the gas barrier resin (E.1) is an ethylene-vinyl alcohol copolymer having an ethylene content of 5 to 60 mol % and a degree of saponification of 90% or more.

19. The resin composition of claim 12 further comprising a compatibilizer (F).

20. The resin composition of claim 19, wherein the thermoplastic resin (A) is contained in a ratio of 29.9 to 1 wt %, the matrix resin (E) is contained in a ratio of 70 to 98.9 wt %, and the compatibilizer (F) is contained in a ratio of 29 to 0.1 wt %, when the total weight of the thermoplastic resin (A), the matrix resin (E) and the compatibilizer (F) is determined to be 100 wt %.

21. A molded product comprising the resin composition of claim 1.

22. A multilayered structure comprising a layer made of the resin composition of claim 1.

23. A multilayered container comprising a layer made of the resin composition of claim 1.

24. The resin composition of claim 1, wherein thermoplastic resin (A) is capable of absorbing oxygen in an amount of 1.6 mols or more per 1 mol of carbon-carbon double bond.

25. The resin composition of claim 1, wherein the thermoplastic resin (A) contains an oligomer having a molecular weight of 1000 or less in a ratio of 6% by area or less in an analytical chart of gel permeation chromatography.

26. The resin composition of claim 25, wherein the thermoplastic resin (A) is prepared by removing the oligomer having a molecular weight of 1000 or less from the ring-opening metathesis polymer of a cyclic olefin having 7 or more carbon atoms.

27. The resin composition of claim 26, wherein the thermoplastic resin (A) is prepared by washing the ring-opening metathesis polymer of a cyclic olefin having 7 or more carbon atoms with a solvent that does not substantially dissolve the polymer.

* * * * *